United States Patent
Coutts et al.

(10) Patent No.: US 7,545,816 B1
(45) Date of Patent: Jun. 9, 2009

(54) TRANSACTION PROCESSING SYSTEMS MAINTENANCE

(75) Inventors: Michael G. Coutts, Dundee (GB); Lee G. Dove, Coupar Angus (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/229,046

(22) Filed: Jan. 12, 1999

(30) Foreign Application Priority Data

| Apr. 29, 1998 | (GB) | ................................. 9808995.6 |
| Apr. 29, 1998 | (GB) | ................................. 9808997.2 |
| Jul. 25, 1998 | (GB) | ................................. 9816178.9 |

(51) Int. Cl.
*H04L 12/26* (2006.01)
*G06Q 40/00* (2006.01)

(52) U.S. Cl. .......................... 370/400; 235/375; 705/43
(58) Field of Classification Search ................. 370/400, 370/422; 705/35–45; 235/375, 379, 380; 340/10.1; 709/202, 223, 224; 714/25, 28
See application file for complete search history.

(56) References Cited

U.S. PATENT DOCUMENTS

| 3,882,305 | A | * | 5/1975 | Johnstone | .................... 702/183 |
| 4,179,735 | A | | 12/1979 | Lodi | .......................... 713/100 |
| 4,660,168 | A | | 4/1987 | Grant et al. | ..................... 705/8 |
| 4,823,343 | A | * | 4/1989 | Takahashi | .................... 714/46 |
| 4,917,792 | A | | 4/1990 | Murakami | ................... 209/534 |
| 4,922,419 | A | | 5/1990 | Ohashi et al. | .................. 705/43 |
| 5,347,646 | A | * | 9/1994 | Hirosawa et al. | ............... 714/49 |
| 5,491,791 | A | * | 2/1996 | Glowny et al. | ................. 714/37 |
| 5,539,877 | A | | 7/1996 | Winokur et al. | |
| 5,563,805 | A | * | 10/1996 | Arbuckle et al. | ............. 709/204 |
| 5,655,081 | A | | 8/1997 | Bonnell et al. | |
| 5,659,801 | A | | 8/1997 | Kopsaftis | ..................... 710/62 |
| 5,737,585 | A | | 4/1998 | Kaneshima | ................... 703/20 |
| 5,870,699 | A | * | 2/1999 | Canada et al. | .............. 702/190 |
| 5,943,652 | A | * | 8/1999 | Sisley et al. | ..................... 705/9 |
| 5,946,372 | A | * | 8/1999 | Jones et al. | ............... 379/10.01 |
| 5,958,010 | A | * | 9/1999 | Agarwal et al. | ............. 709/224 |
| 5,958,014 | A | * | 9/1999 | Cave | ........................... 709/229 |
| 5,984,178 | A | * | 11/1999 | Gill et al. | ..................... 235/379 |

(Continued)

FOREIGN PATENT DOCUMENTS

WO            9602034         1/1996

OTHER PUBLICATIONS

U.S. Appl. No. 09/298,559, "Low Power Receiver for Radio Tag and Method," filed by Wayne Steeves, filed Apr. 22, 1999.

(Continued)

*Primary Examiner*—Wing F Chan
*Assistant Examiner*—Saba Tsegaye
(74) *Attorney, Agent, or Firm*—Gregory A. Welte

(57) ABSTRACT

A communications network can comprise a plurality of network sites, to each of which a transaction terminal, a maintenance terminal, or a server may be connected. Each transaction terminal (which may be an ATM or a point-of-sale terminal) may have at least one service element, such as a card transport or currency bin, which is to be maintained in operation. Intelligent agent programs may move between terminals collecting information from or imparting information to each terminal visited. The information that is collected or imparted may be used for facilitating efficient servicing or maintenance of the transaction terminals.

20 Claims, 47 Drawing Sheets

U.S. PATENT DOCUMENTS

| | | | | |
|---|---|---|---|---|
| 6,085,178 | A * | 7/2000 | Bigus et al. | 705/80 |
| 6,085,976 | A * | 7/2000 | Sehr | 235/384 |
| 6,108,640 | A * | 8/2000 | Slotznick | 705/26 |
| 6,115,643 | A * | 9/2000 | Stine et al. | 700/110 |
| 6,128,376 | A * | 10/2000 | Smith | 379/201.1 |
| 6,152,365 | A * | 11/2000 | Kolls | 235/381 |
| 6,305,602 | B1 * | 10/2001 | Grabowski et al. | 235/379 |
| 6,308,887 | B1 * | 10/2001 | Korman et al. | 235/379 |
| 6,318,536 | B1 * | 11/2001 | Korman et al. | 194/217 |
| 6,473,788 | B1 * | 10/2002 | Kim et al. | 709/209 |
| 6,505,177 | B1 * | 1/2003 | Drummond et al. | 705/43 |
| 6,578,005 | B1 * | 6/2003 | Lesaint et al. | 705/8 |
| 2003/0069797 | A1 * | 4/2003 | Harrison | 705/26 |
| 2005/0094772 | A1 * | 5/2005 | Harrison et al. | 379/9.03 |

OTHER PUBLICATIONS

Covaci et al., "Java-based intelligent mobile agents for open system management", Tools With Artificial Intelligence, 1997. Proceedings, Ninth IEEE International Conference on Newport Beach, CA, USA, IEEE Computer Society, US, Nov. 3, 1997, pp. 492-501.

Bieszczad et al., "Network management application-oriented taxonomy of mobile code", Network Operations and Management Symposium, 1998, NOMS 98, IEEE New Orleans, LA, USA, Feb. 15-20, 1998, New York, NY, USA IEEE, US, Feb. 15, 1998, pp. 659-669.

Franklin et al., " Is it an agent, or just a program?: a taxonomy for autonomous agents", Proceedings of the Third International Workshop on Agent Theories, Architectures and Languages, [online], 1996. Retrieved from the Internet: <URL:http://www.msci.memphis.edu/~franklin/AgentProg.html>.

Liotta et al., "Modelling network and system monitoring over the Internet with mobile agents", Network Operations and Management Symposium, 1998. NOMS 98, IEEE New Orleans, LA, USA Feb. 15-20, 1998, New York, NY, USA, IEEE, US, Feb. 15, 1998, pp. 303-312.

Garijo et al., "A multiagent system for cooperative network-fault management", Proceedings of the First Intl Conf and Exhibition on the Practical Applns of Intelligent Agents and Multi-Agent Tech, pp. 279-294, London. 'online!—1996 XP002270915. Retrieved from the Internet: <URL:http://citeseer.nj.nec.com/garijo96multiagent.html> retrieved on Feb. 18, 2004!.

Schroeder et al., "Distributed diagnosis by vivid agents", Proceedings of the Intl Conf on Autonomous Agents, ACM Press, 'Online!—1997, XP002270916. Retrieved from the Internet: <URL:http://citeseer.nj.nec.com/schroeder97distributed.html> retrieved on Feb. 18, 2004!.

Zhang et al., "Developing network management applications in an application-oriented way using mobile agent", Computer Networks and ISDN Systems, North Holland Publishing, Amsterdam NL, vol. 30, No. 16-18, Sep. 30, 1998, pp. 1551-1557, XP004138686, ISSN: 0169-7552.

* cited by examiner

FIG. 3
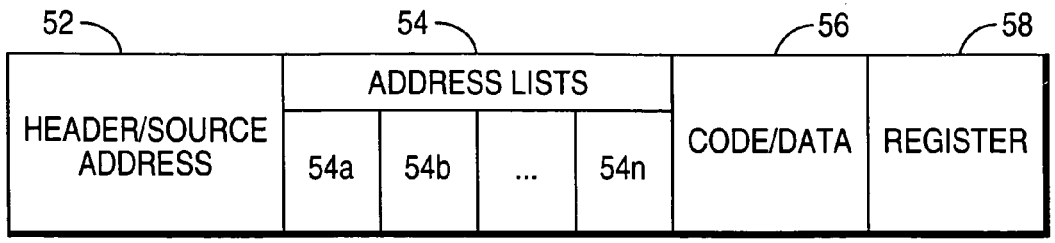
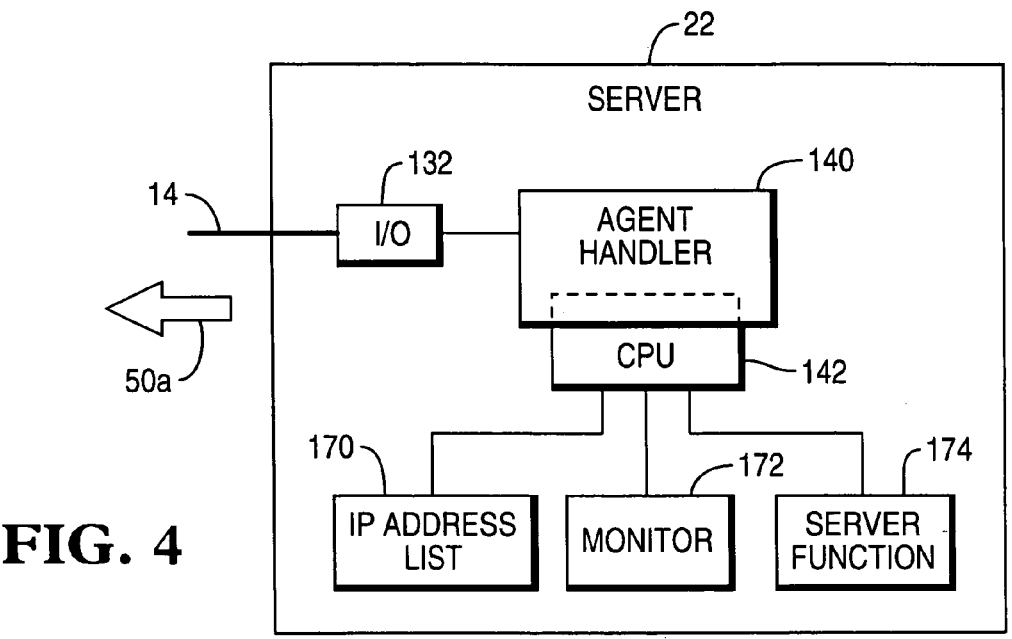
FIG. 4
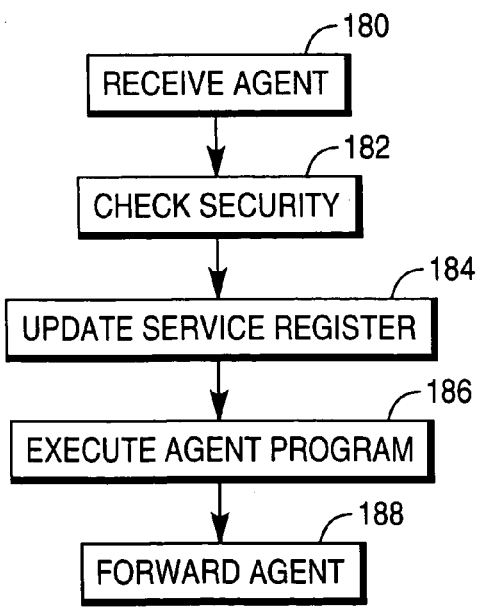
FIG. 5

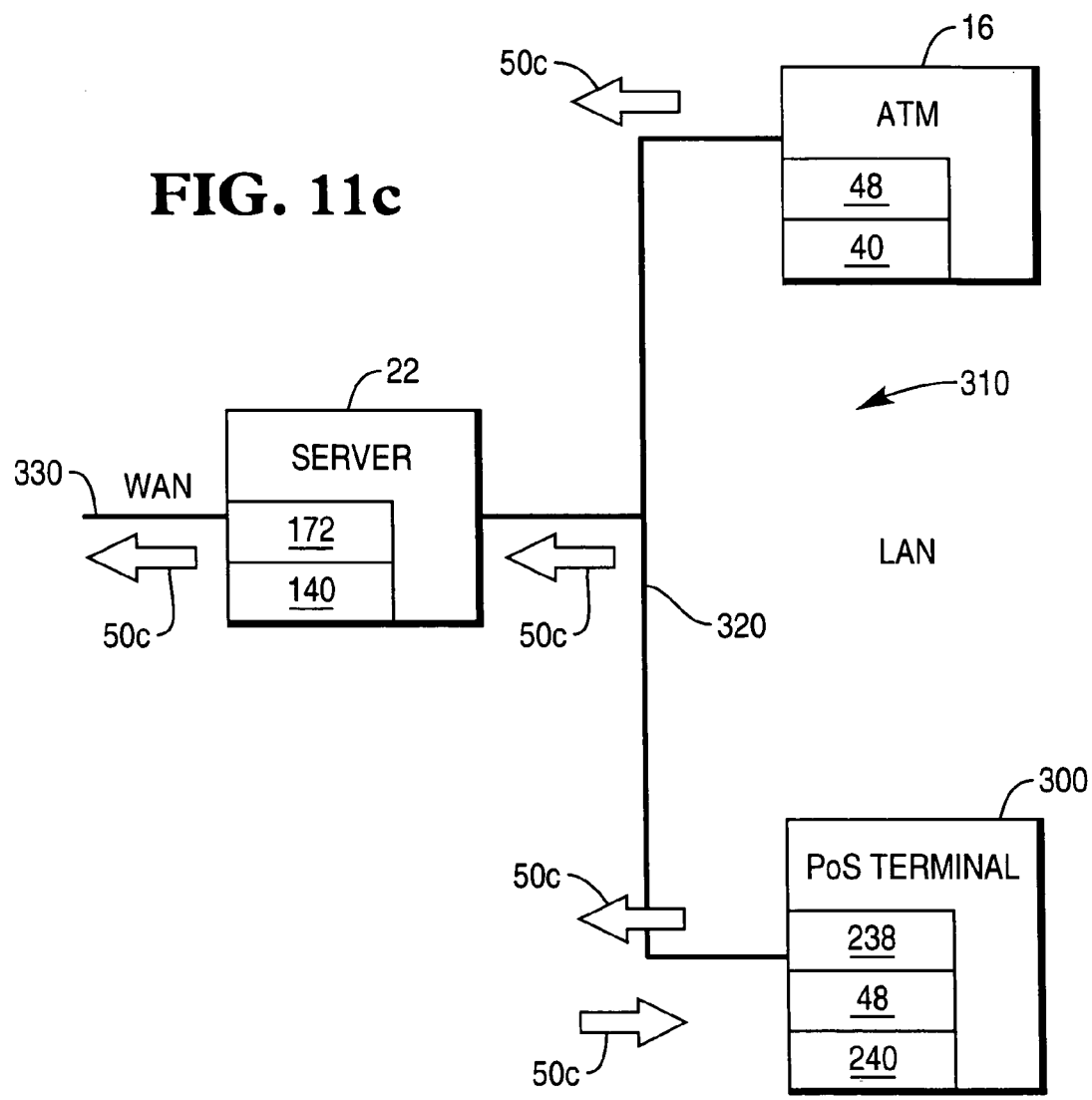

```
public class ModuleDetails implements Serializable
{
    /** Modules port number */
    int PortNumber;

/** Modules name */
    String ModuleName;

/** Modules IP address */
    String IPAddress;

/** Modules State of Health */
    String SOH;
}
```

FIG. 16

```
public void Searching(String temp)
{
    if (temp.equalsIgnoreCase("SHTR JAM"))
        {
        Log[0] = Log[0] +1;    // Incrementing the log if a match is found
        if (Log[0] >= 0)  // Threshold = 0
                error.setErrorArray(0,"Shutter Jam");   // If the threshold is broken
          then
                                                        //set array location0 to
                                                  'Shutter Jam'
        }

// Calls the function that will send the Error Array to the Regional
    // Server and generate and Alert Agent if the error is fatal
    send();
}
```

BRANCH OFFICE NETWORK

FIG. 19

```
/** Determines whether or not to send out a Alert Agent */
public void processReturningAgent()
    {
    int count =0;
    Vector ATMsToVisit = new Vector(1,1);
    AlertAgent aAgent;

ATMsToVisit = mAgent.getATM();
    int size = ATMsToVisit.size();

while (count < size) // Extracts the records one at a time and examines the State of Health
        {
        ModuleDetails Mtemp = (ModuleDetails)ATMsToVisit.elementAt(count);
        String tempSOH = Mtemp.getSOH(); // Gets the modules state of Health if (tempSOH.equals("Healthy"))
           {
           }
        else
           // Create an alert agent and initialise it with the Replenisher Location Details.
           {
           agent = new AlertAgent(RepIP, RepPort,Mtemp);

// Get the Internet address and the port number
           // of the first Replenisher String nextAddress = RepIP[0];
           int nextPort = RepPort[0];

// Send out the Alert Agent
           MonitorClient client = new MonitorClient(nextAddress,nextPort,aAgent);
           }
        count++;
        }
```

FIG. 20

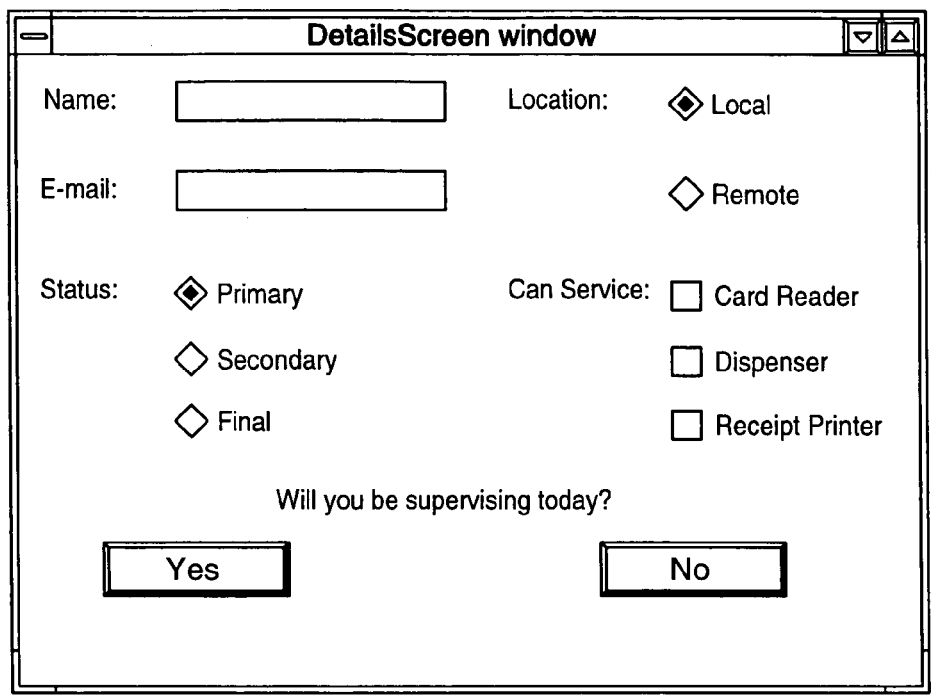

FIG. 22

```
public void StoreData()
{
    int count =0;
    boolean flag = false;
    String temp = sAgent.getReplenishersIP();

while(RepIP[count] != null)  // Finds the next free space to add the Replenisher data to
    {
    count++;
    }

RepPort[count] = sAgent.getReplenishersPort();  // Adds the new data to the arrays
    RepIP[count] = sAgent.getReplenishersIP();
    sAgent.SendOutServiceAgent();  // Passes the service agent onto the next module
}
```

FIG. 24a

```
public void processServicesInfo(RepDetails rep, String IP, int port)
{
    DisplayError dError;
    AlertAgent agent;

RepDetails details = new RepDetails();
    details = rep;  // A local copy of the class RepDetails, this stores all the Replenishers
details
    int count =0;
    int counter =0;
    CurrentIP = IP;
    CurrentPort = port;

String tempLocation = details.getLocation();  // Gets the Replenishers location
    String tempStatus = details.getStatus();  // Gets the Replenishers status
    String[] tempService = details.getServices();  // Gets the list of what the Replenisher can
fix if (tempLocation.equalsIgnoreCase(LookForLocation))
        {
        if (tempStatus.equalsIgnoreCase(LookForStatus))
            {
            if (tempService[0].equalsIgnoreCase("Dispenser"))
                {
                dError = new DisplayError(ErrorIP, ErrorModule, ErrorSOH,this);
                }
            else if (tempService[1].equalsIgnoreCase("Card Reader"))
                {
                dError = new DisplayError(ErrorIP, ErrorModule, ErrorSOH,this);
                }
            else if (tempService[2].equalsIgnoreCase("Printer"))
                {
                dError = new DisplayError(ErrorIP, ErrorModule, ErrorSOH,this);
                } if (tempStatus.equalsIgnoreCase("Primary"))
            LookForStatus = "Secondary";

if (tempStatus.equalsIgnoreCase("Secondary"))
            LookForStatus = "Final";
```

FIG. 24b

```
if (tempStatus.equalsIgnoreCase("Final"))
    {
    LookForStatus = "Primary";
    if (tempLocation.equalsIgnoreCase("Local"))
            {
            LookForLocation = "Remote";
            }
    }
    NumberOfServicers++;
    }
else
    {
    int size = 0;
    while (IPList[size] != null)    // Gets the number of Replenishers in the list
        {
        size++;
        } if (NumberOfServicers == size)  // When all the Replenishers have been visited, go back
            {
            int nextport = PortList[0];   //  Set to the starting port number
            String nextIP = IPList[0];    //  Set to the starting IP number
            String signal = "Alert Agent";
            Client client = new Client(nextIP, nextport, signal,this); // Send out the agent
            }
        else
            {
            while (IPList[counter] != CurrentIP)  // Find the array position of the Replenisher
                {
                counter++;
                } if (IPList[counter].equalsIgnoreCase(CurrentIP))
            {
            int nextport = PortList[counter++];   // Move on to the next Replenisher if
            String nextIP = IPList[counter++];    // nothing suitable here
            String signal = "Alert Agent";
            Client client = new Client(nextIP, nextport, signal,this);

NumberOfServicers++;
```

FIG. 25
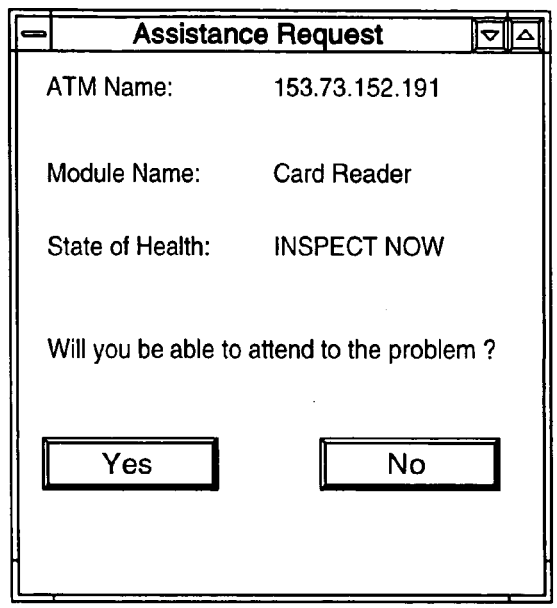
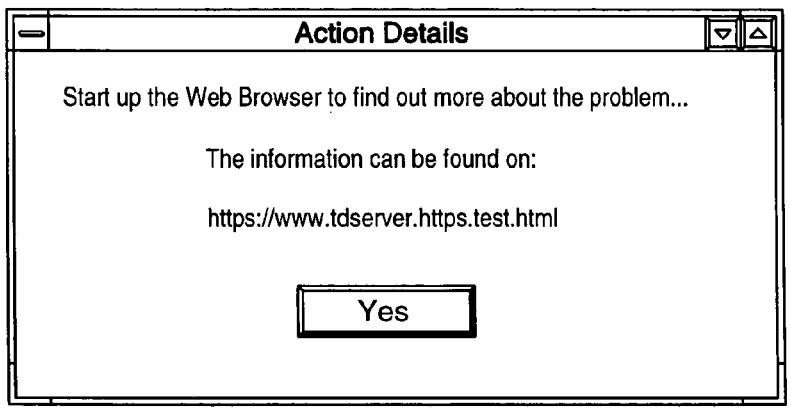
FIG. 26
FIG. 27
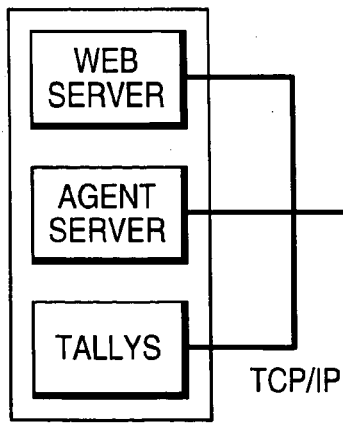

FIG. 28

```
If (temp.equalsIgnoreCase("Shutter Jam"))
{
    Description[count] = "The shutter has jammed " + "open or closed. This " +
                        " was detected when a card was" + "being accepted or ejected";

Check[count] = "Shutter, Card Reader";
    StateOfHealth = "INSPECT NOW";
```

FIG. 29

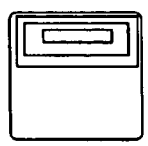 Available

FIG. 30

 192.23.234.195

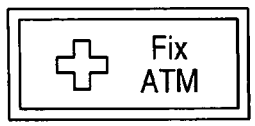  FIG. 31

```
public void runServer()

int sPort = 6050; // initialises this value to 6050
    ServerSocket Serv;

try
```

FIG. 32

```
    // Set the socket to be monitored
    Serv = new ServerSocket(sPort);

// if the thread does not link to anything then create one and start it running
    if (runner == null)

// run the ServerThread as a new thread
        runner = new AppletServer(Serv,this);

// start the thread runner running
        runner.start();

catch (Exception e)
```

FIG. 33

```
public void run()
{
    Object temp = null;
    String tempString = null;

while (true)
    {
        try
        {
            // waits on the server until a message is received
            Socket server = Serv.accept();

// creates a new stream to connect to and bind
            ObjectInputStream in = new ObjectInputStream(server.getInputStream());

// reads in the object and changes it too a String
            temp = in.readObject();
            tempString = temp.toString();

if (tempString.equalsIgnoreCase("Service Agent"))
            {
                SAgentPresent = true;

// Reads in the service agent
                sAgent= (ServiceAgent)in.readObject();
            }
        }
        catch (Exception e)
        {
            System.out.println(e);
```

FIG. 34

```
public void SendAgent()
{
    // Set Output To Send Agent To First Server
    try
        {
        // try and connect to Socket destName.destPort
        Socket s = new Socket(destName, destPort);

// create an ObjectOutputStream (out)
        ObjectOutputStream out = new ObjectOutputStream(s.getOutputStream());

// Got a connection Send Agent To Server
        // Sends out the corresponding agent
        if (state.equalsIgnoreCase("Service Agent"))
                {
                out.writeObject(state);
                out.writeObject(sAgent);
                }

// Close outgoing port
        s.close();
        out.close();
        }
    catch (Exception e)
        {
        }
}
```

FIG. 35a

| Functional Block | Class Name | Description |
|---|---|---|
| SoH | AppletCenter.java | Handles all the displaying and passing of data to the Applet. It controls what images etc. are displayed and when they are displayed. |
| | AppletMain.java | Used to check that the thread is not already running and that the server can start running. Also used to pass data between the AppletCenter class and the AppletServer class. |
| | AppletServer.java | Listens on a specified server connection and waits for incoming messages. It listens for messages from the Regional Server. Once a message has arrived it takes the corresponding actions. |
| | ControlPanel.java | Holds navigation buttons and a Break button that is used only for demonstration purposes. |
| | Errors_Fixed.java | Displays the Fix Errors screen and all the details about an error. Any of the errors can be fixed by selecting one and pressing the OK button. This causes the ATM to reset itself and the error to be removed from the error records. |
| | FixMoney.java | Help screen on how to fill the ATM with money. |
| | Ink.java | Help screen on how to replace ribbon. |
| | Paper.java | Help screen on how to fill the ATM with paper. |
| | Knife.java | Help screen on how to replace the knife. |
| | PurgeBin.java | Help screen on how to empty the purge bin. |
| | Record.java | Stores all the details about one error. An array of these is used to pass error data between the various classes and store all current error information. |
| | Screen0.java | Displays the components of the main screen on the Applet. |
| | Screen1.java | Displays the components of the Replenishers screen on the Applet. |
| | Screen2.java | Displays the components of the Field Engineers screen on the Applet. |

FIG. 35b

| Functional Block | Class Name | Description |
|---|---|---|
| Regional | Agent.java | Class that is inherited by all the various agents. |
| | AlertAgent.java | Agent that is produced when an error occurs and takes this data to the Replenisher to ask for help. |
| | ConfirmMess.java | Class that displays the whereabouts of the Applet. |
| | DisplayError.java | Class that displays the components of the error and ask the Replenisher for help. |
| | ModuleDetails.java | Stores the individual details of an ATM module. This information is vital in the movement of the agents around the network. |
| | MonitorAgent.java | Agent that is used to constantly monitor the State of Health of all the ATM modules. It has also the intelligent to move around the network. |
| | MonitorClient.java | This class has the ability to bind to ports on certain terminals and send out data for them. This class has the ability to send out all the different agents. |
| | MonitorServer.java | Listens on a specified server connection and waits for incoming messages. It listens for Service Agents, Returning Monitor Agents and ATM modules registering. Once a message has arrived it takes the corresponding actions. |
| | SOH_Monitor.java | Main class for this package. Used to handle all the incoming data and execute the calls that will send out the Monitor Agents. |
| | ObjectClient.java | This class has the ability to bind to ports on certain terminals and send out data for them. It is responsible for sending requests to an ATM module WebServer. |

FIG. 35c

| Functional Block | Class Name | Description |
|---|---|---|
| Regional - Cont'd | ObjectServer.java | Listens on a specified server connection and waits for incoming messages. Listens for messages and reset acknowledgements from the Embedded WebServers. Once a message has arrived it takes the corresponding actions. |
| | ObjectMain.java | Used to check that the thread is not already running and that the server can start running. |
| | ServiceAgent.java | Agent that will take the Replenishers Internet address and agent handler port number to the Regional Server and all of the registered ATM modules. |
| | StringProcessor.java | Adds additional information to be sent out along with the error data to the Applet. |
| | WaitAWhile.java | This is a thread that is used to sleep if an ATM has not registered and a Replenisher has logged in. |
| | WebClient.java | This class has the ability to bind to ports on certain terminals and send out data for them. Can send out serial data streams to the AppletServer. |
| | WebMain.java | Used to check that the thread is not already running and that the server an start running. |
| | WebServer.java | Listens on a specified server connection and waits for incoming messages. Listens for serial data coming from the AppletCenter. Once a message has arrived it takes the corresponding actions. |

FIG. 35d

| Functional Block | Class Name | Description |
|---|---|---|
| Replenisher | Client.java | This class has the ability to bind to ports on certain terminals and send out data for them. Sends out the Service Agent and the Alert Agents when desired. |
| | Server.java | Listens on a specified server connection and waits for incoming messages. Listens for Alert Agents coming to check out the Replenishers details. Once a message has arrived it takes the corresponding actions. |
| | RepDetails.java | Used to store the details a Replenisher has added to the details screen when they logged in. |
| | DetailsScreen.java | Main class for this package. Used to take the information from the screen and store it in RepDetails. It will also start-up the server and call the Client class to send out the Service Agents. |

FIG. 35e

| Functional Block | Class Name | Description |
|---|---|---|
| Agent | AgentHandler.java | Used to check that the thread is not already running and that the server an start running. |
| | AgentServer.java | Listens on a specified server connection and waits for incoming messages. Listens for incoming Service and Monitor Agents. Once a message has arrived it takes the corresponding actions. |
| | AgentClient.java | This class has the ability to bind to ports on certain terminals and send out data for them. Sends out Alert and Monitor Agents. |

FIG. 35f

| Functional Block | Class Name | Description |
|---|---|---|
| WebServer | Client.java | This class has the ability to bind to ports on certain terminals and send out data for them. Sends out all the data that is required to display information on the Applet. |
| | Server.java | Listens on a specified server connection and waits for incoming messages. Listens for requests from the Applet that are passed on by the Regional Server. Once a message has arrived it takes the corresponding actions. |
| | WebServer.java | Main class for this package, used to set-up and start the server. |
| | ErrorList.java | Class that holds the array of errors that have been produced and location details about were the errors occurred. |
| | ResetDetails.java | Class used to reset details in order to set a tally back to zero. |

FIG. 35g

| Functional Block | Class Name | Description |
|---|---|---|
| Tallies | Tallys.java | Inherited by all the classes below. Used in the Regional Server to access their functions and get the necessary information. |
| | CardTallys.java | Holds the tally mnemonics that are unique to the Card Reader class and the procedures that are needed to process them. |
| | DispenserTallys.java | Holds the tally mnemonics that are unique to the Cash Dispenser class and the procedures that are needed to process them. |
| | PrinterTallys.java | Holds the tally mnemonics that are unique to the Receipt Printer class and the procedures that are needed to process them. |
| | ProcessIPs.java | Used to get the modules Internet address and process it. |

TRANSACTION PROCESSING SYSTEMS MAINTENANCE

CROSS-REFERENCES TO RELATED APPLICATIONS

The disclosure of the inventors' commonly assigned U.S. patent application entitled "Transaction Processing Systems," filed on even date herewith, is hereby fully incorporated herein by reference.

BACKGROUND OF THE INVENTION

1. Field of the Invention

The invention relates to communications networks in which there are one or more transaction processing terminals that may require servicing or maintenance. A transaction processing terminal, or transaction terminal, may be a self-service terminal such as a transaction kiosk, an automated teller machine (ATM) or other cash dispensing terminal, a self-service checkout terminal or a retail point-of-sale (POS) terminal.

2. Description of Related Art

Such terminals are commonly required to operate under extreme service conditions. Twenty-four hour availability can be extremely important to transaction terminals, such as through-the-wall ATMs, which continue to operate after normal banking hours. This is compounded by the move towards off-site ATMs that are located in retail locations and petrol stations, where access by the on-site staff may be restricted for security reasons. Within the retail environment, POS terminals are required to operate reliably in many diverse locations from large supermarkets to small retail locations.

These systems can fail to operate due to two basic types of error. Firstly, hardware and system failures, and secondly failures caused by consumable media. The mechanical transports within ATMs that allow media (e.g., currency, tickets, receipts, cards, etc.) to be moved around may fail due to jamming by bad media. Cards can jam in the card reader, currency can jam in the dispenser transport, and receipt paper can jam within the printer mechanism or its external transport. Such critical errors can immediately take the terminal out of service and require immediate actions to be taken to recover the situation.

Point-of-sale (POS) terminals can have similar hardware failures such as receipt paper jams, cash drawer release failure or the failure of support systems such as scanners or weighing scales. While an operator may run the traditional POS terminal, the operator may not be trained or authorized to perform repair operations and may need to call for assistance when a failure occurs. New forms of self-service checkout terminals (SSTs) being developed integrate some of the functions of an ATM with a POS terminal. This type of unattended system can suffer the same critical failures as may be experienced in a more traditional POS terminal or an ATM.

The consumable media within an ATM, a POS or an SST terminal include currency leaving an ATM and entering a POS terminal, receipt paper, tickets and cards. There are situations where cards are captured by ATMs or currency is purged during a dispensing process. There may be a limit to the capacity within the capture and purge bins which requires the bins to be emptied as they approach the capacity limit. Similarly, when an ATM has a depository accepting envelopes or checks, the corresponding capture bin must be periodically emptied.

Within the POS terminal, where currency is entering in large denomination notes and leaving in smaller denomination notes and change, there are times when the mix of currency in the cash drawer is unsatisfactory to meet the transactions being processed. It may be necessary for the operator to call for assistance to re-stock the cash drawer with an appropriate mix of currency.

Clearly, critical failure resolution and consumable media management are important issues for ATM, SST and POS terminals. A number of techniques exist which attempt to address these issues. The larger retail stores often use a loudspeaker system to allow the operator to call for assistance. This could be in response to some critical situation such as a receipt paper jam where the customer must wait for the problem to be resolved. It could be in response to running low on low denomination currency where the customer may be given an undesirably large amount of small change. Either situation undesirably inconveniences the customer.

Where the terminals are included in computer systems, application programs may be used to monitor the operation of the terminal devices (e.g. the printer) and the consumable media (e.g. low supply of the printer paper) to predict potential failures. On stand alone terminals appropriate messages may be displayed to the user on a user display or to an operator on a specialized operator display. However this still requires that someone regularly checks the terminals to read the displayed messages and it poses a problem for off-site locations in regard to nominating someone to check the terminals.

SUMMARY OF THE INVENTION

It is an object of the invention to provide transaction terminals or networks in which one or more of the above stated objectives are met, or problems are overcome or mitigated.

According to a first aspect of the invention, a communications network has a plurality of interconnected network sites, at least one network site being a transaction terminal, wherein intelligent agent programs are used to convey information between sites on the network for facilitating efficient maintenance of the transaction terminal.

It will be understood that each transaction terminal may have one or more intelligent agent handlers for receiving intelligent agents from the network and for launching intelligent agents into the network. An agent handler may allow a received intelligent agent to execute within the context of the handler. The agent handler may also perform other functions, such as checking that a received intelligent agent has the required security. An executing intelligent agent may retrieve data from the transaction terminal that received the intelligent agent and may store data carried by the intelligent agent in the transaction terminal. The agent handler can be conveniently implemented in software.

A communications network may route intelligent agent programs through the network by reference to network site address information. Conveniently, the site address information can be carried by each agent program.

Each transaction terminal may include operation monitoring facilities for recording operating information associated with service elements within that terminal. Service elements may include receipt printers, cash dispensers, cash drawers, and such like. The operating information may relate to operating parameters associated with the service elements. Operating parameters may include details of transactions such as the total amount of cash that has been withdrawn, state of health information such as the amount of receipt paper that has been used, error conditions, and such like.

One network site in a communications network may be a regional or central server that may provide transaction processing capabilities. The server may record the network site address of each available transaction terminal; i.e. each transaction terminal that is operating and which is connected to the network.

Preferably, the connected server may have monitoring facilities that send out monitor intelligent agent programs (hereinafter referred to as monitor agents) for collecting operating information from each of the available transaction terminals. The server may provide each monitor agent with a list of all of the available transaction terminal addresses. Conveniently, the monitoring facilities can be implemented in software.

Preferably, for each transaction terminal address on the list, a monitor agent may have storage space for storing operating information associated with that transaction terminal.

Each monitor agent may visit each of various designated transaction terminal elements in turn; and the handler associated with each such terminal element may receive the monitor agent and execute the program carried by the received monitor agent. The monitor agent program may retrieve operating information from the transaction terminal element and then move on to the next destination. The next destination may be the next transaction terminal on its list. Alternatively, when all transaction terminals on its list have been visited, the monitor agent may return to the server with gathered information.

Preferably, a server's monitoring facilities may be further operable to receive a returning monitor agent and receive from the returning monitor agent the stored operating information for each transaction terminal visited.

Preferably, the system may analyze the received operating information so that the server is able to predict when a transaction terminal may require maintenance. For example, if a returning monitor agent contains operating information for an ATM which shows that the receipt printer paper is very low, the server can then alert maintenance personnel to schedule replenishment of the paper and thereby reduce the downtime of the ATM. The invention accordingly can provide a predictive maintenance communications network that uses monitor agents to predict when maintenance is required.

Conveniently, a server may send out monitor agents at a predetermined frequency, such as one monitor agent every 30 minutes.

According to another aspect of the invention a transaction terminal may be provided for use with a communications network, where the transaction terminal comprises: one or more service elements, operation monitoring facilities recording operating information associated with the one or more service elements; an I/O network interface; and an intelligent agent handler receiving intelligent agents via the I/O interface and for sending the received intelligent agents to their next destination; whereby, the received intelligent agent may be executed by the handler so that the received intelligent agent retrieves and stores operating information from the transaction terminal.

The intelligent agent may then move to a next destination that may be another transaction terminal or it may be a server that originally sent the visiting monitor agent.

According to a further aspect of the invention an automatic maintenance requesting communications network system may be provided having at least one transaction terminal and at least one maintenance terminal; whereby when a maintainer logs in to the maintenance terminal an intelligent agent service program may be sent to the transaction terminal to convey information about the maintainer and the network address of the maintenance terminal, so that in the event of a malfunction the transaction terminal is able to send an intelligent agent alert program conveying a maintenance request to the maintenance terminal.

By virtue of this system, a malfunctioning transaction terminal may be able to determine if there is a maintainer available to repair the malfunction, and if a maintainer is available, the transaction terminal is able to send a request (e.g., using an alert agent) to the maintainer.

The maintainer may be a service engineer, a local designated employee or official, or an automated assistance system.

Preferably, the maintainer information may include details for ranking the priority of the maintainer. These details may include the type of malfunctions the maintainer can repair, for example card reader malfunctions, cash drawer malfunctions, receipt printer malfunctions and such like. The details may also include an indication of the geographical location of the maintainer, for example whether the maintainer is local or remote; and whether the maintainer is a primary contact or should only be contacted if there is no primary contact. Using information of this sort, if there are a plurality of maintainers available, the transaction terminal may be able to rank the available maintainers into a preferred visiting order according to the malfunction, the location of the maintainer, and other such details. The transaction terminal may thus be able to generate a list of maintainers to be visited by the alert agent, where the first maintainer on the list has the highest ranking.

Preferably, if a maintainer declines to perform the repair or if a maintainer fails to respond to the alert agent within a predetermined time period, the alert agent travels to the next maintainer on the list. If the last maintainer on the list has been visited without any maintainer responding to the alert agent, the alert agent may re-visit the first maintainer on the list. In some embodiments, the alert agent may only have a predetermined lifetime, after expiry of which the alert agent becomes inactive.

According to another aspect of the invention a transaction terminal may be provided for use in an automatic maintenance requesting communications network, where the transaction terminal may comprise: an intelligent agent handler; operation monitoring facilities detecting malfunctions; and a service agent registry; whereby, in use, the intelligent agent handler may receive and execute intelligent agent service programs which store maintainer information and maintenance terminal information in the service agent registry, so that on detecting a malfunction the operation monitoring facilities are able to provide the handler with information relating to one or more maintainers from the service agent registry for use in creating an intelligent agent alert program for sending to the one or more maintainers.

Preferably, the operation monitoring may select a plurality of maintainers and prioritize these selected maintainers so that an alert agent may visit the selected maintainers in the prioritized order.

According to another aspect of the invention a method may be provided for communicating intelligent agent programs through a communications network comprising a plurality of interconnected network sites, the network having a server at one network site and a transaction terminal at another network site, the transaction terminal having at least one service element, where the method comprises the steps of: monitoring the service element to derive operating data relating to an operating parameter thereof and; and launching from the transaction terminal to the server an intelligent agent program carrying the operating data.

These and other aspects of the invention may be variously incorporated in networks using transaction terminals implementing Thick or Thin Client architectures. A Thick Client architecture is the more traditional one in which transaction terminals comprise a central processor, a local main storage facility such as a hard disk, and the central processor is responsible for execution of application software and control of peripheral service elements such a user interface, a card reader, a receipt printer or a cash dispenser or the like. Using a client/server mode of operation the transaction terminal (the client) may download operational and application software from a regional or central server (the server) for local storage and execution. The Thin Client architecture, a more recent proposal for networked computers (NCs), is similar but eliminates the main mass storage at the terminal. Application software is instead downloaded by the server for retention in and execution from the terminal's volatile executive memory. Peripheral service elements are still generally controlled by the terminal's central processor executing the application software.

Alternatively, the inventive concepts may be used in conjunction with an Ultra Thin Client (UTC) architecture in which the transaction terminal comprises peripheral service elements that can communicate with each other and/or with the server. By also using an Ultra Thin Team Application (UTTA) application architecture, the application functioning can be distributed across the different elements that are event driven and operate as a team via peer to peer addressed or broadcast communications. Each element may generally have its own processing capability and be able to independently interact with the server much in the same fashion as a Thin Client NC. Further details regarding UTC and UTTA type systems may be found in the inventors' commonly assigned U.S. patent application entitled "Transaction Processing Systems," filed on even date herewith, which has been incorporated herein by reference.

BRIEF DESCRIPTION OF THE DRAWINGS

The invention will now be described, by way of example, with reference to the accompanying drawings in which:

FIG. 3 is a block diagram of elements of an intelligent agent program that is communicated through the network of FIG. 1;

FIG. 4 is a block diagram of the server from the network of FIG. 1 in more detail;

FIG. 5 is a flowchart illustrating the steps implemented by an agent handler in receiving and forwarding a monitor agent;

FIGS. 11A to 11C are schematic block diagrams of a petrol station site including an ATM and a POS terminal;

FIG. 16 is an exemplary listing of Java code for performing a Tally class searching function within a networked transaction terminal module to assess error or other state information for logging purposes and for triggering of alert agents, according to one possible embodiment of the invention;

FIG. 19 is an exemplary listing of Java code for use on a regional server for processing of information gathered by returning monitor agents, according to one possible embodiment of the invention;

FIG. 20 is an exemplary Replenisher's Details form screen window interface for log in by service personnel who can service transaction terminals on a connected network, according to one possible embodiment of the invention;

FIG. 22 is an exemplary listing of Java code for use on a regional server for maintaining a local of Replenisher's Details for use by intelligent service agents as a source of servicing information for communication to transaction terminal elements on a computing network, according to one possible embodiment of the invention;

FIGS. 24A and 24B show an exemplary listing of Java code for execution at a servicing person's station for processing of information from incoming alert agents, according to one possible embodiment of the invention;

FIG. 25 is an exemplary Assistance Request form screen window interface, for use by service personnel to accept or reject service requests from incoming alert agents, according to one possible embodiment of the invention;

FIG. 26 is an exemplary Action Details form screen window interface, for use by service personnel to access more detailed information from incoming alert agents, according to one possible embodiment of the invention;

FIG. 27 is a block diagram of an exemplary network structure for reporting of error and other state information data, according to one possible embodiment of the invention;

FIG. 28 is an exemplary listing of Java code for use on a regional server to add information to an array of error or other state information details maintained at the server for managing services to transaction terminal elements on the network, according to one possible embodiment of the invention;

FIG. 29 is a depiction of an exemplary ATM icon and monitoring spot for display to servicing personnel, according to one possible embodiment of the invention;

FIG. 30 is a depiction of an exemplary ATM error condition icon for display to servicing personnel at the monitoring spot shown in FIG. 29, according to one possible embodiment of the invention;

FIG. 31 is a depiction of an exemplary control panel fix button for display to servicing personnel, and used by the service person to activate notification to the network that an associated error condition has been fixed, according to one possible embodiment of the invention;

FIG. 32 is an exemplary Java code listing of main code used for server initialization in various classes of prototype application software for implementing one possible embodiment of the invention;

FIG. 33 is an exemplary Java code listing of server routines used in various classes of prototype application software for implementing one possible embodiment of the invention;

FIG. 34 is an exemplary Java code listing of client routines used in various classes of prototype application software for implementing one possible embodiment of the invention;

FIGS. 35A to 35G show listings and descriptions of functional blocks and associated classes used for prototype application software referenced in FIGS. 32 to 34 for implementing one possible embodiment of the invention;

DESCRIPTION OF THE PREFERRED EMBODIMENTS

Example 1

Figure 1:
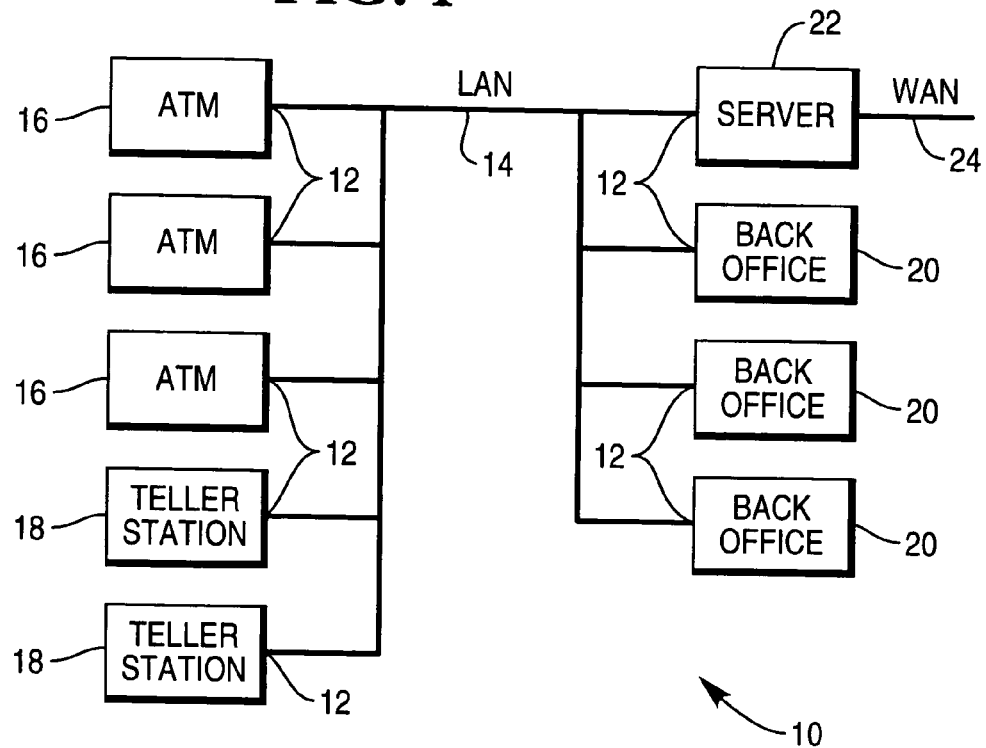
FIG. 1 is a schematic block diagram of a bank branch network according to one embodiment of the invention.

Reference is first made to FIG. 1, which shows a communications network 10 in the form of a local area network (LAN) within a bank branch. The LAN 10 communicates using messages in the TCP/IP format. The LAN 10 has nine network terminal sites 12 mutually interconnected by a LAN bus 14. A transaction terminal (such as an ATM or a teller station), a maintenance terminal (such as a back office terminal), or a server may be connected to each of the network terminal sites 12.

Of these nine network sites 12, three sites 12 are connected to ATM terminals 16, two sites 12 are connected to teller station terminals 18, three sites 12 are connected to back office terminals 20, and one site 12 is connected to a server 22.

A connection is made from the server 22 to a wide area network bus 24 to link the LAN 10 with a WAN (not shown). The server 22 maintains a record of the IP address of each transaction terminal and maintenance terminal connected to the LAN 10.

Figure 2:
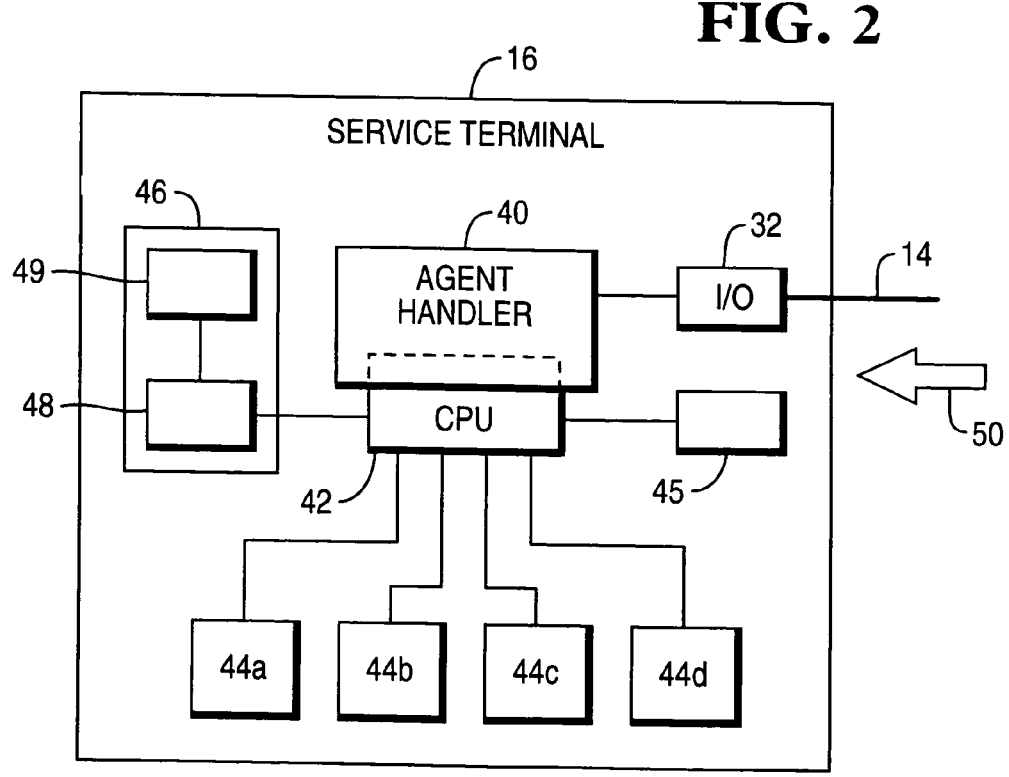
FIG. 2 is a block diagram of a transaction terminal from the network of FIG. 1 in more detail.

FIG. 2 is a diagram of an ATM terminal 16. The ATM 16 is connected through a physical I/O interface 32 to the bus 14 of FIG. 1 and includes an agent handler 40 for receiving intelligent agents (illustrated by arrow 50) from the LAN 10 via I/O interface 32, and for launching intelligent agents into the LAN 10 via I/O interface 32. The agent handler 40 is implemented by software executed on a processor 42 within the ATM 16. Agent handler 40 is shown overlapping processor 42 because the handler 40 receives intelligent agents 50 and allows them to run on the processor 42 but only within the context of the handler 40. This ensures that an agent 50 does not have unrestricted access to the ATM 16.

The agent handler 40 has an IP address (which is the IP address of the processor 42 on which the agent handler software is executing) and a port number (which represents a logical channel in the processor 42). The IP address is the network site address, and may be shared by different agent handlers 40 because a plurality of agent handlers 40 may be executing on a single processor 42. However, if two or more agent handlers 40 are executing on the same processor 42, each agent handler 40 has a unique port number (i.e. each agent handler 40 is monitoring a different logical channel in the same processor 42). Thus, no two agent handlers 40 in the LAN 10 have the same IP address and port number. An agent handler 40 monitors its port number to detect an incoming intelligent agent.

The ATM 16 has four service elements 44 in the form of a user interface 44a, a card reader 44b, a cash dispenser 44c, and a receipt printer 44d. The ATM 16 also has a service agent registry 45, and operation monitoring facilities 46 comprising a service element monitor 48 and an associated service registry 49. The service element monitor 48 interrogates the service elements 44 to obtain operating information relating to service elements 44 in the ATM 16. The operating information includes state of health information. The service element monitor 48 is located and arranged so as to provide operating data which indicates the state of health of the ATM 16 by monitoring the operations being carried out by the service elements 44, such as the transport of currency. The service element monitor 48 stores the information in the registry 49.

FIG. 3 illustrates an intelligent agent 50. Intelligent agents are a class of software consisting of code and data that can be transmitted around network computing environments.

An intelligent agent 50 may be used for a variety of purposes including monitoring the operations of the ATMs 16 and the teller stations 18 on the LAN 10, updating information held by the ATMs 16 and teller stations 18, and alerting back office terminals 20 and/or the server 22 to any problems, as will be described below.

Agent 50 is composed of packets of digital information divided into fields 52, 54, 56 and 58. The agent 50 includes a header and source address field 52. The source address indicates the IP address associated with the transaction terminal 16, terminal 18, maintenance terminal 20, or server 22 which launched the agent 50 into the LAN 10, and the port number associated with the application (as will be explained below) that generated the intelligent agent 50.

An address field 54 includes sub fields 54a, 54b . . . 54n each of which may contain the IP address and the port number of an agent handler 40 in a target transaction terminal 16, terminal 18 or maintenance terminal 20. The agent 50 is thus able to carry a visit list of sites 12 to be visited, the visit list including a minimum of one network site IP address and one port number. The list inherently indicates the order in which the sites 12 are to be visited because the address in sub field 54*a* is visited first, then the address in sub field 54*b*, and so on.

A code and data field 56 includes program instructions for the transaction terminal 16,18, maintenance terminal 20, or server 14 to be visited by the agent 50. A registry field 58 records data collected by the agent 50 from the terminals 16,18 visited.

Referring back to FIG. 2, in use, agent handler 40 handles an intelligent agent in the following way. The handler 40 receives an intelligent agent 50 and assembles the code contained in the code and data field 56 of the received agent 50 so that the assembled code can be executed by the processor 42 within the transaction terminal 16, or terminal 18. Agent handler 40 also performs other functions as required, for example, retrieving data from the service element monitor 48 which is requested by an intelligent agent 50, processing the retrieved service log data for storing in an intelligent agent 50, and storing data provided by a received intelligent agent 50, as will be described in more detail below.

FIG. 4 is a block diagram showing server 22 in more detail. Server 22 provides transaction processing capabilities for the ATMs 16 in the LAN 10, and also provides access to and from the WAN (not shown) via bus 24 (FIG. 1). The server 22 includes an I/O interface 132, an agent handler 140, a processor 142, an IP address and port number registry 170, a state-of health monitor 172, and transaction processing hardware/software 174.

Agent handler 140 is very similar to agent handler 40, the main difference being that agent handler 140 does not retrieve data from a service log; whereas agent handler 40 does retrieve data from a service log. As the agent handlers 40 and 140 are implemented in software there will only be a small difference between the code used for handler 40 and the code used for handler 140.

The IP address and port number registry is accessed when the agent handler 140 is constructing an intelligent agent for sending out on the LAN 10.

Server 22 stores the IP address of each network site 12 in the IP address registry 170. The IP address registry also stores the port number associated with each agent handler 40 or 140.

The state of health monitor 172 is implemented by software which is executed on the processor 142 and by memory which is accessed by the software. The monitor 172 collates information about each ATM 16 and teller station 18, including operating parameters such as the amount of cash withdrawn from each ATM 16, the amount of cash available to a teller station 18, the amount of receipt printer paper that is left in each ATM 16, and such like information.

To collect this information the monitor 172 periodically requests the agent handler 140 to construct and launch an intelligent agent in the form of a monitor agent (illustrated by arrow 50*a*). The monitor 172 provides the agent handler 140 with an indication of the ATMs 16 and Teller Stations 18 that are to be visited by the monitor agent 50*a*.

The transaction processing hardware/software 174 is used to provide the standard functions of an ATM server.

When agent handler 140 receives a request from the monitor 172 to construct and launch a monitor agent 50*a*, the handler 140 uses IP address and port number registry 170 to determine the IP addresses of the ATMs 16 and teller stations 18 to be visited. The handler 140 then constructs a monitor agent 50*a* having appropriate information in each of fields 52, 54, 56 and 58 (see FIG. 3). The server's IP address and port number are placed in the source field 52. The IP addresses of the ATMs 16 and teller stations 18 to be visited, and the port numbers of the associated agent handlers 40 are placed in the address sub-fields 54*a*,*b*,*c*, . . . . An operational data retrieving program for retrieving operating data from the service registry 49 in each ATM 16 and teller station 18 is placed in the code and data field 56. The registry field 58 is reset so that any data that was stored in that field 58 is deleted.

The agent 50*a* is then launched by the handler 140 so that the agent 50*a* is free to roam through the LAN 10 to locate the addresses stored in its address sub-fields 54*a*,*b*,*c*, . . . .

FIG. 5 is a flowchart illustrating the steps implemented by agent handler 40 in handling a monitor agent 50*a*, from the step of receiving a monitor agent 50*a* to the step of re-launching the received monitor agent 50*a*.

Figure 6A:
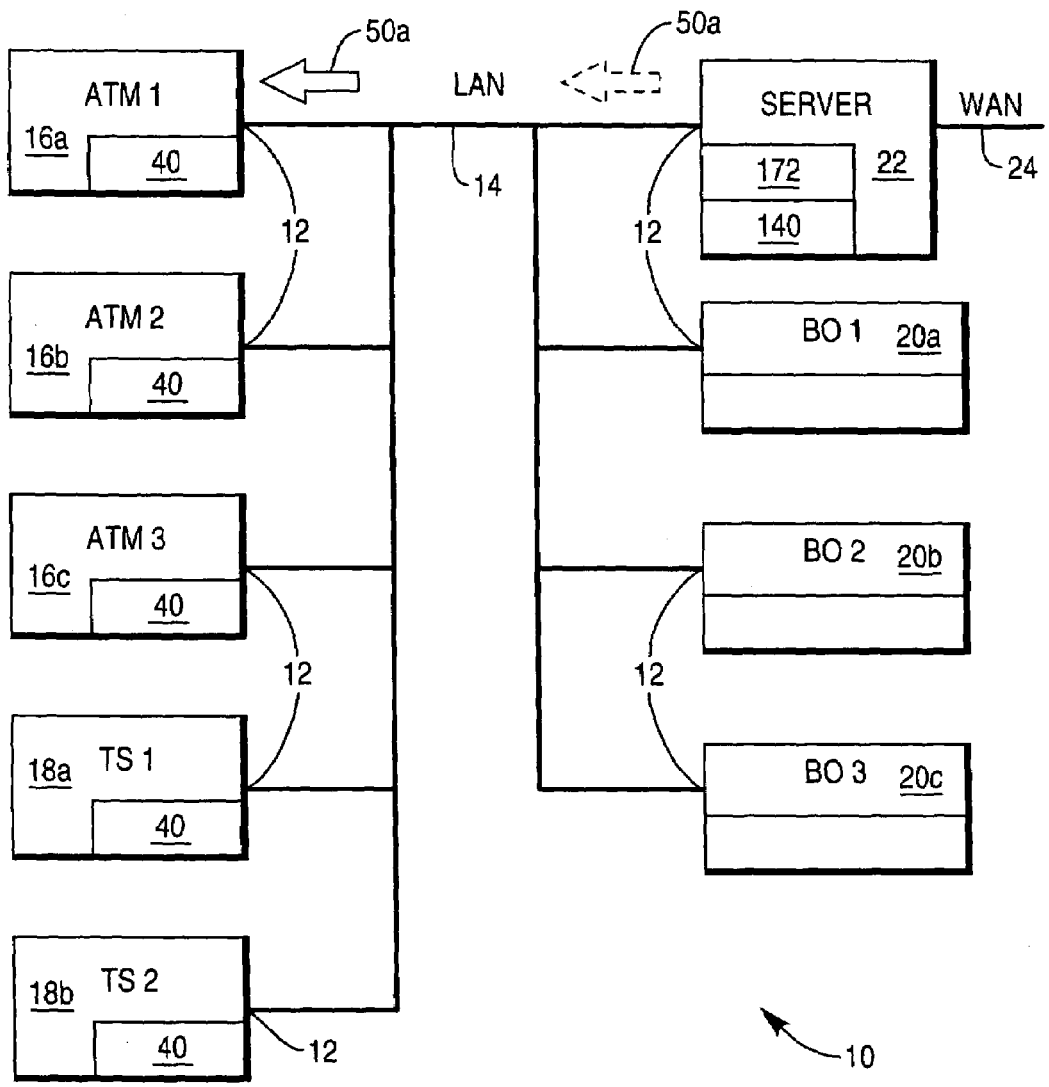
FIGS. 6A to 6C illustrate intelligent agent monitor programs used in the network of FIG. 1.
Figure 6B:
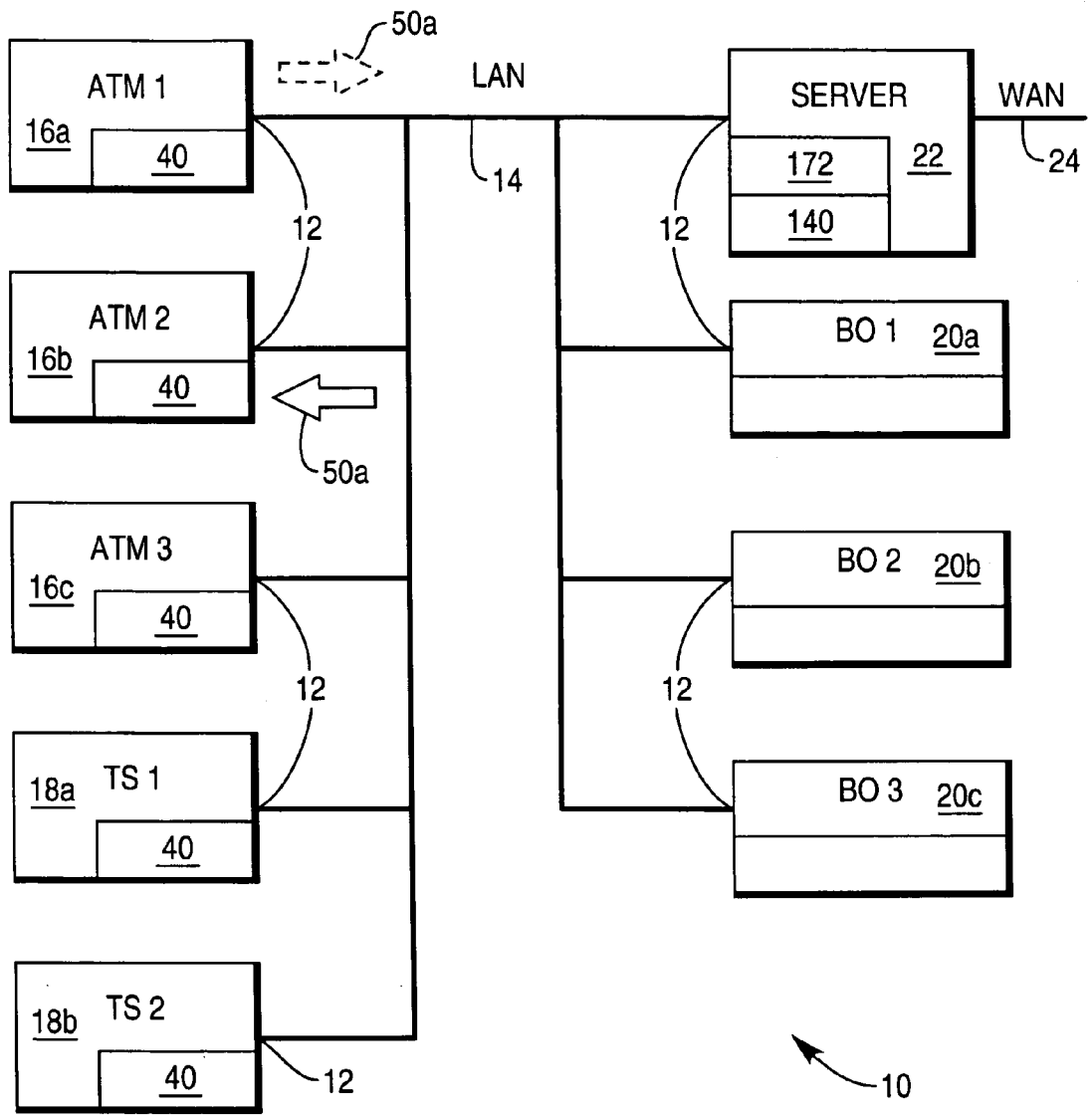
Figure 6C:
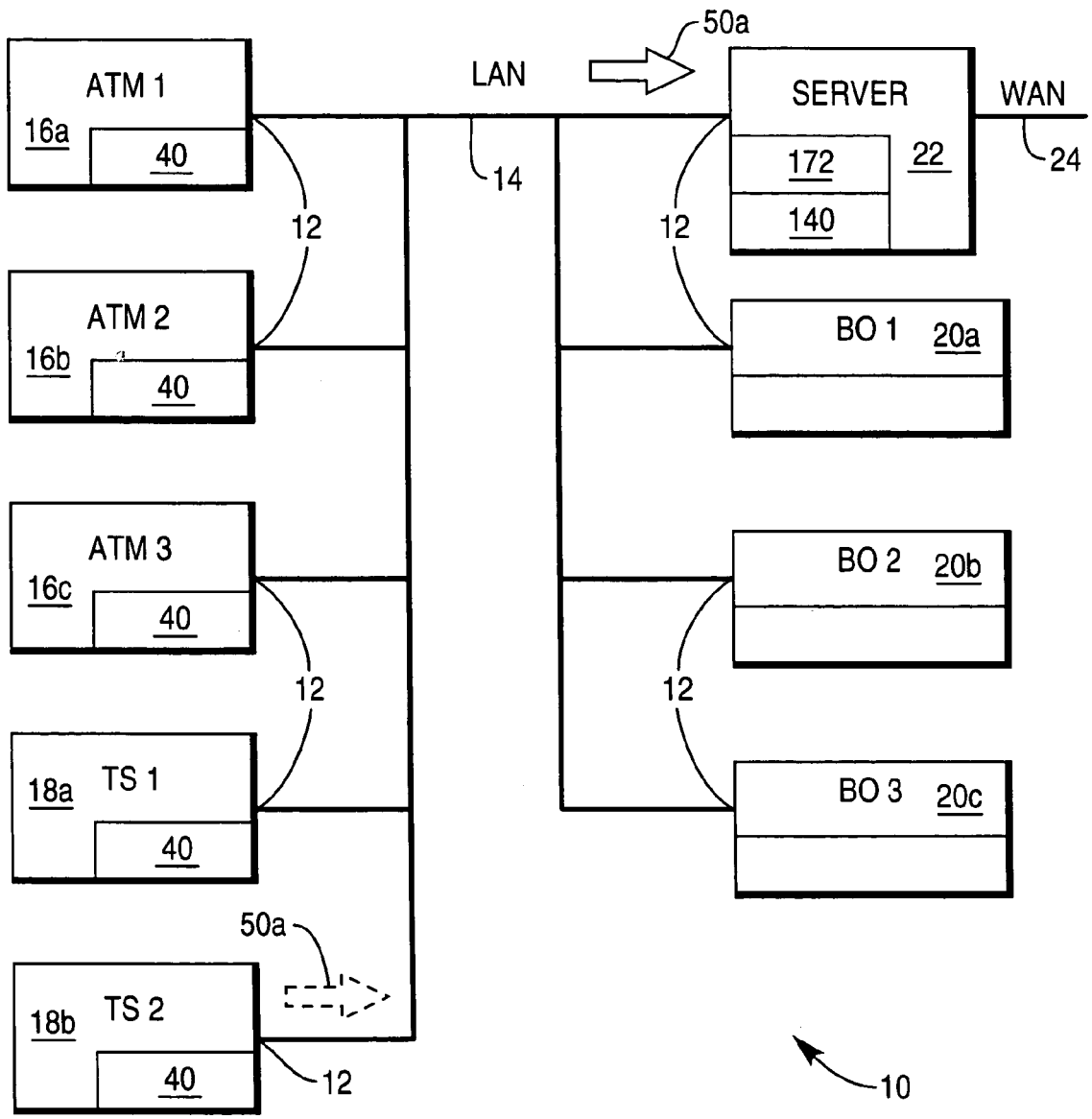

In FIG. 6A, a monitor agent 50*a* is shown as arriving at ATM1 16*a* after having been launched from the server 22. The monitor agent 50*a* is shown in full lines at its arrival point and is shown in dotted lines to represent the previous point of departure from the server 22.

Referring again to FIG. 5, upon receipt (step 180) of a monitor agent 50*a* by the agent handler 40 (via I/O interface 32) in ATM1 16*a*, the agent handler 40 confirms that the IP address targeted by the monitor agent 50*a* matches the IP address of the ATM 16*a*. The handler 40 then submits the monitor agent 50*a* to a security check (step 182) to ensure that the monitor agent 50*a* is authorized to access data in the service element monitor 48 in that ATM 16*a*.

Upon satisfactory completion of the security check, the handler 40 requests the service element monitor 48 to update the service registry 49. The operating data (in this embodiment state of health information) is captured (step 184) by the service registry 49 after the arrival of each monitor agent 50*a*.

The operational data retrieving program in field 56 of the monitor agent 50*a* is then executed (step 186) within the context of the handler 40 (i.e. in the runtime environment of the handler 40). The data retrieving program requests state of health information from the service registry 49, which is supplied by the service element monitor 48. The retrieved state of health information is then stored in the registry field 58 as one record.

Once the state of health information has been stored in the registry field 58, the monitor agent 50*a* updates its address field 54 to delete the IP address of the ATM 16 that has just been visited.

The monitor agent 50*a* is then re-launched (step 188) into the LAN 10 by the handler 40. Once re-launched into the LAN 10, the monitor agent 50*a* will visit the next transaction terminal in the address field 54.

This continues until all the locations have been visited, whereupon the monitor agent 50*a* returns to the server 22 (which originally launched the monitor agent 50*a*) to impart the state of health information obtained by traveling through the LAN 10.

Figure 7:
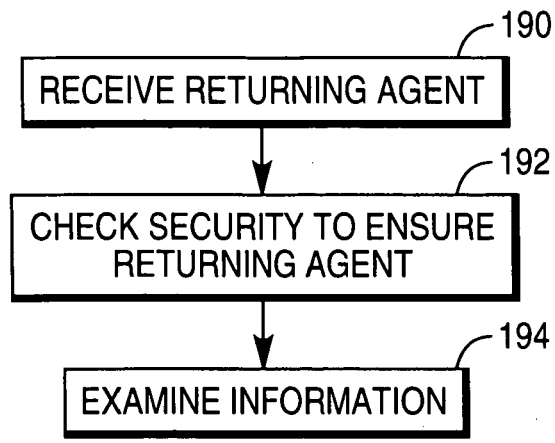
FIG. 7 shows a flowchart illustrating the steps implemented by an agent handler in receiving and examining a returning intelligent agent monitor program.

When a monitor agent 50*a* returns to the server 22, the server agent handler 140 implements the steps shown in FIG. 7. The returning agent is received (step 190) and a security check is performed (step 192) to ensure that the agent 50*a* was previously sent out by the server 22.

The registry field 58 is then examined (step 194) to retrieve the stored information. The stored information is read out of the registry field 58 one record at a time, where a record is the stored state of health information for one transaction terminal, and analyzed by the state of health monitor 172.

The state of health monitor 172 is thus able to use information provided by the returning monitor agents 50*a* to build up a dynamically changing picture of the transaction terminals in the LAN 10, identifying problem areas and scheduling replenishment and maintenance operations based upon local requirements as opposed to some overriding average as might be conducted by a centralized helpdesk approach. For example, the information can be used to schedule an appropriate time to replenish consumables in a transaction terminal.

The information retrieved from the transaction terminals (in this embodiment state of health information) is determined by the program instructions included in the code and data field 56 of a monitor agent 50*a*. This allows the state of health monitor 172 to retrieve different types of information (such as the state of health, usage of consumables, and configuration) by selecting an appropriate program for use in a monitor agent 50*a*. Thus, a monitor agent 50*a* can be configured by the monitor 172 to retrieve a desired type of information.

As well as retrieving information from the transaction terminals that they visit, intelligent agents 50 can also impart information to transaction terminals as will now be explained with reference to FIGS. 8A to 8C. Intelligent agents used for imparting service information to transaction terminals are herein referred to as service agents 50*b*.

A service agent 50*b* has the same format as agent 50. In a service agent 50*b*, the registry field 58 contains service personnel information for imparting to transaction terminals; whereas in a monitor agent 50*a*, the registry field 58 is used for collecting information from transaction terminals.

Figure 8A:
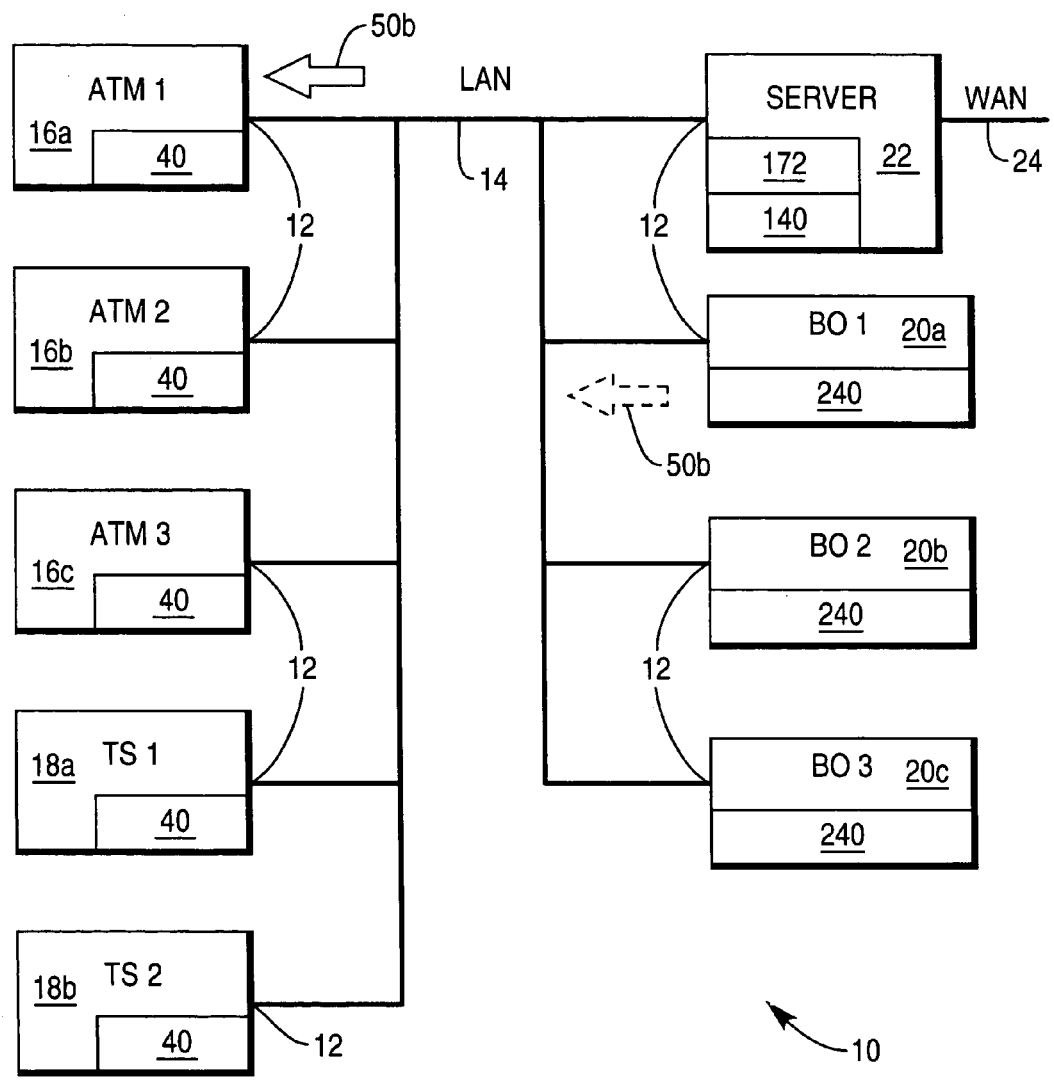
FIGS. 8A to 8C show service intelligent agent programs used in the network of FIG. 1.
Figure 8B:
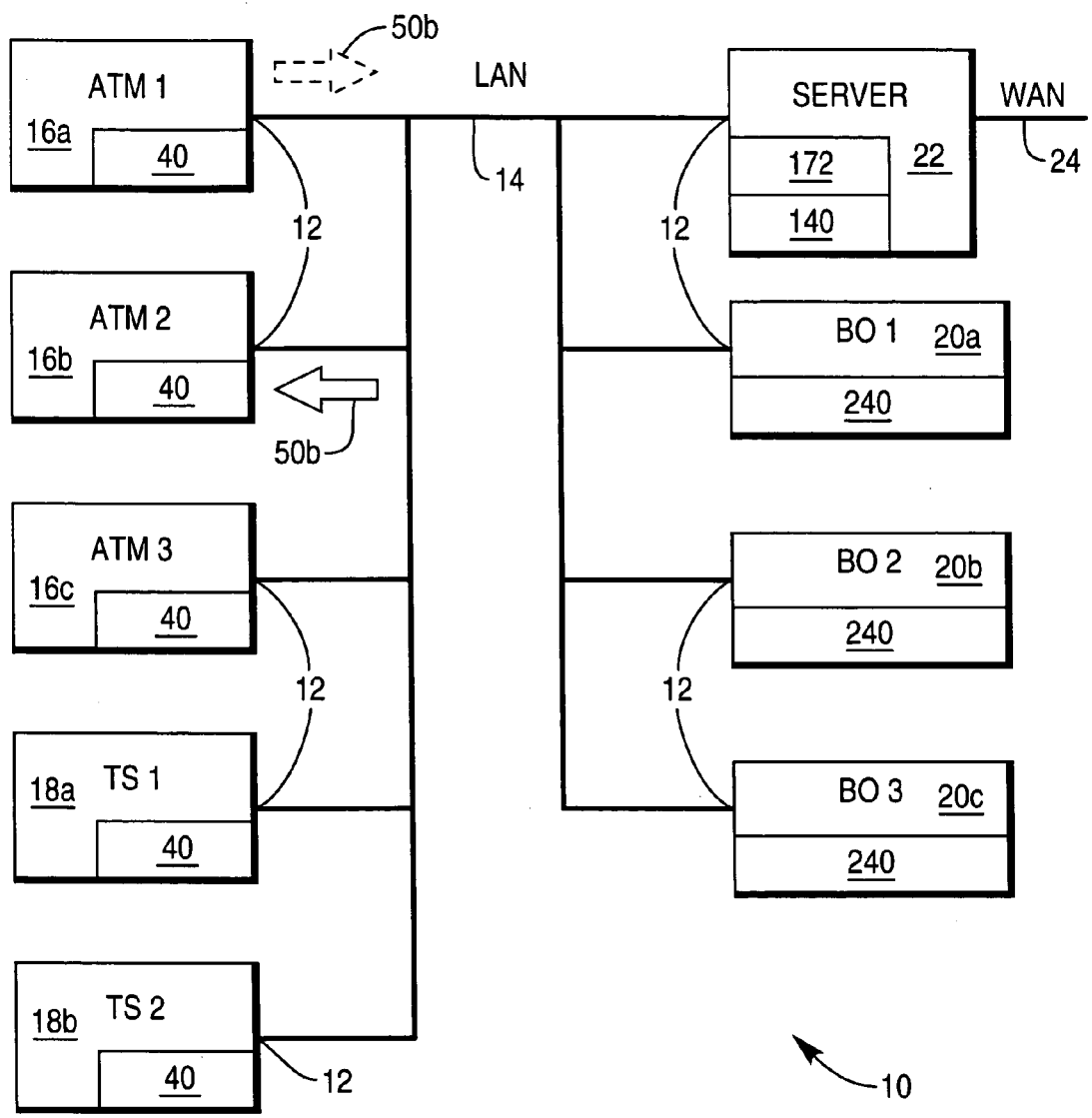

In FIG. 8A, each of the back office terminals 20 can support a maintainer, where a maintainer may be a replenisher (a person who replenishes consumables in a transaction terminal) or a field engineer (a person authorized to repair malfunctions in a transaction terminal) who can log on or off the LAN 10.

Figure 9:
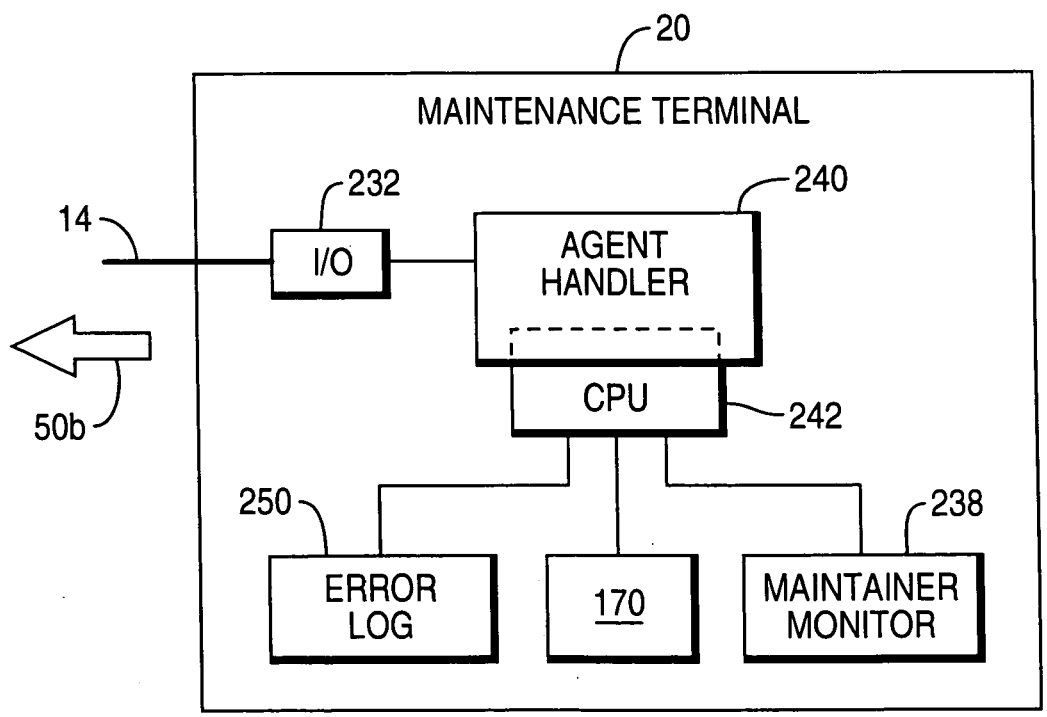
FIG. 9 is a block diagram of a maintenance terminal used in the network of FIG. 1.

FIG. 9 shows a back office terminal 20 at which a maintainer can log on to the LAN 10. When a maintainer logs on to the LAN 10 via a back office terminal (e.g. 20*a*), a maintainer monitor 238 stores information about that maintainer and instructs an agent handler 240 to prepare and launch a service agent 50*b* (via physical I/O port 232) identifying that maintainer as an available service resource to the ATMs 16 and teller stations 18 on the LAN 10.

Back office terminal 20 has an error log 250 which is used to record error information provided by a malfunctioning transaction terminal, as will be described in more detail below. The agent handler 240 is very similar to agent handlers 40 and 140.

In FIG. 8A, back office terminal 1 (BO1) 20*a* has launched a service agent 50*b* which is being received by ATM1 16*a*. The service agent 50*b* is processed by agent handler 40 in ATM1 16*a*. The service agent 50*b* is then launched from ATM1 16*a* and arrives at ATM2 16*b*. This continues so that the service agent 50*b* visits each ATM 16 and teller station 18. In FIG. 8B, the service agent 50*b* from BO1 20*a* is shown arriving at ATM2 16*b*.

When a maintainer logs into the LAN 10 via a back office terminal (e.g. 20*b*), the maintainer is asked to respond to a number of questions to provide the agent handler 240 with the necessary service and location information for the registry field 58 of a service agent 50*b*. The service and location information required typically includes details of: the authorization level of the maintainer (such as, low security for replenishing low security consumables or high security for replenishing cash); the physical location of the maintainer (local or remote to the LAN 10); the status of the maintainer (such as primary replenisher, secondary replenisher, final replenisher); and the training level of the maintainer (such as, what peripherals, if any, the maintainer can service). This service and location information is also stored in the maintainer monitor 238.

Agent handler 240 creates and launches a service agent 50*b*. The service agent 50*b* has the service and location information in a standard format in its registry field 58. Service agent 50*b* has the IP address of the back office terminal 20*b* and the port number that the agent handler 240 is monitoring in the header/source address field 52. The IP addresses of the transaction terminals to be visited are placed in the address sub-fields 54*a,b,c* . . . ; and a service update program is placed in the code and data field 56.

When a maintainer logs off the LAN 10 via a back office terminal (e.g. 20*a*), the maintainer monitor 238 updates itself and then instructs the agent handler 240 in that back office terminal 20*a* to prepare and launch a service agent 50*b* identifying that maintainer and indicating that that maintainer is no longer available as a service resource for the ATMs 16 and teller stations 18. The maintainer monitor 238 updates itself by deleting that maintainer and any associated service and location information.

In this embodiment, a WAN (not shown) is connected to the LAN 10 so that a field engineer may log into back office terminal located in the WAN (not shown). That back office terminal may send service agents 50*b* into the LAN 10 through the server 22 via bus 24.

Figure 8C:
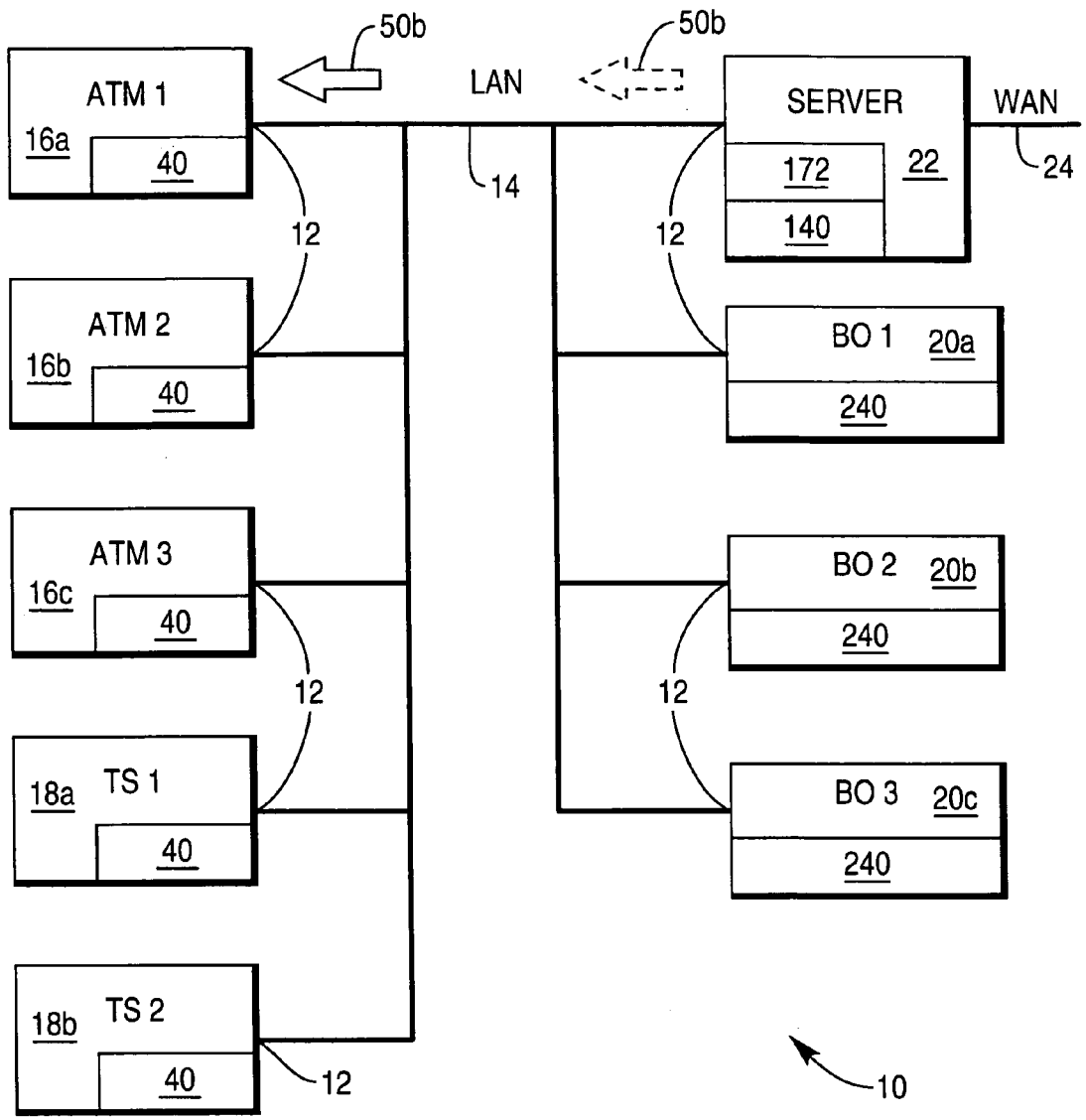

In FIG. 8C, a service agent 50*b* which has arrived via the bus 24 is shown in dotted lines as having been launched by the server 22 onto the LAN 10 and is seen in full lines as arriving at ATM1 16*a*. The service agent 50*b* from the WAN is subjected to security checks by the server 22 before being allowed to enter the LAN 10. The server 24 is configured to stop service agents 50*b* generated within the LAN 10 from entering the WAN.

When a service agent 50*b* reaches a transaction terminal (e.g. ATM1 16*a*), the agent handler 40 receives the service agent 50*b* and runs the service update program (contained in the code and data field 56 of the service agent 50*b*) in the context of the agent handler 40. The service update program compares the service and location information in registry field 58 with any service and location information stored in agent registry 45 (see FIG. 2).

If the service and location information stored in field 58 is different to that stored in agent registry 45 then the service update program updates agent registry 45 to conform to the information in field 58. Thus, each transaction terminal has an internal list (the agent registry 45) of the maintainers who are currently available in the event of that transaction terminal experiencing a critical failure. The list of maintainers includes the address of each maintainer currently available and the port number of the associated agent handler 240 for that maintainer. The use of service agents 50*b* provides a convenient way of updating the agent registry information.

If a critical failure occurs within an ATM 16 or teller station 18 in the LAN 10, the service element monitor 48 (FIG. 2) within the ATM 16 or teller station 18 experiencing the failure detects this critical failure and instructs agent handler 40 to prepare and launch an alert agent 50*c*.

The IP address and port number associated with the transaction terminal experiencing the critical failure are placed in the header/source address field 52. An alert program is placed in the code and data field 56; and details of the critical failure, for example, card reader error due to a card jam, are placed in the registry field 58. The addresses of back office terminals to be visited are placed in the address sub-fields 54*a* and 54*b*.

The agent handler 40 uses the agent registry 45 to obtain the addresses of the maintainers to be visited by the alert agent 50c. If more than one maintainer is available (i.e. if more than one maintainer is currently logged on to the LAN 10) then the maintainers are prioritized within the address sub-fields of the alert agent 50c according to one or more predetermined criteria. The predetermined criteria may be the order in which the maintainers logged on to the LAN 10. Alternatively, the predetermined criteria may be based on the location of the maintainers, so that the maintainer that is closest has the highest priority and is visited first.

Figure 10:
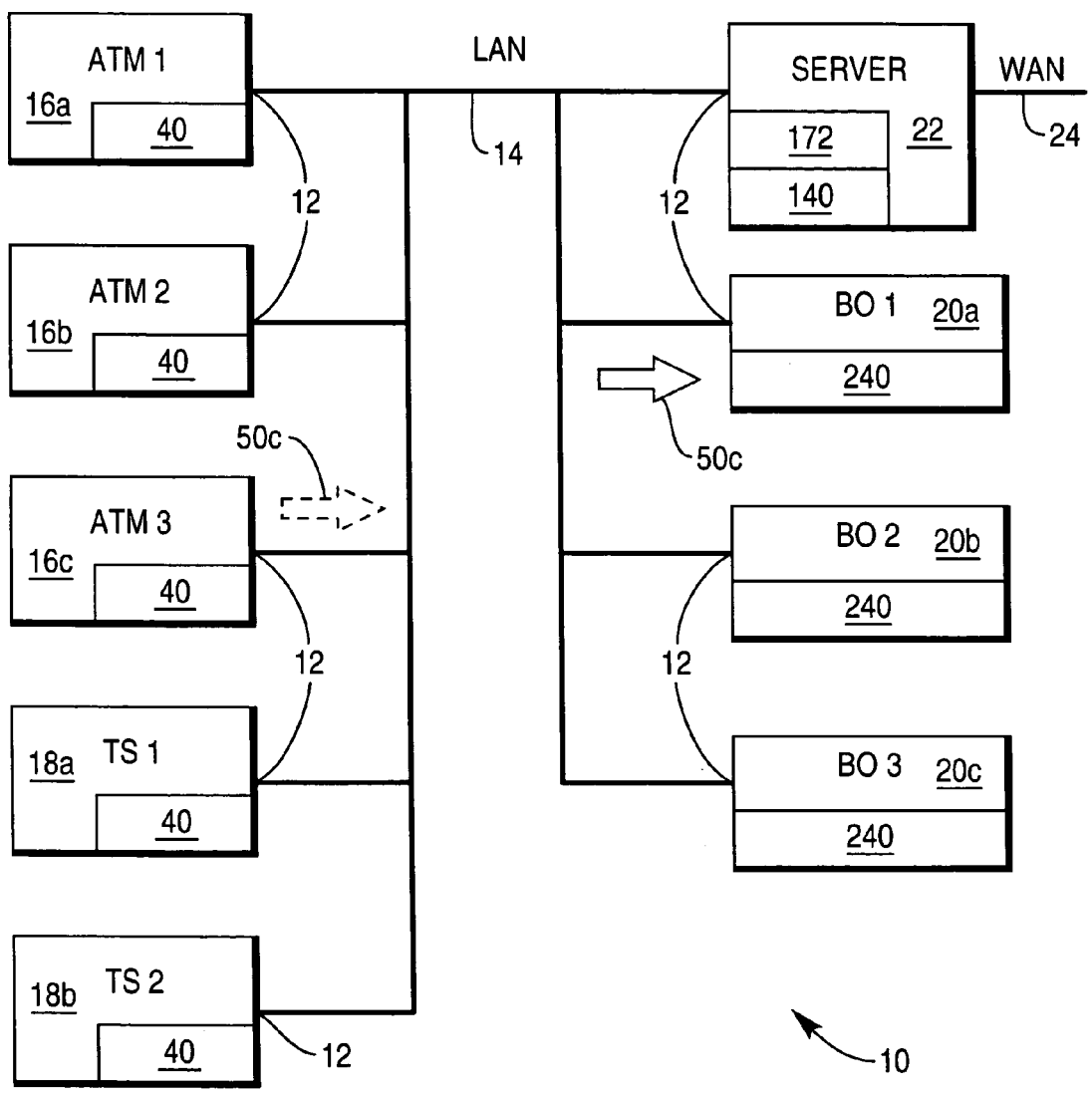
FIG. 10 shows alert intelligent agent programs used in the network of FIG. 1.

An alert agent 50c is shown in FIG. 10 as having been launched by the ATM3 16c. The alert agent 50c arrives at the agent handler 240 associated with the maintainer which has the highest priority. The alert agent 50c is shown in FIG. 10 arriving at the agent handler 240 of BO1 20a.

When the alert agent 50c reaches the back office terminal 20 with the highest priority maintainer, the associated handler 240 performs a security check on the received alert agent 50c. The handler 240 then runs the alert program that is stored in the code and data field 56 of the alert agent 50c. The alert program runs within the context of the handler 240 and queries the training and authority levels recorded (as part of the service and location information) in the maintainer monitor 238 of the terminal 20a to decide whether help is available from the maintainer at that terminal 20a.

If a maintainer is available who is trained and authorized to work on the error contained within the alert agent 50c, then the agent handler 240 presents a request for assistance on that maintainer's terminal 20. If an acknowledgment of the request for assistance is not provided within a predetermined time, such as three minutes, then the alert agent 50c moves on to the next maintainer in the address field 54.

The maintainer may not acknowledge the request for assistance for a number of reasons, for example, the maintainer may be away from the terminal 20a, or the maintainer may be assisting another ATM 16 or teller terminal 18. If the maintainer notices the request for assistance but cannot assist, for example because occupied with a customer, the maintainer can reject the request for assistance. This causes the alert agent 50c to move to the next maintainer in its address field 54 immediately.

If all of the available maintainers in the LAN 10 fail to assist, the alert agent 50c moves to the server 22 to seek assistance from maintainers on WAN (not shown). If at any point the alert agent 50c successfully summons assistance, the alert agent 50c is acknowledged by a maintainer and the critical failure information carried by the alert agent 50c is registered at the location having a maintainer capable of assisting and is stored in the error log 250 at that terminal 20.

The critical failure information includes the error type, such as a card jam, and an identification of the transaction terminal experiencing that failure. The identification may simply be a terminal number in the case where assistance is to be provided from within the environment of the LAN 10. Otherwise, the identification will include an IP address and contact information for gaining access to the malfunctioning transaction terminal.

Once an alert agent 50c has successfully summoned assistance, it returns to the originating transaction terminal, which in FIG. 10 is ATM3 16b. Alternatively, the alert agent 50c may delete itself.

Figure 11A:
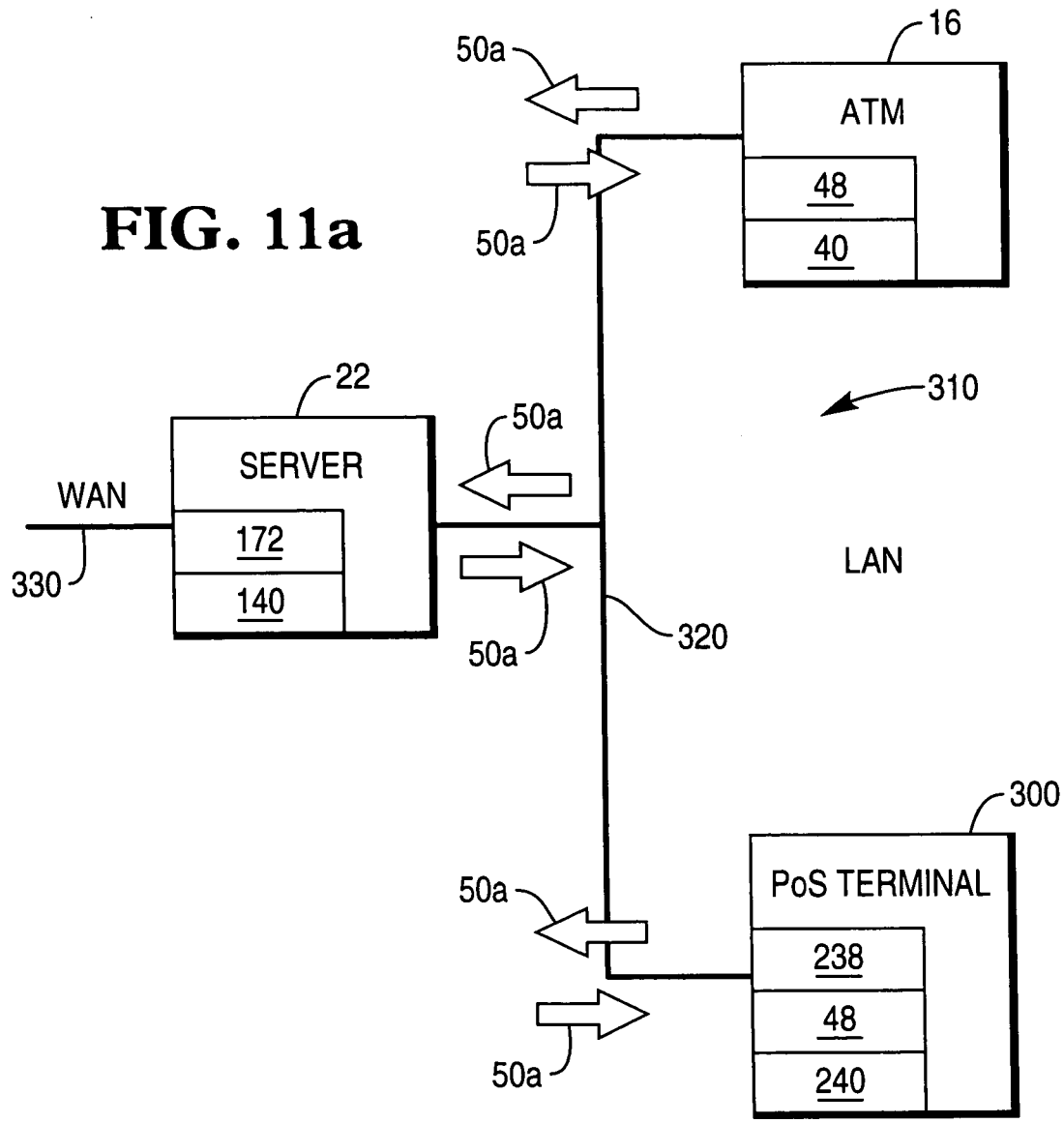
Figure 11B:
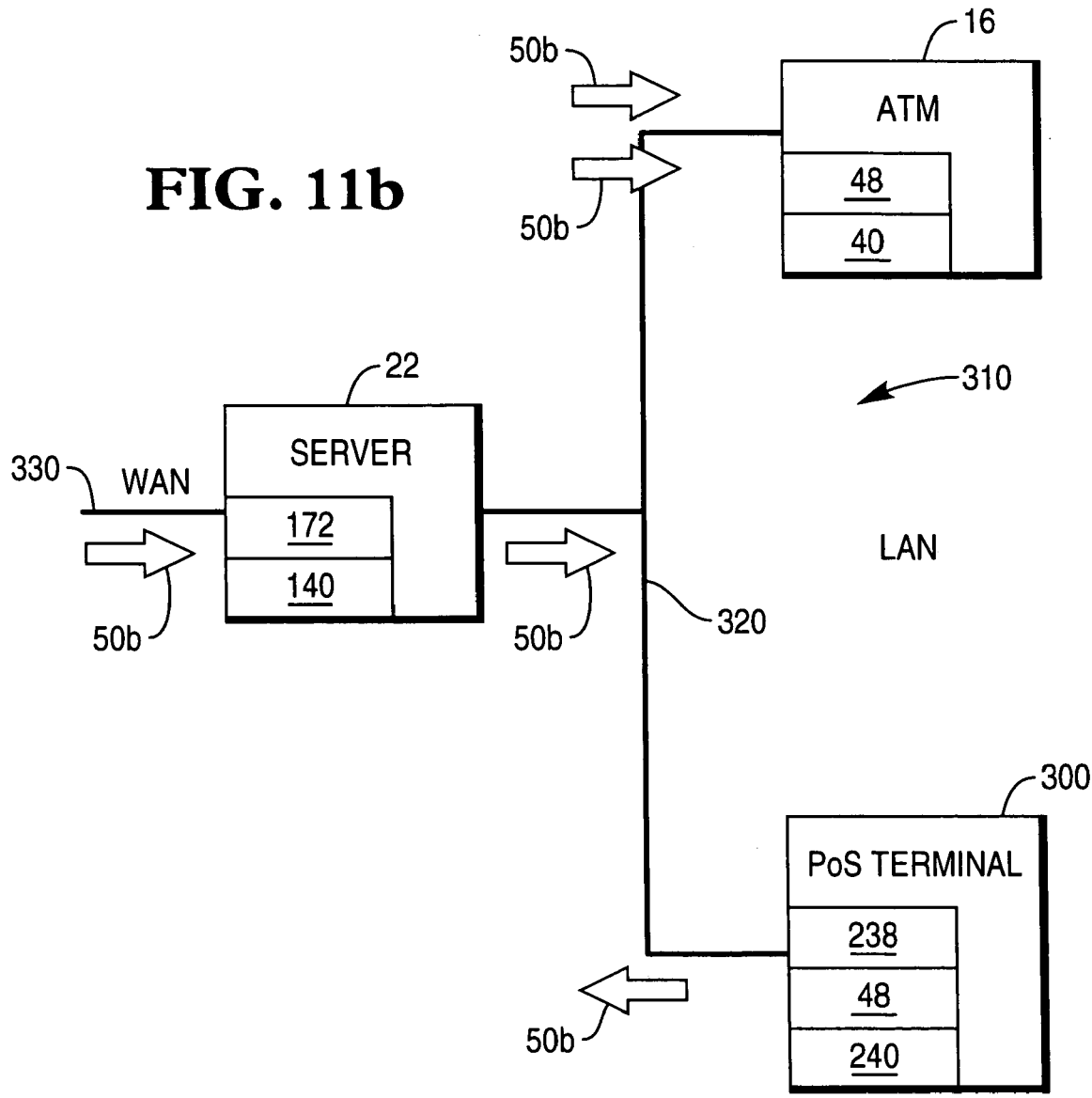

In FIGS. 11A to 11C, a petrol station site includes an ATM 16 and a point-of-sale (POS) terminal 300. The ATM 16 and terminal 300 are connected in a LAN 310 to a server 22 by means of a bus 320. The server 22 is connected into a WAN (not shown) by a WAN bus 330.

The state of health monitor 172 in the server 22 periodically sends out a monitor agent 50a to both the terminals 16 and 300 as shown in FIG. 11A for performing status monitoring and for scheduling replenishment operations. Each terminal 16 and 300 has a service element monitor 48 for monitoring the service elements within that terminal 16 or 300. This periodic state of health information gathering can be extremely important in an off-site environment where field service or security companies are likely to be used to provide cash replenishment.

The POS terminal 300 has some of the functionality previously described with reference to the back office terminal (FIG. 9) in that the POS terminal has a maintainer monitor 238, an agent handler 240, and an error log 250. The maintainer monitor 238 (as described previously) within the POS terminal 300 can instruct the agent handler 240 to send out a service agent 50b when a new user logs in, as illustrated in FIG. 11B.

A field service organization (not shown) is used to send a service agent 50b through the server 22 to register with both the ATM 16 and the POS terminal 300. Both terminals 16 and 300 can be supported by the same field organization.

A critical error occurring in the ATM 16 causes the ATM 16 to launch an alert agent 50c, as shown in FIG. 11C, which goes to the local maintainer monitor 238 in the terminal 300.

The alert agent 50c performs training and authority checks to ascertain if assistance is obtainable for the error. For simpler errors, the petrol site attendant staff (logged in to POS terminal 300) will assist. For more complex errors, the alert agent 50c will move from the terminal 300 to the server 22 to be passed out to the WAN. The alert agent 50c is used to alert a field service organization (not shown). Alternatively, the alert agent 50c may cause other communication strategies to be used such as an e-mail message, paging a local maintainer, or traditional transaction based alerting to a help desk, allowing them to call into a bank branch.

Various modifications may be made to the above-described embodiments. For example, the network architecture illustrated in FIG. 1 is intended to represent a simple bank branch but the concepts described apply equally to more complex network environments with many terminal sites. The concepts apply equally well to networks employed in environments other than banking, such as retail environments. In a retail environment the transaction terminals may be point-of-sale terminals, rather than the ATMs and teller stations shown in FIG. 1.

In other embodiments, each service element may have its own processor so that an agent handler is used for each service element, and the network through which agents roam is located within a transaction terminal, the sites of the network being the service elements.

In some embodiments, the code used for the agent handlers 40, 140 or 240 may be generic, i.e. the same code may be used for all of the agent handlers. In the petrol station embodiment, the state of health monitor may be operated from a central site communicating with a proxy server acting locally. More centralized monitoring of service elements can be conducted from the WAN (not shown) by providing an appropriate agent handler that allows monitor agents 50a to be received from the WAN (not shown). This agent handler may augment the monitor agent 50a address list 54 with the addresses of the local service elements 16 or 300 along with its own return address, before sending the monitor agent 50a to the first of the service elements 16 via bus 320, where the normal internal monitor agent 50a behavior would occur. Upon the return of monitor agent 50a to the agent handler in server 22, the agent handler may then send monitor agent 50*a* to the next address on its address list 54 over the WAN (not shown).

In other embodiments, the server 22 may be integrated with a transaction terminal, so that a transaction terminal performs the functions of a server. In other embodiments, the functions of a transaction terminal and a maintenance terminal may be combined. In yet another embodiment, the functions of a server, a transaction terminal, and a maintenance terminal may be combined; so that while acting as a server the terminal may send out monitor agents, while acting as a maintenance terminal the terminal may send out service agents, and while acting as a transaction terminal the terminal may send out alert agents. In other embodiments, the maintainer may not be a human person, the maintainer may be a computer-based system for coping with malfunctions.

Example 2

While aspects of this invention pertaining to Intelligent Agents and Embedded Web Server technology are described in the context of an Ultra Thin Client (UTC) transaction processing environment, many of the techniques discussed are not limited to that environment and may be implemented within other architectures.

The Ultra Thin Client transaction processing environment is aimed at creating individual transaction terminal (e.g., ATM) modules such as a card reader in discrete, e.g., Java based, modules using, for example, an Ultra Thin Team Architecture (UTTA) as the application environment. This UTC environment provides for application and hardware control on an individual module basis, where software classes can be provided that generate logs, tallies and state of health information. Two techniques are proposed to provide convenient and appropriate access to this error information, Intelligent Agents and Embedded Server technology.

The architectures implemented can be used, for example, in networked branch environments where Thin Client based ATMs, teller stations and back office systems use a central server for transaction processing and to support advanced facilities such as terminal logging and State of Health Monitor function. Each module of the ATM using the UTTA architecture can conveniently support both Agent Handler and Embedded Server capabilities. Servicing personnel, e.g., in the back office, can be automatically registered as available as they log in each day.

Intelligent Agent techniques allow Agents in the form of software routines such as Java objects to be transmitted between different computing elements on a network, allowing new code to enter an existing element, run in order to perform some data gathering exercise and then as appropriate move on, e.g., to the next element in a list of places to visit. These agents can provide a monitoring function by regularly moving round the network of terminal modules looking for errors. By harvesting actual usage information these monitor agents can be used to provide for replenishment scheduling. Service agents can be used to inform all modules active in the network of the identity of available serving personnel. In case of critical failure (e.g., one requiring some immediate or near term attention) modules can then send out Alert agents to indicate that an error has occurred within a module. These agents can be sent to the various registered personnel in order to find someone who is trained, authorized and available to assist in servicing. The alert agents are preferably intelligent agents capable of moving around the network on their own in order to carry out their prescribed task. Information relating to non-critical errors or failures can be held at a module (e.g., not passed along by an Alert Agent) for later access by other types of agents, such as a Monitor Agent, as will be described.

Having identified a service person that can help a module or ATM that has a critical error of some sort, that individual can then access the embedded server of the ATM in order to obtain more details. This can be achieved by providing a Web server at a central server, which standard Web browsers at the service person's back office or more remotely located terminal can access. Using standard Web protocols and Java applets it is possible to provide a number of interface types to designated field engineers or other servicing personnel. Such applets are code that at run time can change a window on an HTML page as may be viewed by a Web browser on a variety of computing platforms.

The Web based Java applets can access the central server for information, which the central server can obtain from the individual modules of the ATM. Supported embedded servers within the modules can be capable of retrieving the module specific logs, tallies and state of health information in response to states within a module or external queries or requests. It is possible to provide for immediate error notification on an associated Web page, through the Java applets if they are enabled.

Demonstrations of these technologies have been developed in Java that illustrate the use of embedded Web server techniques and intelligent agents. These graphically illustrate the power of standard browsing techniques and the utility of intelligent agents as a new mechanism for monitoring ATM modules and providing a means to provide for early indication of potential failures either through usage of consumables or through critical failures such as card jams.

An aim of this invention is to enhance the services that an ATM or other networked transaction terminal can provide to its users. Terminal servicing is traditionally performed by various types of servicing personnel, which may be a field engineer or other trained professional that can fix mechanical failures within a terminal, or may be a locally resident back office employee, such as a branch bank official responsible for carrying out daily maintenance tasks on an ATM. To date this job is not always enjoyed by back office personnel who may have other primary responsibilities and only very basic training in terminal servicing. Therefore, one of the objectives of this invention is to present terminal state and error information in a simple and stress free manner.

The inventive concepts include two areas, called the Agent Based Monitoring concept and the Embedded Web Server concept. These two technology concepts are individual in many ways but when connected, provide an excellent ATM or other terminal monitoring and reporting solution. An aim of the invention is to detect critical errors as soon as they occur, notifying servicing personnel and informing them of exactly what is wrong. All of this can be done as quickly as possible and in a simple and effective manner.

Ultra Thin Client Architectures

The invention can be readily embodied within an Ultra Thin Client terminal/network architecture that employs Java based techniques to implement the transaction terminal as a collection of individual modules or peripheral devices operating through communications with each other or with a central server. The modules can be implemented as discrete Thin Client devices functioning as a team through peer-to-peer communications and separate event driven software components providing an application software architecture called the Ultra Thin Team Architecture (UTTA). While the techniques discussed in this example were designed to operate within this environment for purposes of a prototype application to be described, it is equally possible for them to be incorporated within alternative environments.

Error Logging

Within a transaction terminal, such as any ATM, there may exist processes that will monitor the terminal's usage. This may involve an error detection procedure where every time an action is taken by the terminal, the action is recorded. This process is called error logging. The logging can include anything, from storing an amount of money dispensed from a particular cash cassette to indication of a customer's card passing over a particular sensor. A log may be represented by a stored value indicating the number of times terminal has produced specific error condition or related mnemonic, e.g., the mnemonic PRINT_LO may be an abbreviation indicating a printer ribbon has nearly run out. The stored Log may represent the number of times the corresponding error condition mnemonic or Tally had occurred. Therefore, inside the traditional transaction terminal there may be an abundance of untapped and highly valuable data. All this information can be useful in detecting what has gone wrong with a terminal or predicting when components or supplies will need replacement. If the data could be readily accessed it could result in a reduction in down time, thus saving money in terms of operational profitability, cost of ownership and servicing. As terminals such as ATMs may be operated to be nearly always functional, the techniques described in this example have particular importance by allowing problems to be identified immediately when they do occur by giving staff the opportunity to quickly respond.

Intelligent Agents

Intelligent agents are proposed as a means to obtain and communicate error log and state of health information. These agents have the ability to access the transaction terminal data and act upon the results they obtain. The illustrative agents described in this example consist of three types, monitor agents, service agents and alert agents, each of which has its own unique roll to play. Each UTTA terminal module can incorporate an agent handler or server routine used to listen for and manipulate incoming agents (a 'server' in this context meaning a routine that has the ability to listen for incoming messages). The agent handler can be responsible for receiving various agents and retrieving or storing associated data. Agents can further be transmitted over the connected network in order to carryout their duties.

Embedded Web Server

An embedded Web server is a server routine used listen for incoming messages, e.g., messages sent by a regional server. It can be used to extract and transmit error data or other information for display on a Web page that the regional server makes accessible, e.g., via a standard Web browser. Each UTTA module can have its own embedded Web server component to allow access to that module's error data and other state information. Using a Web browser the information can be displayed in an easy to understand manner. As soon as anyone opens up the page the information can be displayed through a series of icons, e.g., which can be manipulated to retrieve more data.

Agent/Web Server Architecture

The agent based monitoring and embedded Web server concepts can be readily implemented in an Internet or Intranet style networked computing environment such as may be employed within a bank branch or a regional area. Transaction terminals such as ATMs can be seen as client devices (whether in a Thick or Thin client mode) with some form of central server providing basic transaction services and extensions to support the agent and embedded Web server techniques described in this example.

Regional Server

At the center of a given Intranet region is typically a server computer. A region might be as small as a single terminal with its own built in server component, or it might be a bank branch with a number of ATMs, teller stations and back office systems running off a transaction processing server that provides access to legacy host data. Alternatively the region might be of a larger geographical scale such as a city or even a country. The network architecture itself does not generally care about the size of the region. A regional or central server can be used to pass information between a terminal or a terminal module and other computing elements on the network.

A regional server in this environment can provide transaction processing capabilities, such as may be employed in traditional bank branches; however, it also generally provides various Client/Server capabilities and can provide a home for some of the monitoring and control components used by the agents and embedded Web server techniques described in this example. In the Thin Client model the server holds all of the class files used by the various client modules to conduct their activities. The server can also store configuration files associated with the users of back office systems that log-in via this server.

State of Health Monitor

Figures 12, 13:
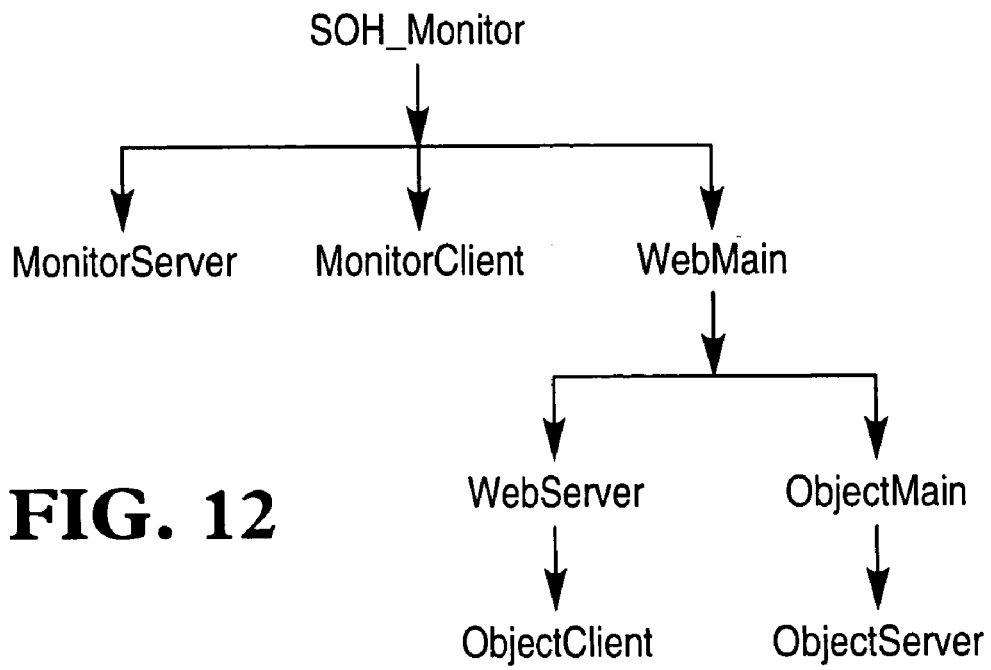
FIG. 12 is a depiction of an exemplary state of health monitor software class structure for use on a regional server for management of error or other state information from transaction terminal modules on a computing network, according to one possible embodiment of the invention.
FIG. 13 is an illustration listing of an exemplary module details software class structure for use in formatting of messages communicating error and other state information from transaction terminal modules to a regional server on a computing network, according to one possible embodiment of the invention.

A state of health (SoH) monitor can be implemented on a regional server and act as the center point for the agent and embedded Web server functioning. It may be responsible for handling agents, their functions and processing all data that is needed to display the information on an associated Web page. An exemplary software class structure for such an SoH Monitor is shown in FIG. 12. All of the illustrated classes that start with the prefix Object or Web would be responsible for handling all the information that flows between the Web page and the embedded Web server. The classes with the prefix Monitor would create and distribute the agents.

In this example, when the State of Health Monitor application is initially run only the Monitor Server starts up, as this is all that would be required initially. All the other components of the SoH Monitor would depend on external information that may only available when a first terminal, e.g., ATM, module has registered.

The Monitor Server program would function as the agent handler for the regional server and may only handle agents and terminal modules registering. It may generally read in a header string, which indicates the type of data coming in. For example, if the string is equal to "Card Reader", "Dispenser", "Printer" or "User Interface", Monitor Server would know that Module Details will be arriving next. Module Details is a generic class that would be sent out by the various terminal modules containing specific details about a module. An exemplary Module Details class structure is shown in FIG. 13.

Figure 14:
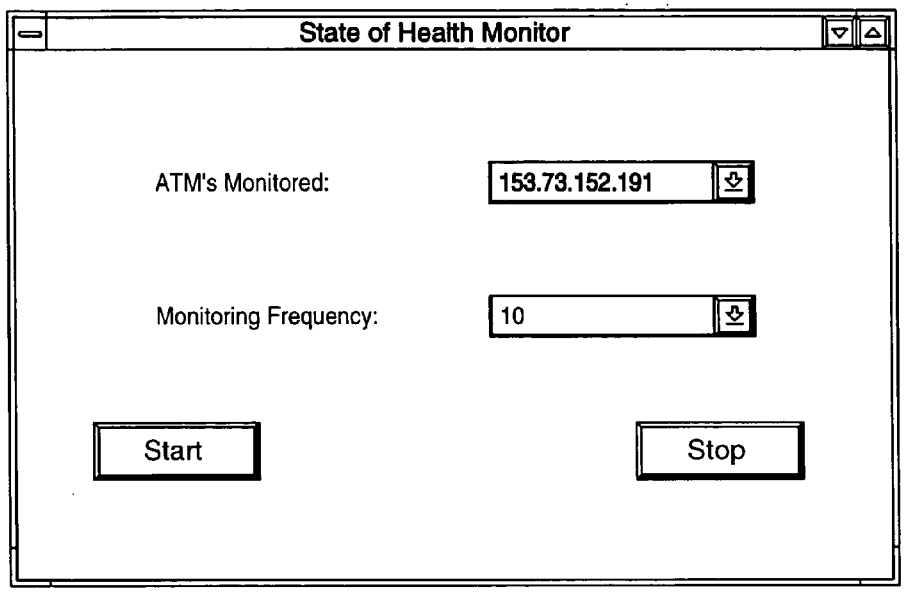
FIG. 14 is an exemplary State of Health monitor screen window interface for management of error or other state information from transaction terminal modules on a computing network, according to one possible embodiment of the invention.

Once a module's location details had been obtained, they could be added to a vector array that stores all module details for later use. The application may then display a Monitor Screen such as shown in FIG. 14.

This Monitor Screen interface could be used to control the monitoring frequency, that is the time interval between the Monitor Agents being sent out. This could be changed by using the 'Monitoring Frequency' drop down menu. The 'ATMs Monitored' drop down menu, is could be used to display ATM terminal modules that have registered with the regional server. The Start button could be used to start a thread that would send out the monitor agents after a period of time.

The Start button could function by creating an instance of the Monitor Agent class and initializing it with the various modules' location details (e.g., Internet addresses and Agent Handler Port Numbers). It would then create an instance of the MonitorClient class and use this to send out the monitor agent. The Stop button could be used to stop the thread from running and the monitor agents being sent out.

If a new module registers and there is already a service person registered, the new terminal module could automatically be sent the information about who can service it. If a service person logs in before a terminal module has connected, the MonitorServer could create a sleep mode thread and run it, causing the system to sleep until a module registers. As soon as a module registered the cycle would be broken and the program would continue as desired. The associated thread class is called WaitAWhile.

As stated before the regional server may not only be responsible for handling agents, it may also play a big part in the passing of relevant servicing information on to a Web page. This side of the regional server will be explained in more detail in the Error Reporting section of this example.

ATM Modules

Figure 15:
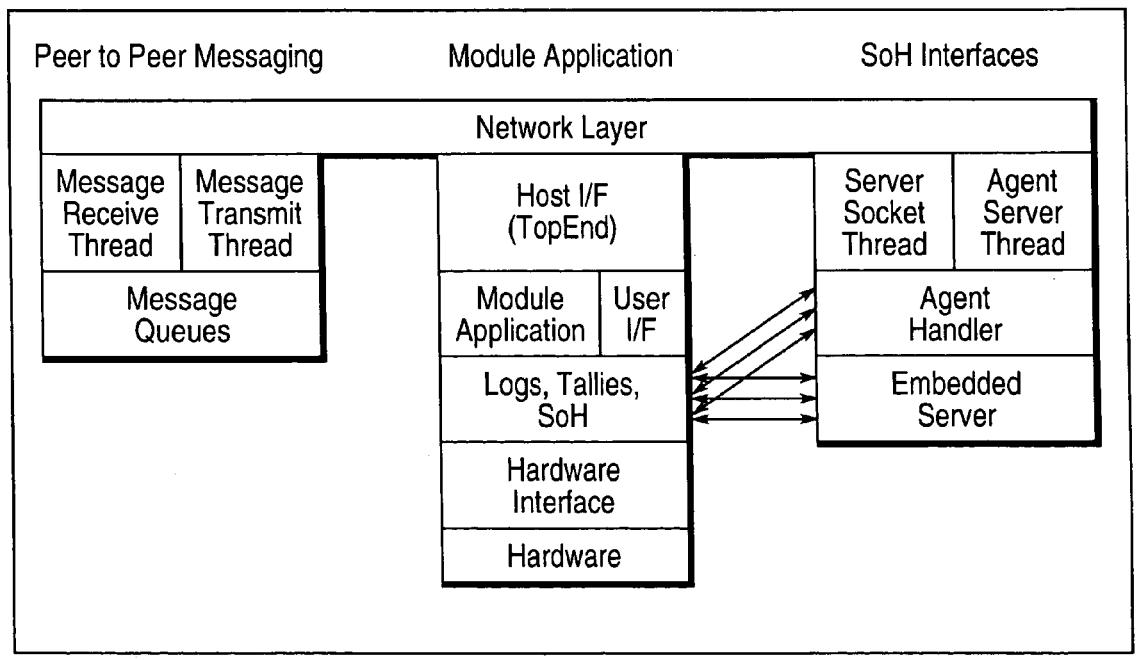
FIG. 15 is a diagram illustrating exemplary functional blocks and interfacing for use in operation and control of a UTTA type networked transaction terminal module, according to one possible embodiment of the invention.

Within the Ultra Thin Client architecture, an ATM may be broken up into its individual modules (User Interface, Card Reader, etc.) with each module running its own section of the overall ATM application and controlling and monitoring its specific hardware. FIG. 15 illustrates functional blocks and interfaces for an exemplary terminal module using an associated UTTA software architecture.

FIG. 15 shows a peer-to-peer messaging component that would allow individual modules to inter-communicate, and host, application and user interface components that would provide the module functionality. The hardware interface would generate logs and tallies as the module operates and defines the state of health of the module. These logs and tallies could be accessed by the agent and embedded server components in order to provide added functionality contemplated by this invention.

In the illustrated design, each UTTA module may work normally with no aid from the highlighted components associated with the agent and embedded server functionality. All these components need do is access, retrieve and store state of health information. This is preferably done via two servers, which run on separate threads within the module. More detailed exemplary structure of these servers will be later described.

Logs and Tallies

The Logs, Tallies and SoH section may be responsible for keeping track of all the actions that a module undertakes. When an action occurs it could produce a mnemonic, e.g., (PAPER_LO), which is sent to a Searching (mnemonic) function inside the module's Tally's class. The Tally's class could be inherited by three different classes. These are CardTallys, PrinterTallys and DispneserTallys. Each of these classes may hold its own unique set of mnemonics. Once a mnemonic arrives it may pass through the Searching (mnemonic) function looking for a match. The matching could be simply done by a sequence of 'if' statements. An example of the code is shown in FIG. 16.

Once the matching mnemonic is found then its corresponding location in an array of integers called 'Log', can be incremented. For each mnemonic there could be an associated 'Threshold'. If the number held in the Log array became equal to or larger than the Threshold then an error may be generated. The error details may be sent out to the regional server so that they can be displayed on the Web page and an alert agent generated. Alert agents and their generation methods are discussed in further detail later in this disclosure.

Modular Features

Each UTTA module preferably has a Main class that instantiates any other required classes. It is from this Main class that a Logs class, Embedded Server class and the Agent Handler class may be instantiated. Thus it is possible to regard such other classes as separate components that can be added or removed as desired.

FIG. 15 illustrates how both the Agent Handler class and the Embedded Server class can access the Logs, and Tallies data. However, this is preferably not done directly, with calls to extract the information being done via other classes. The error information in the Logs class would preferably be accessed through the Main class. Therefore a request that arrived at the Server Socket Thread would move through the Embedded Server class up to the Main class, e.g., Card Reader, then down to the Logs class, back up to the Card Reader class, and through to the Embedded Server class to be acted on. This could be made easier but at the possible expense of losing the component effect, which is greatly desired as it would allow a customer to select only required features, instead of having an everything or nothing approach. As this environment preferably uses Java objects, only those classes actually required need be loaded to the UTC module.

Replenisher Stations

Figure 17:
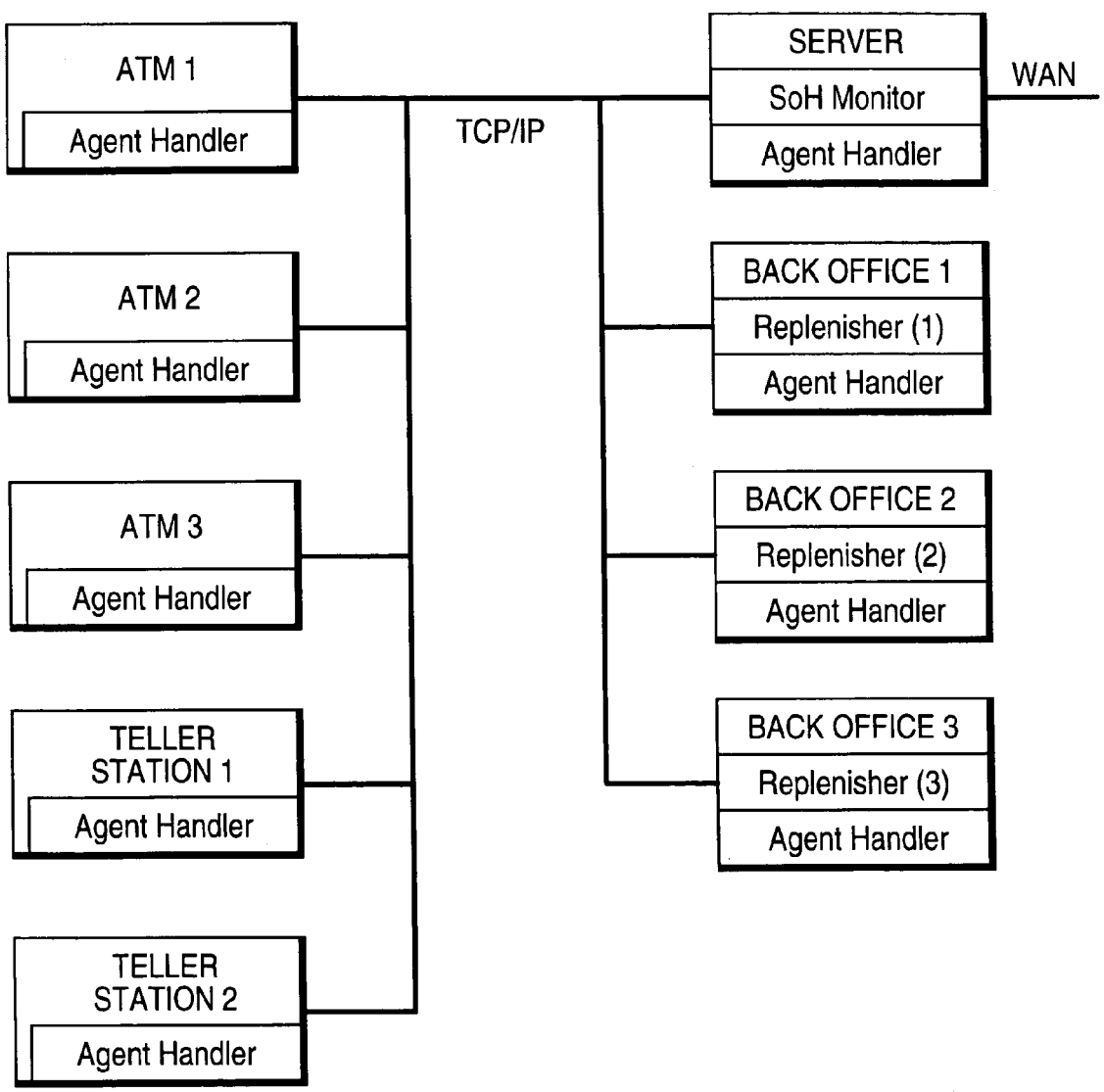
FIG. 17 is a layout of an exemplary bank branch office network layout with illustrated functional blocks and interfacing for agent handler and state of health monitor functions to facilitate servicing of automated teller machines (ATMs), according to one possible embodiment of the invention.

A feature of the UTC architecture is that it can integrates ATM modules of a branch office or region with the teller stations and back office systems through the regional server component. An example of a branch office network of this form is shown in FIG. 17. This environment provides a mechanism for servicing personnel or replenishers to directly monitor ATMs under their care through the embedded Web techniques and allows intelligent agent technologies to be employed within this environment, providing a means to continuously monitor conditions and report errors as they occur.

Agent Based Monitoring

Agent based monitoring involves use of software objects known as agents (or intelligent agents) which have the ability to be transmitted across a computer network, in terms of both their operating code and their dynamic operational data. They can communicate with and obtain information from computer elements to which they are transmitted. The way in which the Agents are constructed means that they can have the ability and knowledge to move freely all over the network. An agent may be sent out after being given the Internet address of its intended destination computer and the port that an Agent Handler program is listening on.

Each UTC module within an ATM is preferably a self-contained unit, which starts all its servers and sends out any necessary data upon its initialization. Two valuable pieces of data may be the module's Internet address and agent handler port number. Therefore, on waking of a module, these two pieces of data are preferably used to initialize a ModuleDetails class. This class could then be sent out to the regional server to enable a registration process to take place. As the Monitor Server received the Internet address and the Agent port number from a module, the information could be stored. As each module woke up its data could be added to the list. This list could the be used by the agent based monitoring system, providing monitor and service agents with knowledge of how to find the ATMs and ATM modules they have to visit.

There are three exemplary types of agents each with their own specific purpose. These are:

Monitor Agent—used to check varying information about a terminal module.

Service Agents—used to inform the module of who can attend to its problems.

Alert Agents—sent, e.g., to servicing personnel, to indicate that an error has occurred within a module.

Many of the exemplary preferred software classes are very similar therefore the Agent Handler, exemplary Server and Client code portions are illustrated in FIGS. 33 and 34 and described in associated sections below. (The Server code has the ability to listen for incoming messages; and the Client code has the ability to send out data requests to servers or server routines on the network.) This exemplary code can be used for the server/clients in the regional server, at service personnel or replenisher stations and within terminal modules.

Monitor Agents

Figure 18:
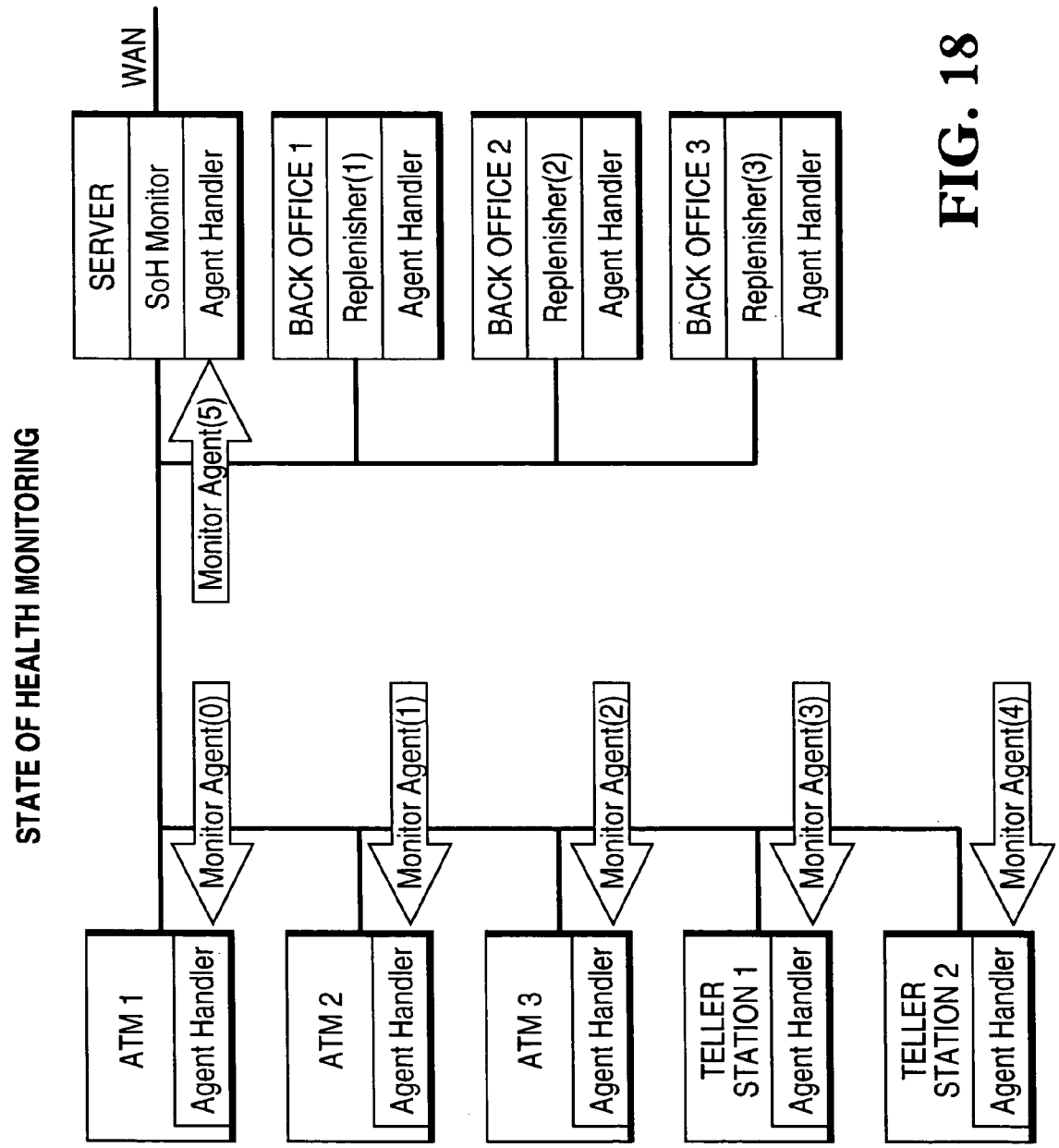
FIG. 18 is a depiction of the layout shown in FIG. 17 illustrating an exemplary movement of intelligent monitor agents, for gathering of error or other state information from transaction terminal elements on a computing network, according to one possible embodiment of the invention.

Monitor Agents can be used to obtain the state of health of the various networked terminal modules; however, these can also be used to retrieve any data wanted from the modules. Monitor agents may roam around visiting all the places on an internal list, obtaining data as they go, finally returning to the agent handler of the regional server where the obtained data is processed. This use is illustrated in FIG. 18.

The Monitor Agent can be created by a SOH_Monitor class in the regional server and be initialized with a list of locations of the connected terminal (e.g., ATM) modules (e.g., a list that is created as each module registers its presence on the network). The primed monitor agent may then be sent out by a MonitorClient class. Once at a terminal module the monitor agent may obtain that module's state of health data, adding the data to a list held within the monitor agent. The state of health data may be located in the Tally's class of the module (as explained in the Module section previously). The list of the various modules' state of health values may be stored along with the module's Internet address and port number inside the module's instance of ModuleDetails (the class structure can be seen in FIG. 13). Preferably, only the state of health data would be added at the AgentServer class in the module. This is because fatal errors (e.g., those causing a terminal module to stop functioning) and non-fatal errors are preferably dealt with in different manners.

Once the state of health data has been obtained the monitor agent can move on to the next module, e.g., if its Visit counter says it can. If the counter is the same size as the vector of ModuleDetails then all the modules have been visited and the monitor agent can return to the regional server. Once at the regional server it would be noted that the monitor agent coming back is a returning agent. Therefore the server would know to call a processReturningAgent function. This function would be responsible for looking at the state of health of the various modules and acting upon the results, e.g., as shown in FIG. 20.

The procedure shown in FIG. 19 can be used to process the state of health of a module after the monitor agent has been returned to the regional server. The procedure begins by getting the first element in the vector and accessing its state of health variable. If the state of healthy variable equals 'Healthy' nothing would happen. If the state of health is not 'Healthy' then an error has occurred and the MonitorServer may create an alert agent, initialize it with the Error details and send it out.

Replenishment Scheduling

The illustrated SoH monitor agent acts upon the state of health of a transaction terminal module. However this could be replaced by other, more module specific, forms of monitoring agents. For example, this technique could be used to monitor how much paper was left or how many cuts were still possible from the knife on a receipt printer. As soon as the paper was becoming low or the knife becoming blunt, someone could be informed via the alert agents and the problem solved without the ATM or terminal going down for a significant period of time. The data could also be combined with statistics, thus allowing the system to make predictions and take actions such as informing a bank that an ATM is not low now but that half way through the lunch time rush, it is predicted that ATM 192.46.273.35 will run out of money or paper. This allows the bank to consider scheduling replenishment operations in order to reduce downtime.

Service Agents

Service agents can be used to inform terminal modules of who is responsible for fixing them. Therefore when an error occurs, the terminal module could know exactly who to try and contact, to get the problem solved.

As soon as a service person logs-in they could either be faced with a dialogue box asking them to fill in their servicing details as shown in FIG. 20, or alternatively this may be done as an inherent part of the person's log in process. Servicing Details may include data such as where the service personnel are (e.g., local to a branch or remote, or the field service organization), what modules they can service and some indication of their priority status.

A service person's location may indicate where they are; if they choose 'Local' that can mean they are in the same building or very close by. If they select 'Remote' that can mean that the service person is not close by and it will take them some extended period of time before they can attend. 'Status' can be used to indicate the level of priority the service person has. If they are the 'Primary Replenisher' then they may be the first person you should go to if an error occurs. You would only visit the 'Secondary Replenisher' if the 'Primary Replenisher' is not available. The situation is the same between the 'Secondary Replenisher' and the final 'Replenisher,' who may be visited last.

If the service person is actively providing cover for the ATMs in their branch then they could select the 'Yes' button, after completing their details. If they are not available they could just select 'No'.

As the service person fills in such details, the underlying application may set up an Agent Handler server on their terminal; therefore, when an error occurs and an Alert Agent is received it can be presented to them.

The service person's Internet address and their agent handler port number can be used to initialize the contents of a service agent. The agent may then be sent to the MonitorServer class at the regional server. Once the information has arrived at the MonitorServer the service person's location details can be stored locally. Therefore, there could always be a copy of the service person's location at the regional server.

The service agent may then pick up a list of the associated Internet addresses and ports for the various terminal modules and send itself out. The service agent may start at the beginning of the list and work its way through, visiting each of the modules in turn, and informing them that they have a new service person and where to find that person. The following is an example of code that could be used for accessing the vectors:

ModuleDetails Mtemp=ModuleDetails)module.elementAt(0);

This returns the object at the element position 0 and sets it to the class instance ModuleDetails. Now the class elements can be accessed by calling Get functions, with the prefix Mtemp.

Figure 21:
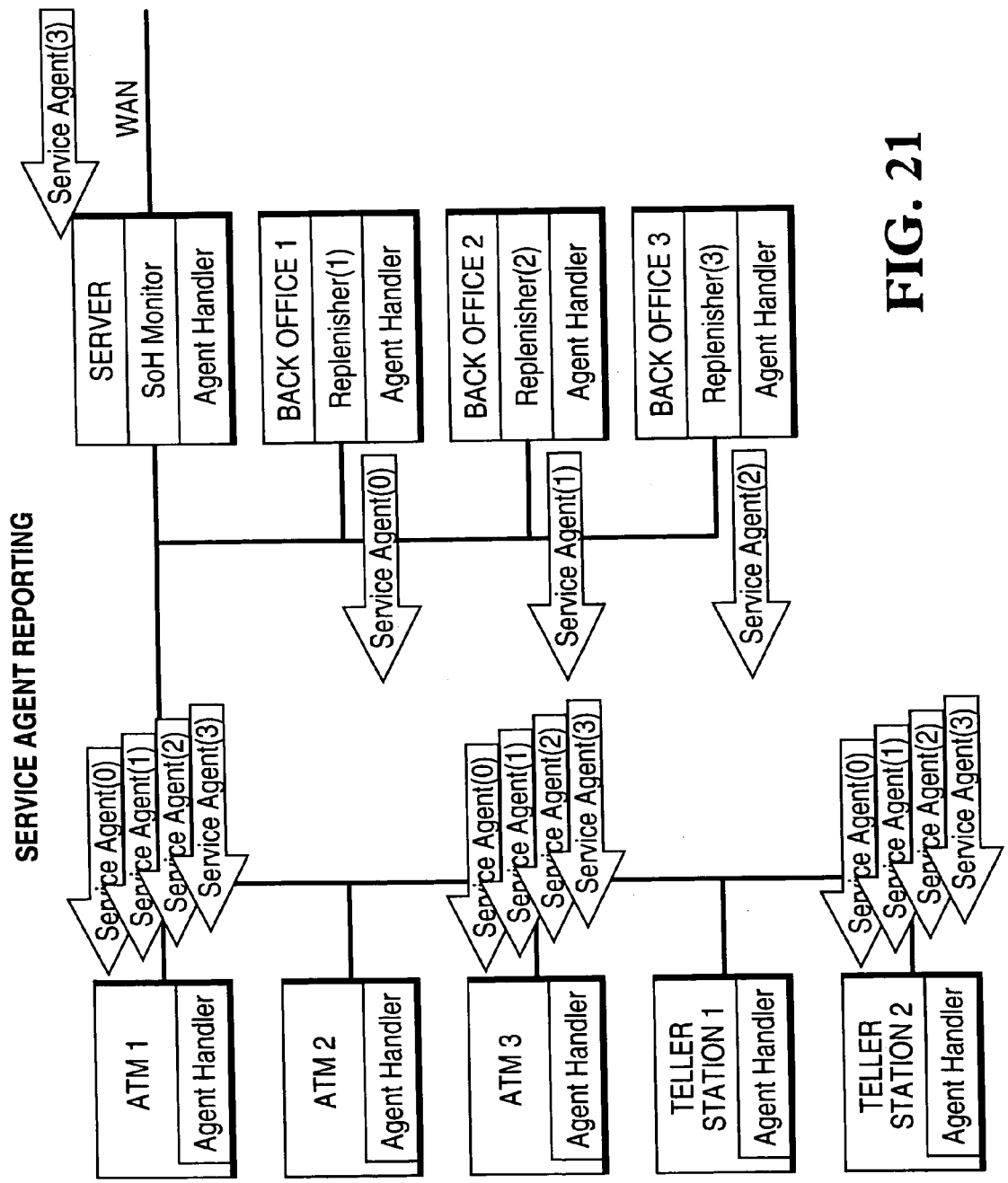
FIG. 21 is a depiction of the layout shown in FIG. 17 illustrating an exemplary movement of intelligent service agents, for providing servicing information to transaction terminal elements on a computing network, according to one possible embodiment of the invention.

FIG. 21 shows an exemplary movement of the service agents. As shown, the agent is created within the class DetailsScreen, passed to the regional server and then on to the individual terminal modules within the branch. Service agents that come into the server from outside the local network (e.g., from external field service organizations) are checked and authorized by the server before being sent on to the ATM modules.

At the modules the Replenisher's (service person's) location details are read in. The first thing that may be done is finding out the port number that the server is listening on. This may be performed by the server side of the Agent Handler code. As the AgentServer class is generic the procedure may obtain what port number it is listening on, as this could uniquely identify what class this particular instance belongs to. Finally, the Replenisher's Details information is stored. This may be done by placing the details into the next free position of an array. After doing this the SendOutServiceAgent function may be called within the service agent. This procedure may calculate where the ATM is and increment all its counters by one. Therefore, all the locations could now be pointing to the next place to go to; and once this is done the agent may send itself out. Exemplary code to do this is shown in FIG. 22.

After each visit a Visit counter can be incremented, and once this equals the size of the vector that is holding the ATM module details, the agent could know to stop moving and die.

Alert Agents

Alert agents may be used to inform the service person that something has gone wrong. They may search for the service person over the network, and when they find one they may look at the 'Replenisher's Details' in order to determine if they can help with the current problem, e.g., if they are trained, authorized and available.

For example, there may be two ways an alert agent could be generated. The first one generates the alert agent as soon as a fatal error occurs at any of the terminal modules and the second one is generated by the monitor agent processReturningAgent procedure. This latter procedure was previously explained.

Figure 23:
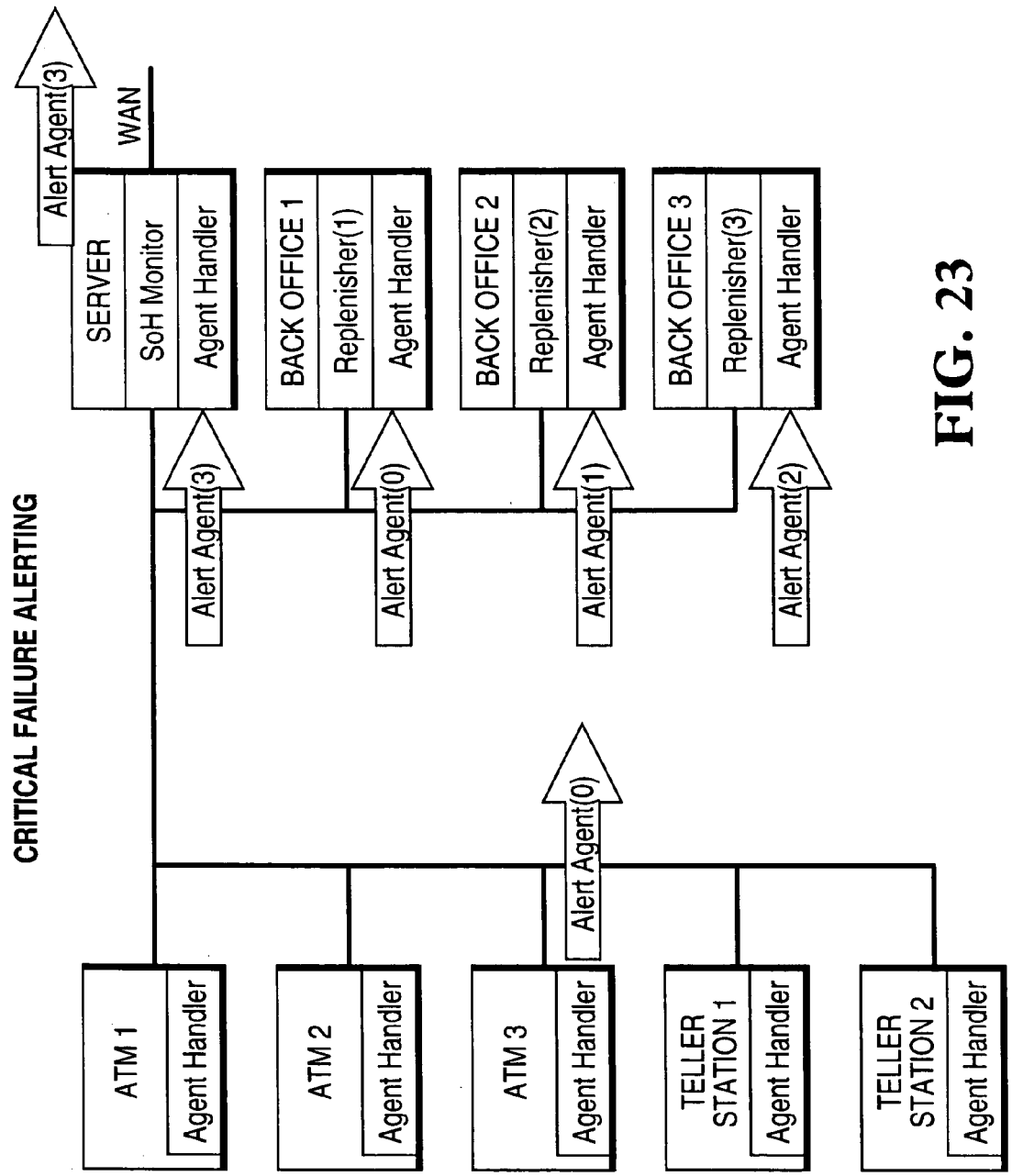
FIG. 23 is a depiction of the layout shown in FIG. 17 illustrating an exemplary movement of intelligent alert agents, for communication of error or other state information by transaction terminal elements on a computing network.

Creation of an alert agent at the terminal module is preferably performed automatically. As soon as an error is logged in that modules tally section, a check can be made to see if it is a fatal error. If it is a fatal error, an alert agent can be created and the 'Replenisher's' location details may be added. The function sendOutAlertAgent( ), may then be called. This function could initialize the agent variables to hold the error details and calculate what class instance the agent is in. By calculating this, the alert agent knows what module the port number belongs to. The newly created alert agent could then use its copy of the 'Replenisher's' locations and move directly to the first person on the list. As the agent could have its own copy of the 'Replenisher's' location it would not have to visit the regional server. An exemplary alert agent movement is shown on FIG. 23.

Once the alert agent has been received by the Server class at the service person's station, the agent may check the 'Replenisher's' details. This may be done by accessing the class RepDetails that may be initialized when the service person filled in the servicing form. A procedure that may perform the checking is shown in FIGS. 24A and 24B.

The illustrated code works by starting with the variables, Location set to 'Local' and Status set to 'Primary'. This is because these are the qualities of the person with the highest priority. Therefore the agent will check to see if this person has those qualities. If they don't then the agent will package itself up and move on to the next person on the list. If the service person is the 'Primary Local Replenisher' then their skills may be checked. If the card reader is broken and the service person has recorded that they can fix card readers, the person may be asked to help, e.g., via the screen shown in FIG. 25.

On this screen the Internet address is displayed as the ATM name; the module name and the module's state of health are also displayed. At the bottom the service person is asked whether or not they can to attend to the problem. If they answer is 'Yes' then the person may be shown the screen display in FIG. 26 and may be expected to load up the Web page to obtain further details about the problem. If the answer is no then the alert agent may package itself up and call a MoveOn function. This function may be held within the alert agent and may get the Internet address and port number of the next service person it should visit.

When the alert agent arrives at the service person that is the 'Local Primary' the variables Location and Status may be set to the next level of priority. Therefore they may be set to 'Local' or 'Secondary'. If the service person does not accept this alert the priority could be moved down one so that the agent is no longer looking for the person with the highest priority.

The priority listing designations may be:

| | |
|---|---|
| 1. Local & Primary | 2. Local & Secondary |
| 3. Local & Final | 4. Remote & Primary |
| 5. Remote & Secondary | 6. Remote & Final |

For example, only when the service person with the highest priority has been found might the variables change to the next level of priority. Therefore someone may always have to be the 'Local Primary Replenisher.' However, if the variables changed and the agent has already passed through some of the list, when the agent has visited all the locations may return to the start and continue searching for the person with the next priority. Therefore no one gets missed.

Creating of an alert agent within the MonitorServer was explained above in the Monitor Agent section. Once an alert agent it is created and sent out it may follow the same movement procedure as previously outlined.

Embedded Web Server

To gain maximum solution speed from any error situation, the person that fixes the ATM may be provided with as much error information as possible, and the information may be displayed in such a manner that they can take in the information as quickly as possible.

With these considerations in mind, a prototype Web based ATM Monitor application was developed. This application used a Web page to display to the attendant the information that may be required for them to make decisions. This Web based facility was constructed from applet code that would be stored at the regional server for access at any stage. It also involved a Web server that would be local or embedded into each of the ATM modules.

Each module's embedded server would be primarily responsible for receiving data requests from the regional server and acting upon them. An exemplary ATM network structure is shown in FIG. 27. The layout shows that data will pass form the Web page to the regional server, which would distribute the messages to all of the ATM modules.

To get error information from the module its Web Server may extract the information from the module's Logs and Tallies section. If any type of error occurred it may be displayed on the Web page and may be accompanied by full error details and associated servicing instructions or help.

On-Line information may be an important part of the Web based environment. This may enable the service personnel to access help data directly and not have to look through manuals. This could be done effectively, through the implementation of Java animation. The information might further be selectively customized, e.g., according to the nature of the problem or the nationality, location, abilities or training of the particular service agent. For example, the language or technical level of presentation could be selected based on such factors.

The module's state of health information may be available to both the module's embedded server and the agent handler. This may be achieved by the three classes being created from the main module class, e.g., CardReader.java. Therefore, when the Tally data needs to be accessed it can be done by using calls back to the module class and then down to where the state of health information is kept. Details about such a procedure have been explained in the 'ATM's Modules' section of this example.

Viewing the Web Page

As soon as the service person opens up a Web Browser and types in appropriate URL, e.g., "http://1153.73.152.192/utta/soh/test.html", the Web browser can load up the corresponding Web page. The screen may consist of a display panel and a control panel. The control panel can be used to navigate between the various pages; this may be done by clicking on the various buttons. Such a facility is preferably used where the applets cannot communicate easily with other applets on another HTML page, as is generally the case.

As soon as the applet loads up it could call its connect function, which in this example was the client for this applet and was responsible for sending out all requests to the regional server. The request that can go out first is a state of health request. This is the request that can get the state of health from the terminal modules. If an error is present the error details may be sent to the applet, for displaying on the screen. The request can be performed by sending out a string, e.g. StateOfHealth, and a string that contains the applet's Internet address. These can be sent out using a DataOutputStream class; the reason for this is because the applet can receive data streams rather than data objects. Due to this fact the regional server has two servers and two clients for this prototype application. The extra object server/client was added to the regional server so that classes and messages could be sent as easily as possible.

Once the strings have been received by the WebServer class in the regional server, its IP address may then be stored, as it was needed to broadcast messages later on. This function was used to keep all the Web browsers that are displaying the error to be synchronized. Therefore, when errors are present the same error information may be shown on the different browsers and after they have been fixed all of the pages may remove the error from their screen.

The data may then be passed from the WebServer class to the ObjectClient. In this example a vector that holds all the ATM location details can be used to send out a state of health request to all of the ATM modules in turn. This can be done simply by taking each of the locations in turn and sending out a request to them.

When the modules start up they can create their own WebServer and make it listen on a specified port. Therefore they may be looked upon by the regional server as completely different components. When the request arrives at the various modules it can activate a call to the function Send. The Send function was located inside each of the Tally's class inherited classes.

Automatic Error Notification

This Tally's class can check the ErrorList and if there are errors present in the array, error information can be sent back to the regional server. Also on the occurrence of a new error the module can follow the same procedure and send out its error data to the regional server.

This was done by the class ErrorList being initialized with the error array plus extra location information. After this is done, an instance of the Client class was created and the data was sent out though it. ErrorList.java was a class produced by the searching function, if a threshold is broken.

This class can be sent out by Client.java to move up to the regional server where it can be received by the ObjectServer. This class created an instance of a class that will add extra information to the error details. The function that performs this processing was called stringProcessor. This function was responsible for adding extra data to the existing error list. The code example shown in FIG. 28, is one of the functional elements that could be used to add descriptions and state of health information to the array if the error 'Shutter Jam' was ever produced. For every error there can be an entry, like the one in FIG. 28.

The reason this was done at the regional server, is so that depending on which area you are in you can change the language or extent of the comments. This factor makes the system more global, as all you would have to do with the various stringProcessor classes is replace them with sections written in a different language. It might make more sense to place the processing at the terminal module but then you could not as easily have the change in language.

As shown in FIG. 28, the processing involved creating three arrays and filling the arrays with different information about the error. One array was responsible for storing a full description of the error, another held what components to check in the ATM, and the final array stored the module's state of health. All of this was added by taking the error name and trying to find a match for it. Once a match was found then the program knew exactly what additional error data to add into the arrays.

Once this process finished, an instance of WebClient.java was created and the details were passed in. This client was slightly different from the other client functions as it used a broadcast function that would inform all the applets that have logged in that there was an error. This facility helped to synchronize the passing of information between the applets that were open. This meant that once an error was corrected it would be removed from all of the applet pages and another person would not try and fix it. The function worked by calling the code that sent out messages, repeatedly. Each time the socket would connect to a specified port on an indicated terminal. When the error data was sent out to the AppletServer and it read in the information, a certain sequence of events would take place.

If the record was the first record to arrive at the AppletServer, it would automatically allocated to ArrayPosition and the records were then passed through the WebMain class to the AppletCenter class. However, if the record was not the first to arrive then it was checked for duplication, that is for different errors that belonged to the same ATM and module. This was done by a function called CheckForDuplication (Record rec), which took in the record and compared it with the existing list of errors. If a match was found, the new error was placed after the last error to be added to the list. If a matching record could not be found, then the record was added to the end of the list of ATMs by calling the function setRecord. Once the new error data was added, the array of records was transferred over to the AppletCenter class, so that the results could be displayed on the screen.

Error Indication

Displaying the information on the screen was done by calling a function AppletMain that in turn called the displayATMDown function, in the AppletCenter class. This function then looked through the array of records and initialized an icon to the medical.gif. This error was displayed along with its title in the first available monitoring spot on the screen shown in FIG. 29.

A monitoring spot is simply an icon location that is not currently displaying another error, e.g., it is free to display a new module error. An icon change showed that an error has occurred with a particular ATM. The ATM that had the fault was indicated by its name appearing along side the new image on the screen.

To display the images etc., on the screen the applet was constantly being wiped and reconstructed. Each screen had its own number and set of images. As the screens needed to be constructed, a function called screenUpdate was called in AppletCenter.java. This function changed the screen number and called its corresponding initializing images function (so the images were correct for that screen). This function checked to see if there were any errors in the records by checking the error_present flags status. The function also set the screen number to the correct values and called the corresponding screen class, e.g. Screen, Errors_Fixed. These classes were responsible for displaying the data on the main applet. If an error was present the image was changed to the icon representing a medical bag, as shown in FIG. 30. Once this was done the classes waited for actions from the user.

Extended Error View

Thus it was made apparent to the user that a problem had arisen with a particular ATM. If the service person wished to obtain more details about the screen they clicked on the medical bag icon. There are two views that the errors can be viewed from, a Replenisher view and a Field Engineer view. These two views were used as examples of information that two different types of service persons might need.

When an error was automatically generated it was displayed on the Replenishers/Field Engineers Web page and it also generated an alert agent. The reason behind this was that the alert agent arriving at a station would grab the service person's attention. This was used because it may not be known if the service person is looking at the Web page or if they have the Web page minimized. By the way in which the alert agent displays itself, the service person could more easily notice that a problem had occurred. For added effect a beep or flashing alert could be used.

Replenisher View

The Replenishers view displayed a series of images and beside these the state of health of an associated module. In the prototype application, the receiving service person was asked to attend to all errors. However, it may be beneficial if a selection decided the severity of the error and routed the error according to that. This would replace the prototype's error broadcasting function that equally informed all applets and their users. Service personnel could be identified by their log-in names and this could be used to tell the error data were to go to.

The screen (screen1.java) that was used to inform the service personnel of what error had occurred contained a series of images and their states; it also let the user move between errors if they wish to. This was done by pulling down the 'ATM Name' menu and selecting a different option. If the service person was is in any doubt about how to fix the module then by clicking on the images they could call up another HTML page that could explain in detail the correction procedure. These pages were connected but did not display any 'Help' information.

The information that was displayed on the screen was passed in when the class was being created. It was then processed and the necessary data was extracted. This was done by referencing a list of records that held all the error data. In this view only the ATM's location, modules name and state of health were displayed on the screen. If the user selected a different ATM all the details on the screen would change. This was done through the use of event handlers.

Field Engineers View

The Field Engineers screen (screen2.java) was more detailed. It was also activated by selecting a medical bag icon. The page that was displayed was constructed mostly of text. The text informed the engineer of which ATM was in fault, which if its modules were not working, the modules state of health, the error's name, a full description of the error and the components that need checking. This gave the engineer the fullest description possible, making their job less lengthy.

This class handled the records in the same manner as the Replenishers screen. It would extract the data and display it in the Field Engineer's screen. However, this screen presented more information and all the contents of the records were extracted and used. This included the ATM's location, module name, state of health, error name, full error description and components to check.

Fixing an Error

After the service person visited the ATM and fixed the problem they could correct the information on the Web Page. This was done by selecting the 'Fix' button shown in FIG. 31, which would call the class Error_Fixed.java class. This class was responsible for displaying all the error information and acting when the user selected the 'Yes' button. This caused the class to take the details from the screen, pass them to the class AppletCenter.java and then send them out to the regional server via the Connect function.

The regional server simply passed the 'Reset' message to the particular ATM module and it used the error's name to find the error and set its Log value back to zero. Once this had been done a resetAcknowledgement was generated. This involved initializing the class ResetDetails.java with details about the error and where it came from. This class was then sent up to the regional server were it was read in and the details were passed over to the WebClient so that they could be sent out to the applet. Once the details arrived at the AppletServer they were transferred to the AppletCenter class via a procedure called Remove. The function Remove found the error details in the set of records and removed them from the records. This was done by finding the correct record and then setting its values to null. Once this was done, the screen was updated and a display of the noted the error was no longer present.

Break Simulation

The final button on the control panel was the 'Break' button and this would not be needed on a real system, as no one should have the power to 'break' an ATM. The process pattern followed the same route as the 'Reset' and instead of setting one of the Tally's to zero it set one of the Tally's to 5, therefore causing a module to 'fail.' As the screen was automatically updated this error appeared quickly.

Web Server Summary

The concept of using a Web page on a standard browser as a means to indicate errors within an ATM is something which could be used without the need for the UTC or UTTA architectures. As banks move towards internet style networks within their branch environments and ATMs with Web capable applications on them emerge, it would be possible to tie the state of health reporting systems already present in commercial ATMs and the configuration and control capabilities of existing diagnostics to a dynamic Web page through the use of appropriate server software.

This technique could remove the need for anything but the simplest of operator interfaces at the ATM as wired or wireless remote terminals, PDAs and laptop computers with standard browsers could be used instead.

If architectures such as UTC and UTTA are used, embedding state of health reporting and configuration and control software directly into the individual modules of the ATM or other transaction terminal allows the modules to be configured either as independent items before installation within the terminal or to provide for in situ configuration. When combined with the described intelligent agent reporting techniques the embedded Web server allows local and remote service personnel to be quickly alerted as to problems with individual terminal modules and then to provide a means to gather appropriate information before acting.

Prototype Class Descriptions

Listings and descriptions of the functional blocks and associated classes used in the prototype application are set forth in FIGS. 35A to 35G.

Exemplary Code Explanations

Some of the more common pieces of code in the prototype application are explained below.

Main Code

Main code that appeared in the AppletMain, WebMain, ObjectMain, SOH_Monitor, DetailsScreen, and AgentHandler classes is illustrated in FIG. 32.

The code starts by initializing the value sPort to 6050, where this value is the port number on which the server is going to listen on. To do this there is a function ServerSocket (sPort) which creates a ServerSocket on the specified port to reserve the port for incoming messages. The next stage is to check if the thread is pointing to nothing, if it is then it is made to point to the class's Server. Finally, the thread is told to start running by the command 'Runner.start'. This is a built in function for use with a thread and will cause the thread to run until told otherwise.

Server Code

Server code to provide a listening facility was reused throughout the prototype application, e.g., in the AppletServer, Server, WebServer, ObjectServer, MonitorServer, and AgentServer classes. An example of this code is shown in FIG. 33.

The class is initialized by the call from the Main class and in the Servers constructor all initialization is performed. The start function when called will activate the above code. As can be seen the ServerSocket that was initialized in the previous class was passed though (Serv) and is now used to listen on that port and listen for a connection to be made. Once a connection has been made an ObjectInputStream is created and the data is read in using the stream In.readObject( ). After this has been done the object that is read in is turned into a string and used for comparisons. The first thing that was always read in is the indicator of what type of message is to follow. The actions the server performed depend on the message that arrived to say what information was following.

Client Code

In the prototype application, Client Code was responsible for sending out required objects, e.g., in the AppletCenter, WebClient, AgentClient, MonitorClient, and ObjectClient classes. An example of this code is shown in FIG. 34.

The code uses a predefined Internet address (destName) and a predefined Port number (destPort) to connect to a specified terminals port. It then creates an ObjectOutputStream so that it can send the data on it (out) and sends out the data (write).

Module Removal

When terminal modules are disconnected they should preferably be removed from the module location list at the regional server. This can be done, for example, in response to a message sent out by a module signing off, or in response to a message from another module failing to receive an acknowledgment from a down module within some time out period. Otherwise, when a service agent arrives at the regional server it will collect the list and may try to visit a disconnected module. If that module is at the start of the list every module behind it may not get the Replenishers Details as the service agent may not move on. If the faulty module is removed from the list then all modules would more easily be able to receive all agents.

Replenisher Removal

When the service person logs off his or her terminal at night they can be removed from the Modules Replenisher location details. The main reason for this is that every morning you may have service personnel logging on and being added to the modules' list. When this list is used many of the terminals may not otherwise have the correct person on them or no connection may be able to be made to all of the listed personnel.

Example 3

It is an aim of the invention to provide an improvement in monitoring a transaction terminal by incorporating the terminal into a communications network and communicating operating data relating to the operation of the terminal.

According to one aspect of the invention, there can be provided a communications network comprising a plurality of interconnected network sites, with routing of intelligent agent programs through the communications network, e.g., by reference to site address information carried by each agent program. The network can have a terminal network site which includes a transaction terminal having at least one service element; monitoring facilities to derive operating data relating to an operating parameter of the service element; an operating data registry to receive the operating data; and a local processor programmed to launch an intelligent agent program carrying the operating data from the terminal network site into the network.

According to a further aspect of the invention, there may be provided a method of communicating intelligent agent programs through a communications network comprising a plurality of interconnected network sites, with routing intelligent agent programs through the communications network, the network having a monitoring network site and a terminal network site including a transaction terminal having at least one service element, the method comprising the steps of:

monitoring the service element to derive operating data relating to an operating parameter thereof and;

launching from the terminal network site to the monitor network site an intelligent agent program carrying the operating data.

Figure 36:
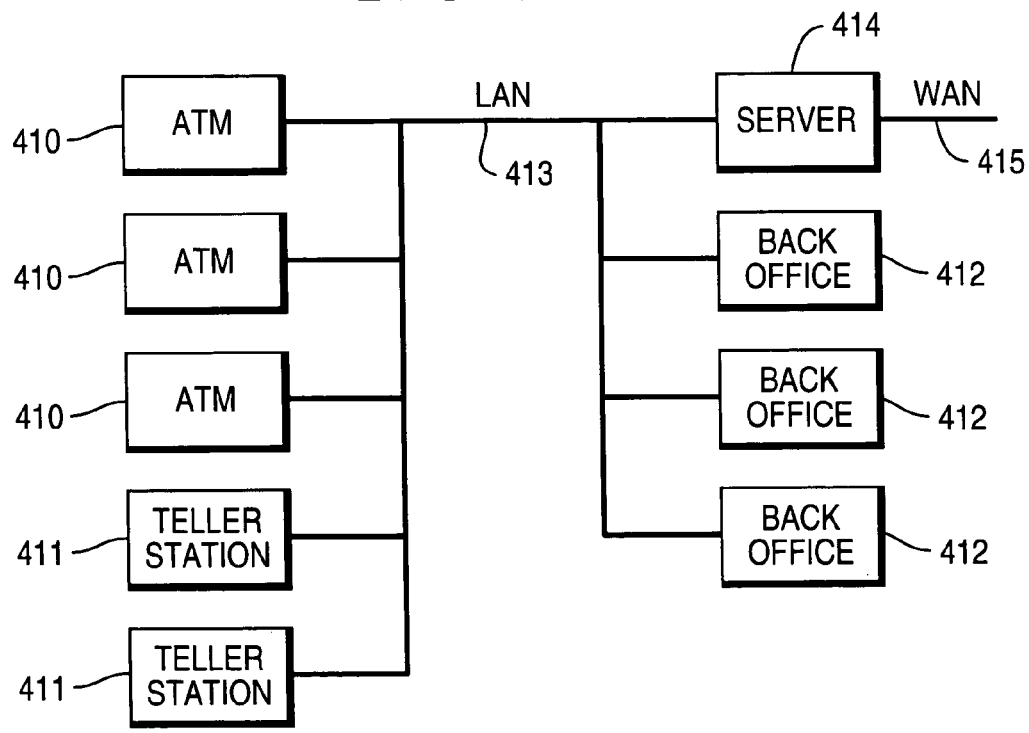
FIG. 36 is a schematic block diagram of a bank branch network according to one possible embodiment of the invention.

In FIG. 36, a local area network within a bank branch is in the form of a TCP/IP LAN with a number of network terminal sites including ATMs 410, teller stations 411 and back office terminals 412. The terminal network sites are interconnected through a local bus network 413 to a server 414. A connection is made from the server 414 to a wide area network bus 415. The network architecture illustrated is intended to represent a simple bank branch but the concepts to be described are intended to apply equally to more complex network environments with many terminal sites and back office systems. The concepts apply equally well to networks employed in environments, such as retail environments, other than banking. In these other environments the ATMs and teller stations shown in FIG. 36 may be replaced by other transaction terminal sites such as point-of-sale terminal sites.

Figure 37:
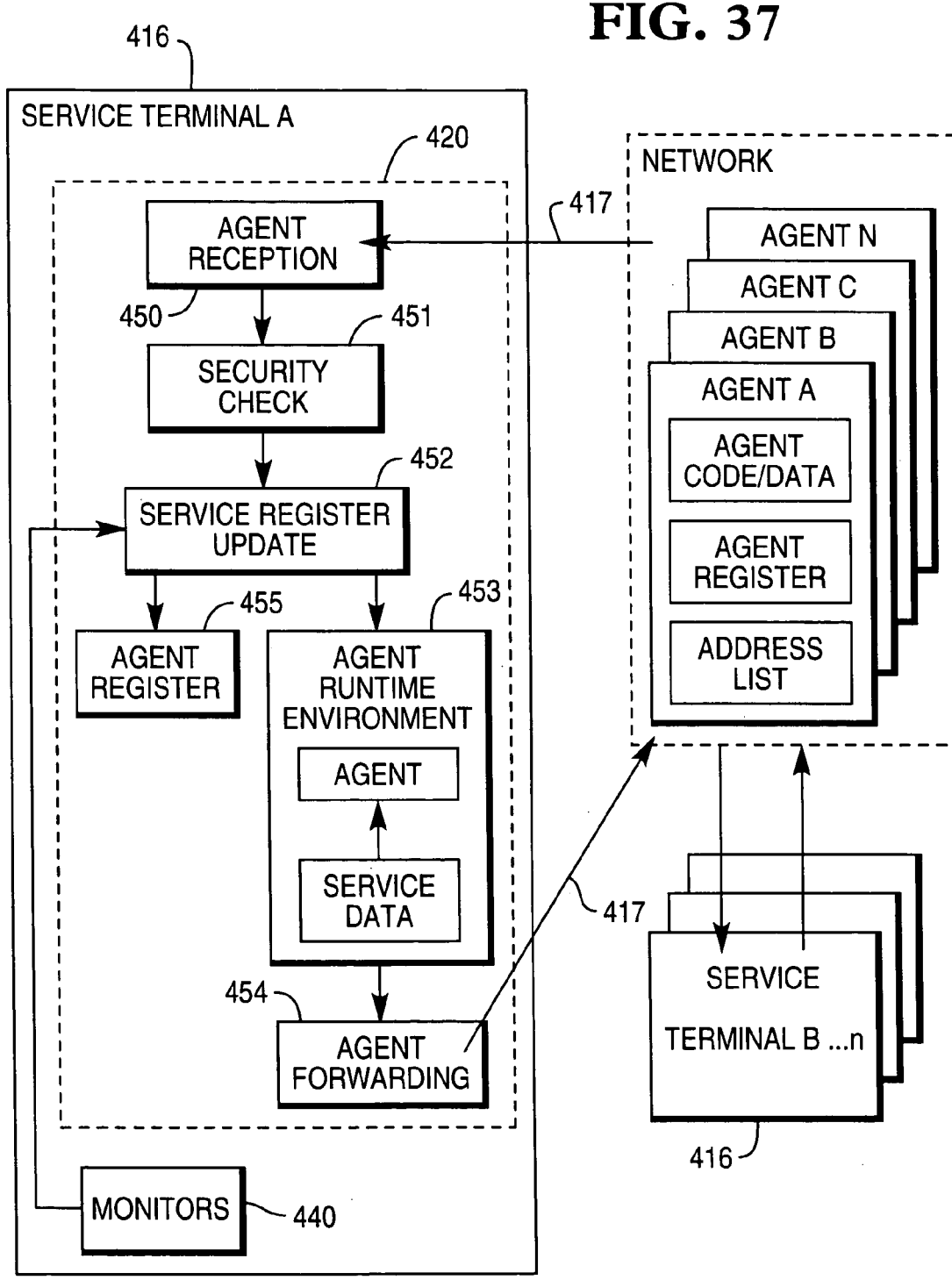
FIG. 37 shows elements included in one of the network terminal sites in the network of FIG. 36.

In FIG. 37, there is shown a number of transaction terminals 416 each of which constitutes one of the network sites 410, 411 or 412 in FIG. 36. The transaction terminals 416 are illustrative of an ATM, a teller station or a back office terminal. The transaction terminals 416 may be terminals included in one of the alternative forms of network as already explained with reference to FIG. 36. The terminals 416 are labeled terminal A, terminal B and through to terminal N.

The transaction terminals 416 may be connected through an I/O port 417 to the bus 413 of the local area network of FIG. 36. The transaction terminals A through N are capable of communicating with the bus 413 to receive intelligent agent programs A to N from the network and to launch intelligent agent programs into the network. Each transaction terminal 416 includes an agent handler shown within the dotted line area 420. The intelligent agent programs can be used for a variety of purposes including monitoring the operations of the terminals, updating the network and alerting the network to terminal site problems as will be described.

Figure 38:
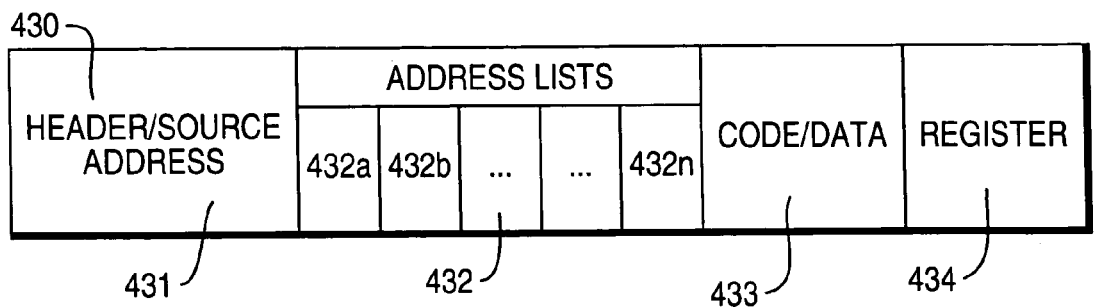
FIG. 38 shows elements of an intelligent agent program which is communicated through the network of FIG. 36.

In FIG. 38, an intelligent agent program 430 includes packets of digital information divided into fields. The agent programs 430 may make use of a header and source address field 431. The source address may indicate the site address of the user site 10 from which the agent program 430 is launched into the communications network. An address field 432 may include sub fields 32a, 32b . . . 32n, each of which may contain the address of a target site in the network. The agent program may thus be able to carry a visit list of sites to be visited by the agent program, the visit list including a minimum of one site address.

A code and data field 433 may include program instructions for the network sites to be visited by the agent program. A registry field 434 is a field that may be used to register data collected by the agent program.

Figure 39A:
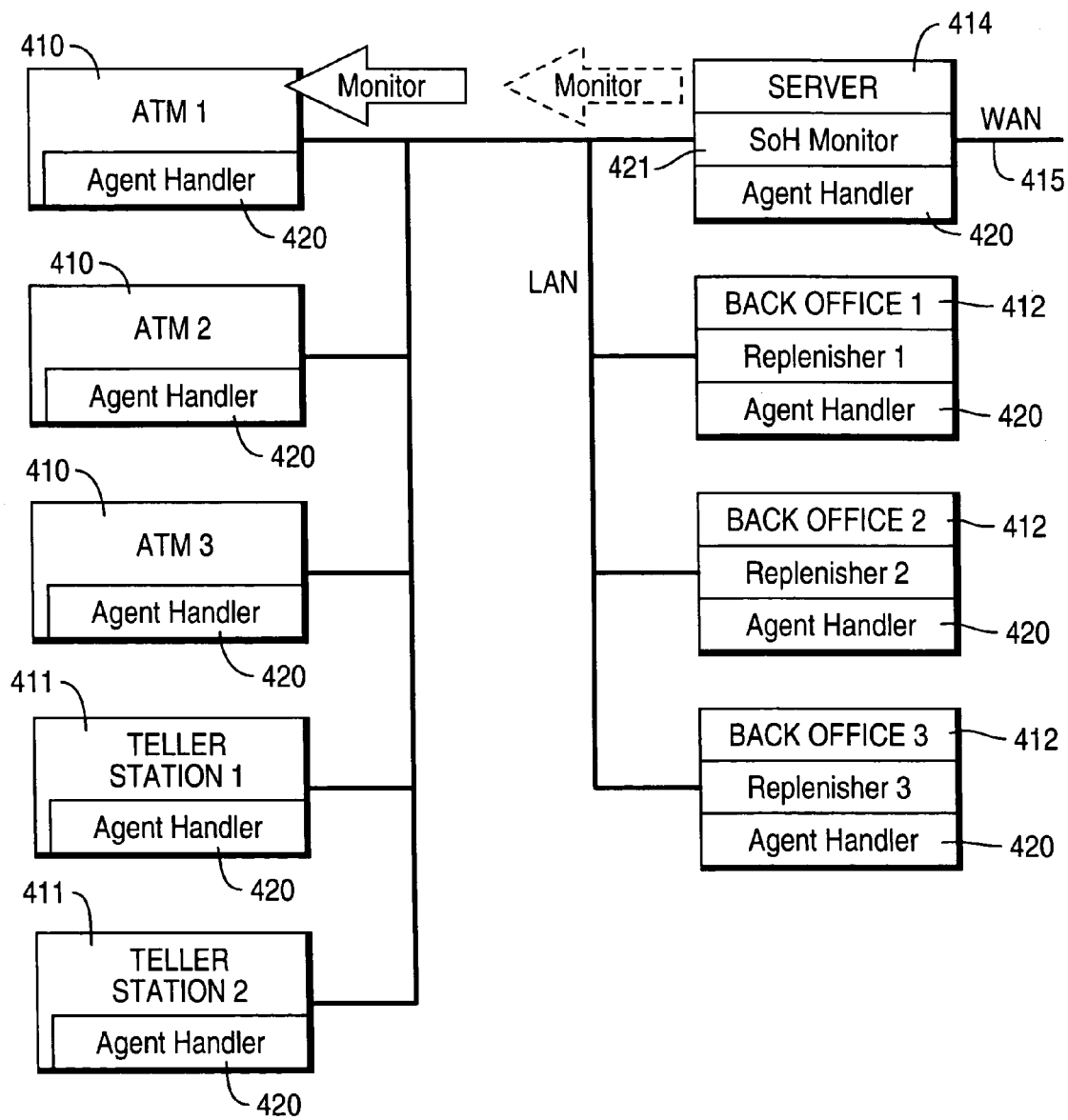
FIGS. 39A to 39C show monitoring intelligent agent programs used in the network of FIG. 36.
Figure 39B:
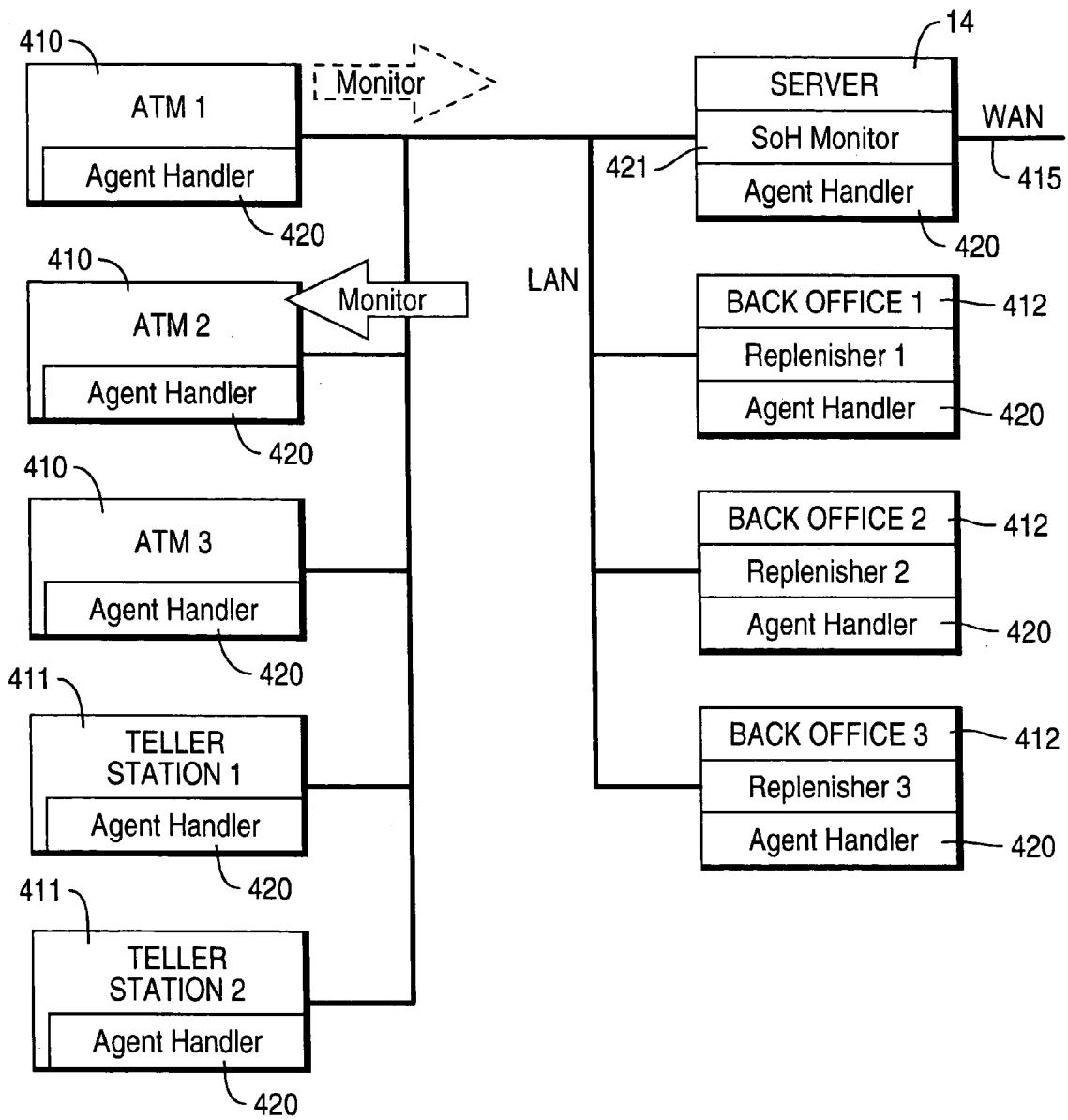
Figure 39C:
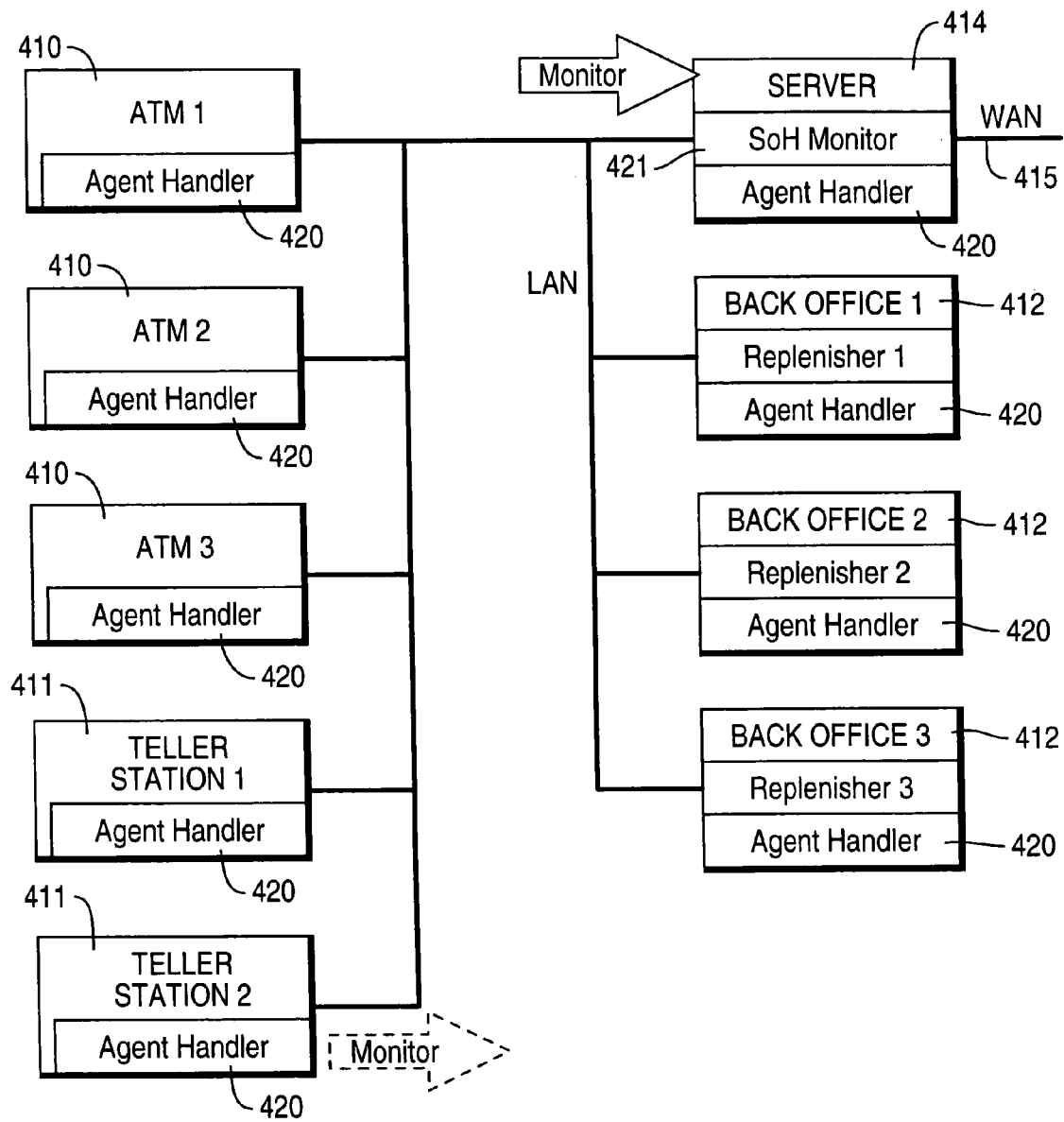

In FIGS. 39A to 39C, the network of FIG. 36 is shown to include network sites, each of which has an intelligent agent handler 420. The server 414 may include a state of health monitor 421. The monitor 421 may periodically launch an intelligent agent program in the form of a monitor agent onto the network bus 413. In FIG. 39A, a monitor agent is shown as arriving at ATM 1 after having been launched from the server 414. The monitor agent is shown in full lines at its arrival point and is shown in dotted lines to represent the previous point of departure from the server 414. The monitor 421 may provide the monitor agent with a list of addresses in an address field 432 of the agent program allowing it to roam through the network.

Upon reception of an agent program by the I/O port 417 of a transaction terminal A, a CPU at that site may confirm in step 450 (see FIG. 37) that the site address targeted by the agent program matches the site address of the transaction terminal A. The CPU may submit the agent program to a security check in step 451 to ensure that the agent program is authorized to access data in a service registry database available at that transaction terminal site. Upon satisfactory completion of the security check, the CPU may update the service registry from a set of terminal monitors 440. The monitors 440 may monitor physically the operations being carried out at the terminal site. In the case of an ATM, such monitors may include monitors for the mechanical transports within the ATM and the capacity of currency purge and capture bins. The monitors may be placed and arranged to monitor the terminal so as to provide operating data that indicates the state of health of the terminal. The operating data may be captured by a service registry in step 452 upon the arrival of each monitor agent through the I/O port 417.

From step 452, the terminal may enter step 453 where the monitor program agent is entered into the runtime environment where the service data requested by the program agent is entered into a program registry field 434. Following the step 453, the program agent may be re-launched into the network in the step 454. Once relaunched into the network, the program agent may visit other terminal sites B . . . N as shown diagrammatically in FIG. 37. The monitor agent may go to the first location on its address list (ATM 1) where it obtains the information specific to that location. Having removed ATM 1 from its list of locations to visit, the dynamically modified monitor agent may move on to the next location to be visited, ATM 2. The movement of the monitor agent from ATM 1 to ATM 2 is shown diagrammatically in FIG. 39B. The process of handling the monitor agent may be repeated in the agent handler 420 of ATM 2 and this pattern can continue until all the locations have been visited, whereupon the monitor agent may return to the server 414 to impart the information obtained by traveling through the network as shown diagrammatically in FIG. 39C.

The state of health monitor program in the server 414 is thus able to use information provided by the returning monitor agents to build up a dynamically changing picture of the terminal sites under its gaze, allowing identification of problem areas and scheduling replenishment and maintenance operations based upon local requirements as opposed to some overriding average as might be conducted by a centralized help desk approach. The search for and selection of the information from one or more of the service registries at the terminal sites may be controlled by program instructions included in a code and data field 433 of each intelligent agent program. This allows the agent programs to roam the network finding out information about the individual sites such as their state of health, usage of consumables and configuration. This information can be collated by the agent software and taken with the agent as it moves from each terminal site to the next.

Ultimately a roaming agent of this form may arrive at a location, such as the server location 414, where the information can be used in some appropriate manner. This information can be used to alert an operator of some impending problem. Alternatively, the information can be used to schedule an appropriate time to service a terminal site, for example by replenishing consumables, depending upon the information returned to the server 414.

Figure 40A:
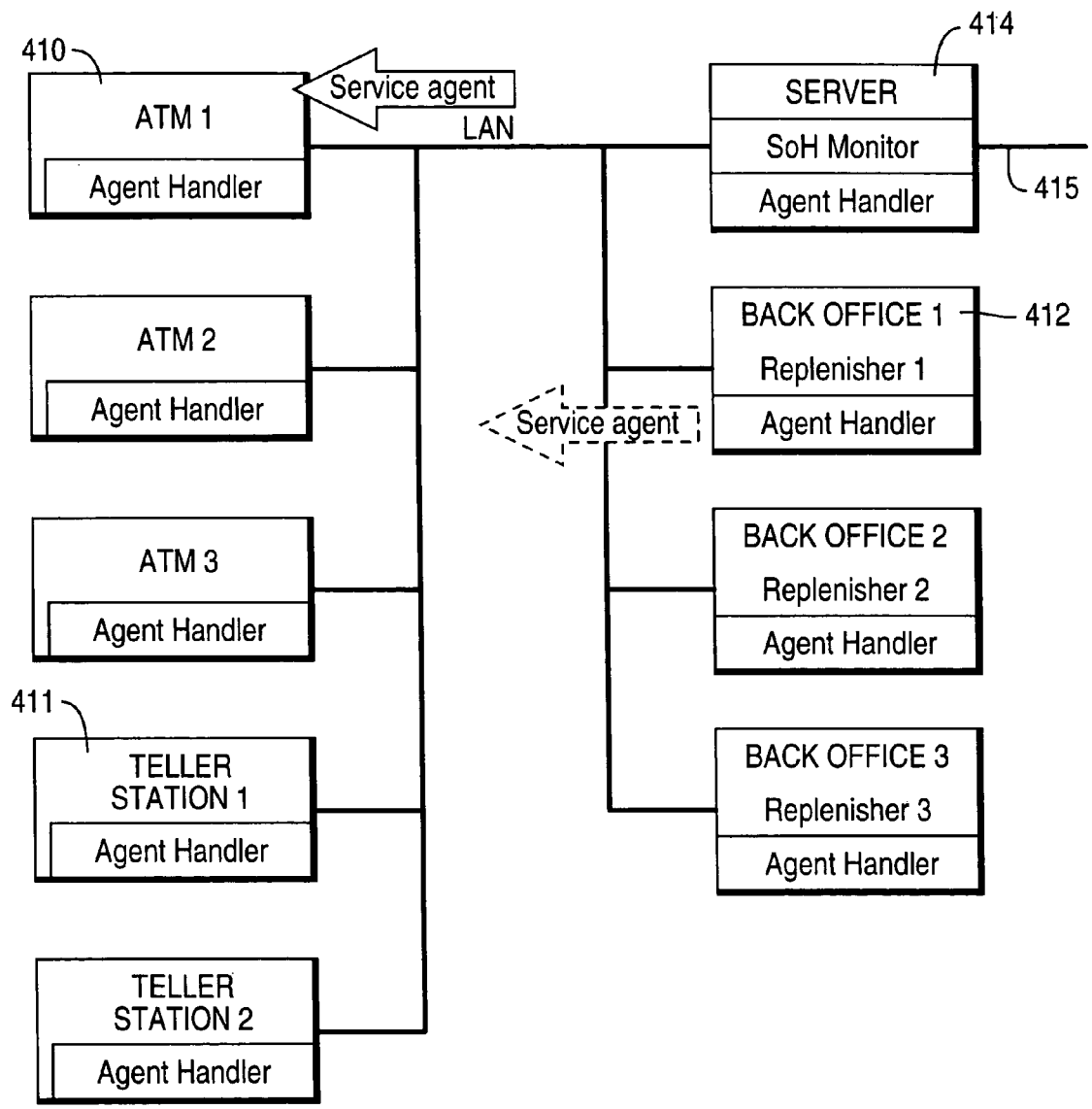
FIGS. 40A to 40C show service intelligent agent programs used in the network of FIG. 36.
Figure 40B:
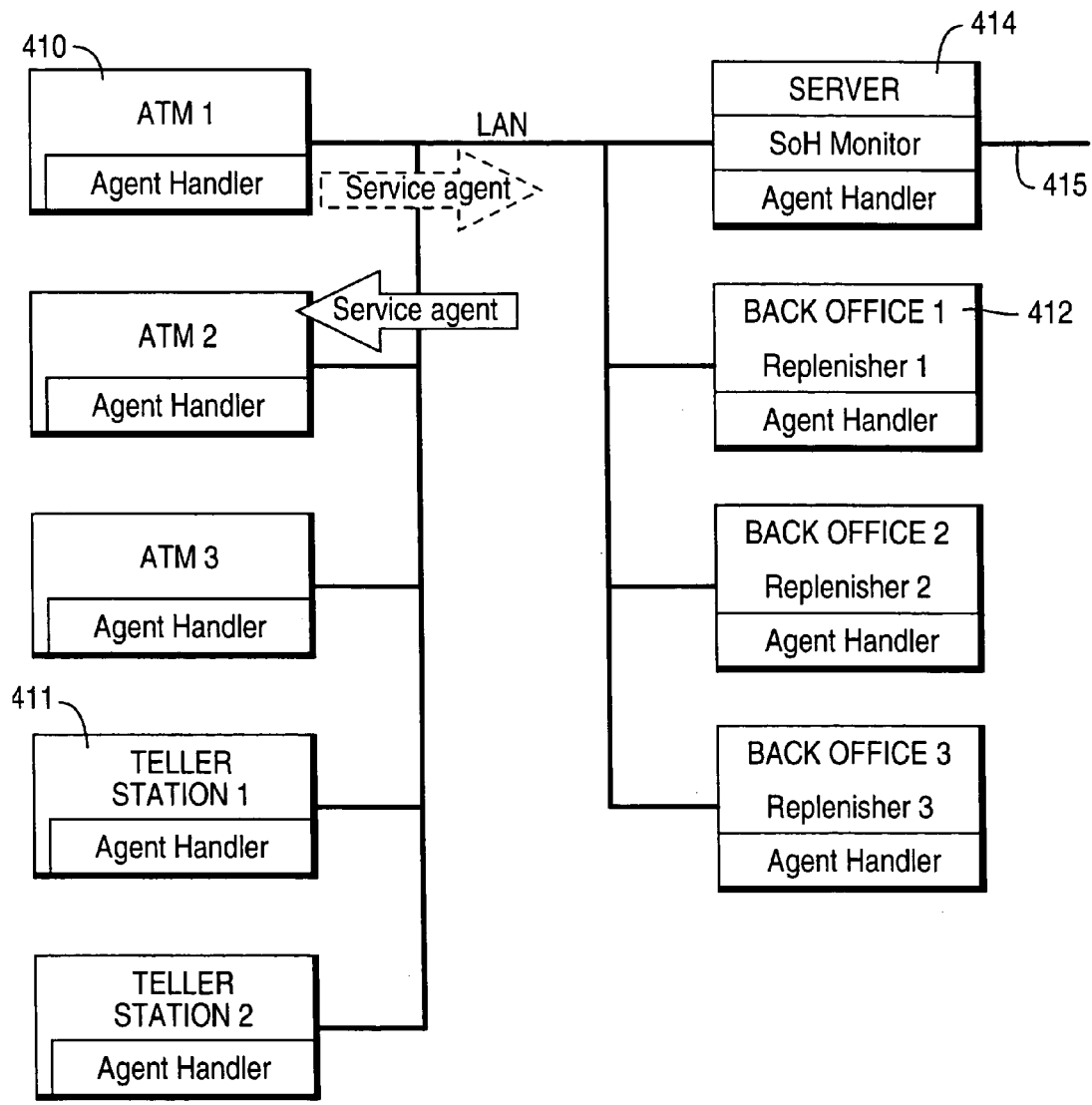
Figure 40C:
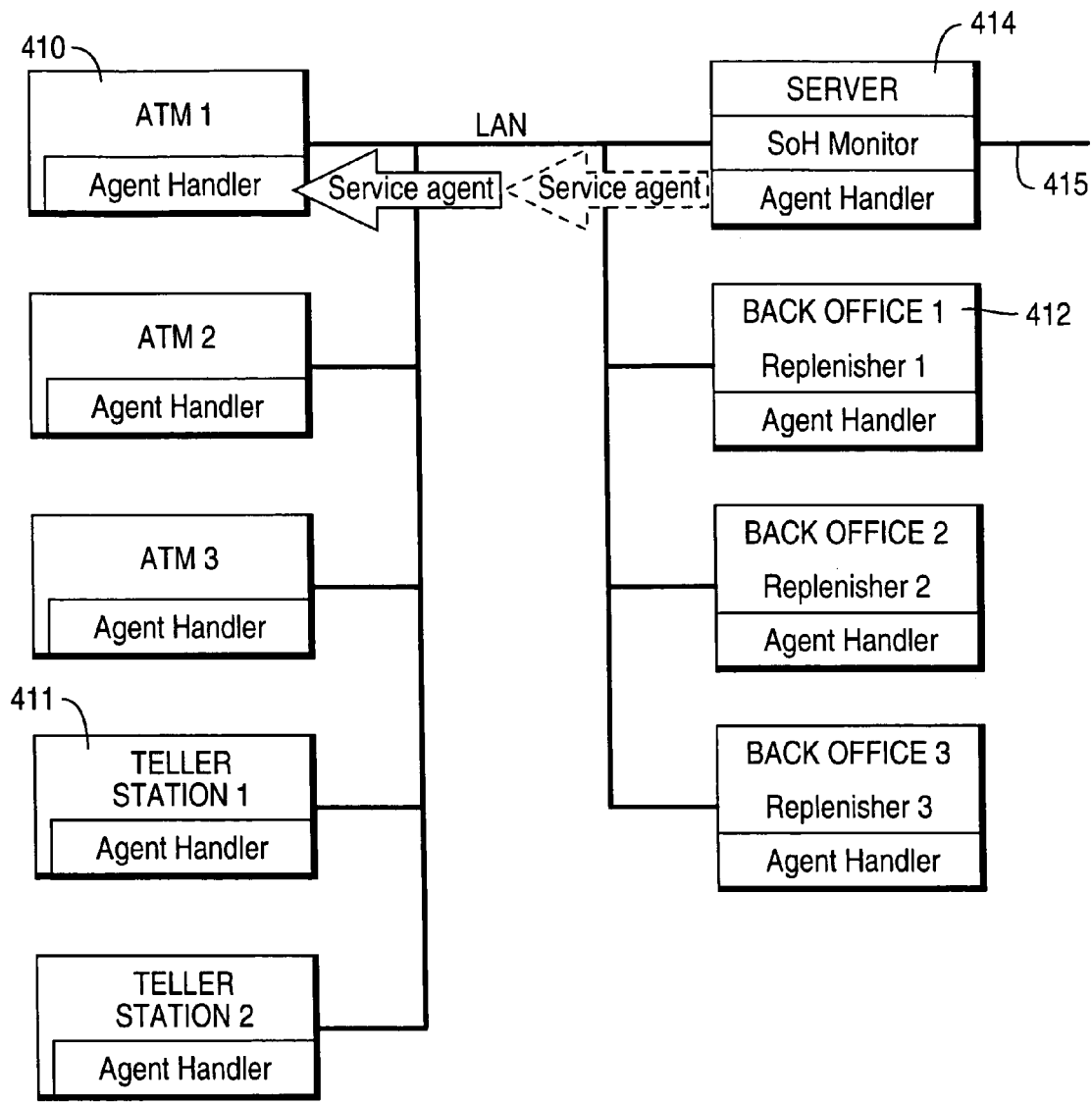

As well as retrieving information from the locations that they visit, intelligent program agents may also impart information as will now be explained with reference to FIGS. 40A to 40C. In FIG. 40A, each of the back offices 412 can support a replenisher or field engineer who can log on or off the network. When logging on, the BACK OFFICE 1 automatically sends out a service agent program identifying that replenisher or field engineer to the ATMs 410 and teller stations 411 on the network as an available service resource. The BACK OFFICE 1 is seen in FIG. 40A to have launched a service agent that is being received by the ATM 1. The service agent may be processed by the agent handler of each transaction terminal before passing on through the network. In FIG. 40B, the service agent from BACK OFFICE 1 is seen as having been re-launched by ATM 1 and is seen as arriving at ATM 2. Similarly, when logging off, the back office may automatically send out a service agent program identifying to all the ATMs 410 and teller stations 411 that the respective service resource is no longer available.

Field engineers from the wider area network may send service agent programs into the local area network through the server 414. In FIG. 40C, a service agent program which has arrived via the bus 415 is seen in dotted lines as having been launched by the server 414 onto the local area network and is seen in fill lines as arriving at the ATM 1. The service agent programs from the wider area network may be subject to security checks before passing into the local area network. The server 414 may be programmed to stop service agent programs from the local area network from reaching the wider area network.

Upon reaching a network site, the service agent program may compare the service and location information it carries with corresponding information in an agent registry 455 (see FIG. 37) at the network site. This technique may allow updating of the internal location lists of each network site and updating of location information carried by the agent program.

Figure 41A:
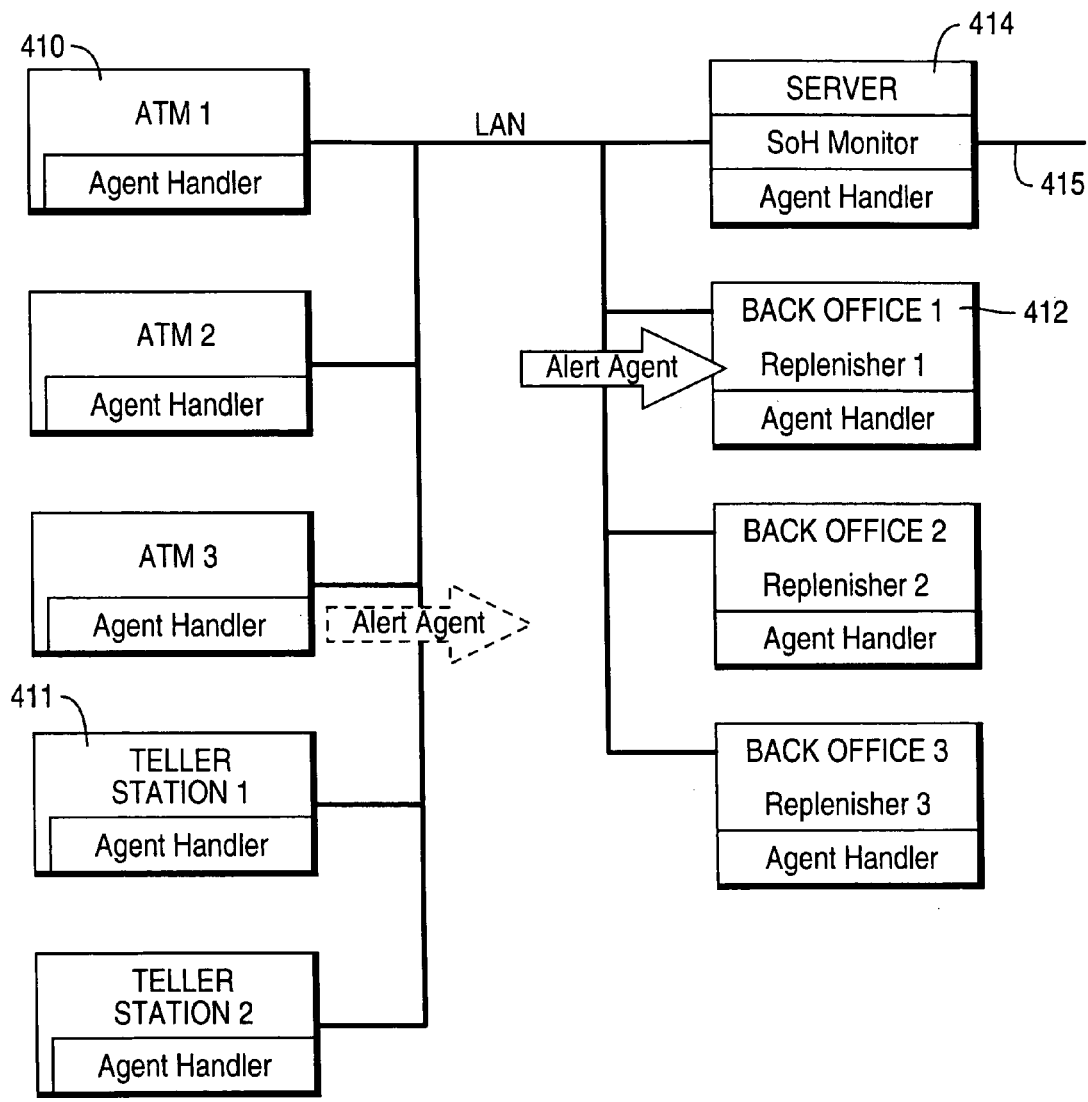
FIGS. 41A to 41C show alert intelligent agent programs used in the network of FIG. 36.

When a critical failure occurs within an ATM or teller station in the network, an alert agent program may be launched by the site experiencing the failure. An alert agent program is shown in FIG. 41A as having been launched by the ATM 3. The alert agent may indicate a critical failure such as a card jam. The alert agents may use a location list built up in an agent registry 455 from the service agents that visited earlier. An alert agent may be launched to arrive at the agent handler at each location on its list either in turn or according to some predefined rules. Such rules could specify local sites first and then remote sites. The alert agent from ATM 3 is seen in FIG. 41A as having arrived at the agent handler of BACK OFFICE 1.

Figure 41B:
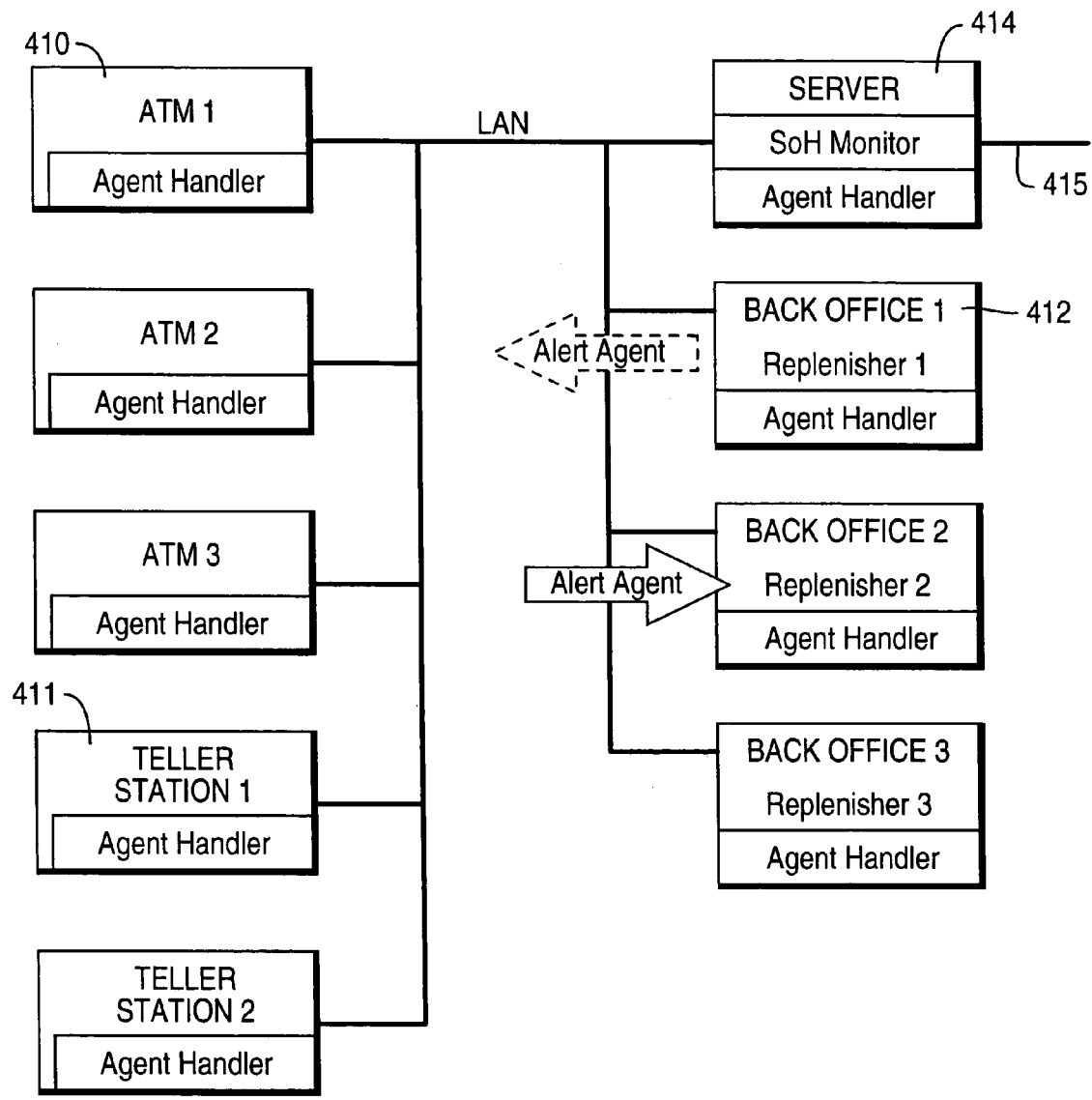

Upon reaching an agent handler of a replenisher or maintenance program, the alert agent may query training and authority levels recorded there in order to decide whether help is available. If a person is available who is trained and authorized to work on the error contained within the alert agent, then the alert agent may present a request for assistance on that person's terminal. If assistance is not available because the requested person is away from the terminal, the alert agent may be programmed to time out and move on to the next location on its list. If the requested person cannot assist because they are otherwise occupied, for example with a customer, the requested person can close the agent interface and again the alert agent may move to the next location on its list. In FIG. 41B, an alert agent from ATM 3 is shown in dotted lines as having left the BACK OFFICE 1 and in full lines as arriving at BACK OFFICE 2.

Figure 41C:
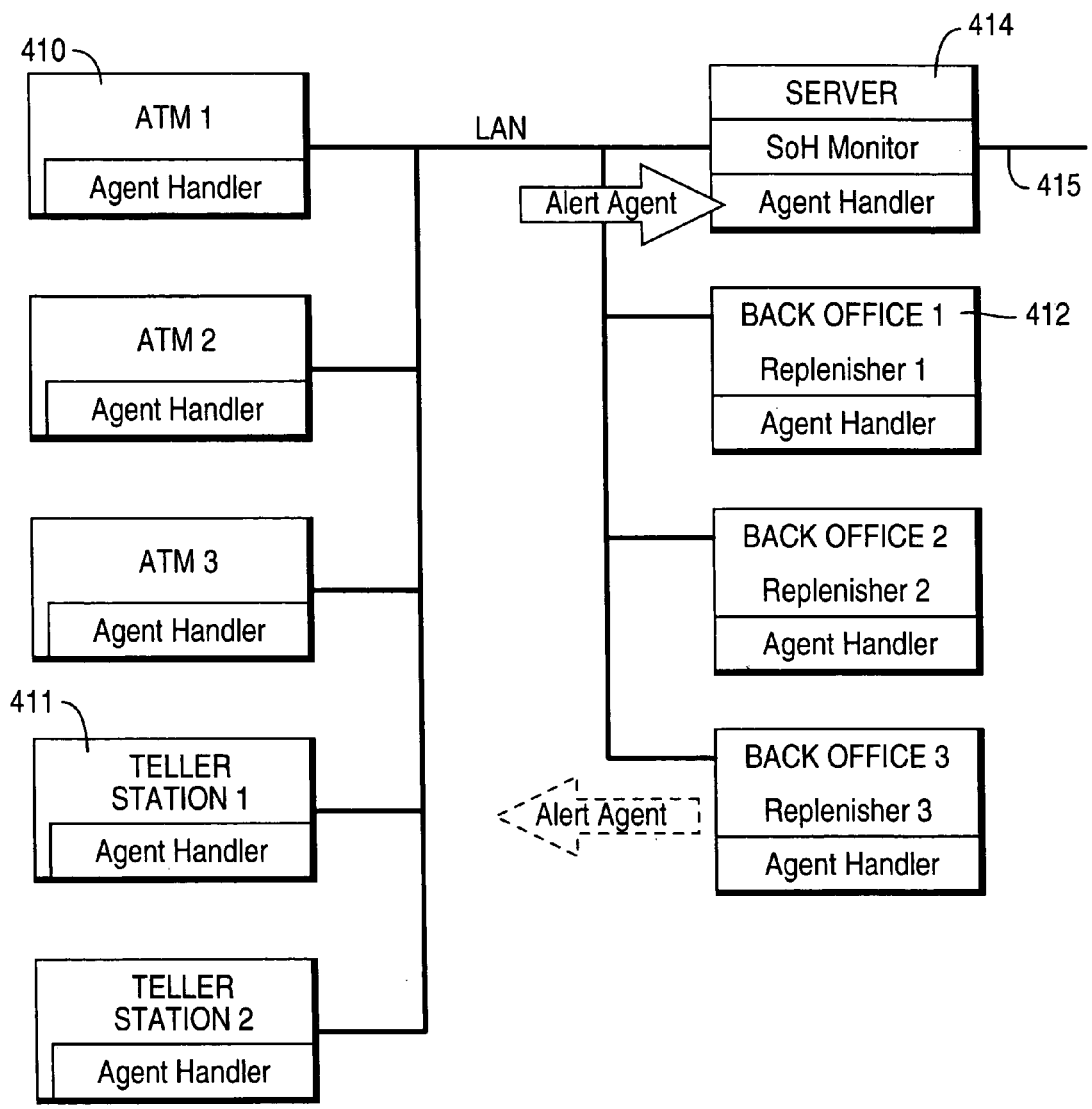

If the Replenisher 2 fails to assist, the alert agent may pass to Replenisher 3 who might also fail to assist. In this case the alert agent may pass through the server 414 to seek assistance from replenishers on the wider area network as shown diagrammatically in FIG. 41C. If at any point the alert agent successfully summons assistance, the alert agent may be acknowledged and critical failure information carried by the alert agent may be registered at the location capable of assisting. The information can include the error type, such as a card jam, and an identification of the terminal concerned. The identification may simply be a terminal number in the case where assistance is to be provided from within the environment of the local area network. Otherwise, the identification may include an address and contact information for gaining access to the terminal. Once an alert agent has successfully summoned assistance, it may return to the originating terminal site. Alternatively, the alert agent may delete itself.

Figure 42A:
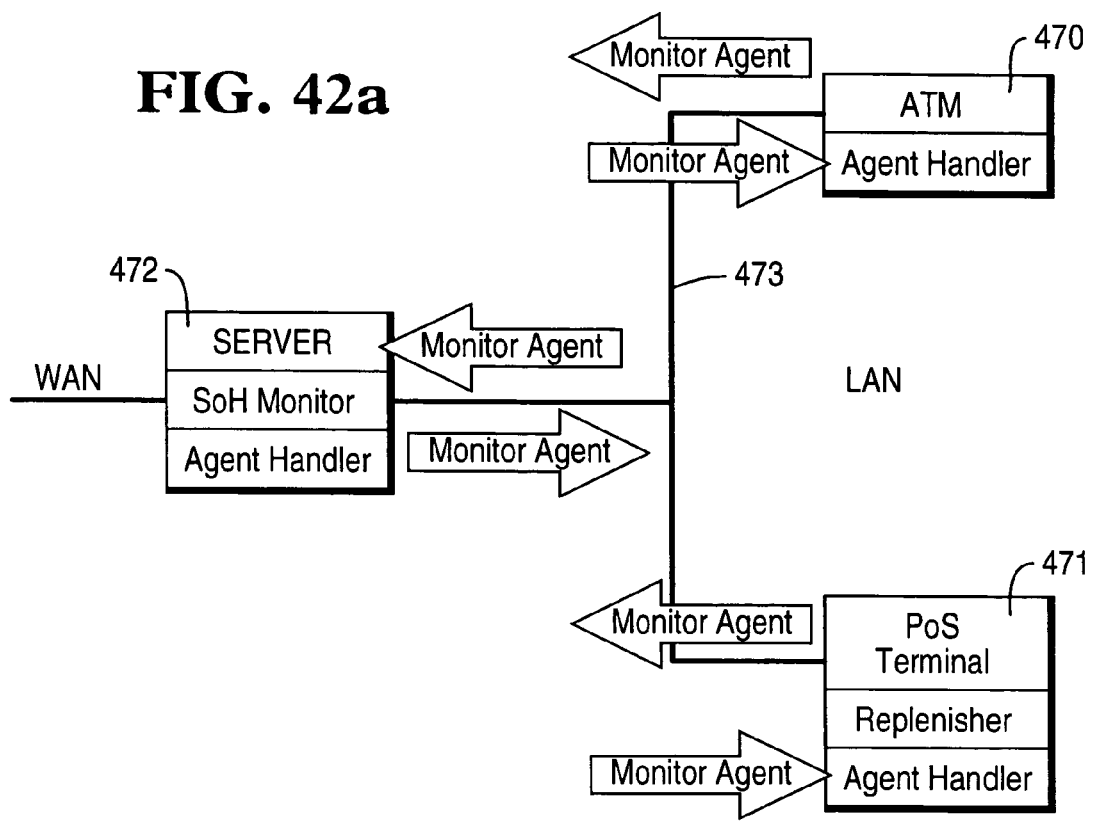
FIGS. 42A to 42C show a petrol station network according to one possible embodiment of the invention.
Figure 42B:
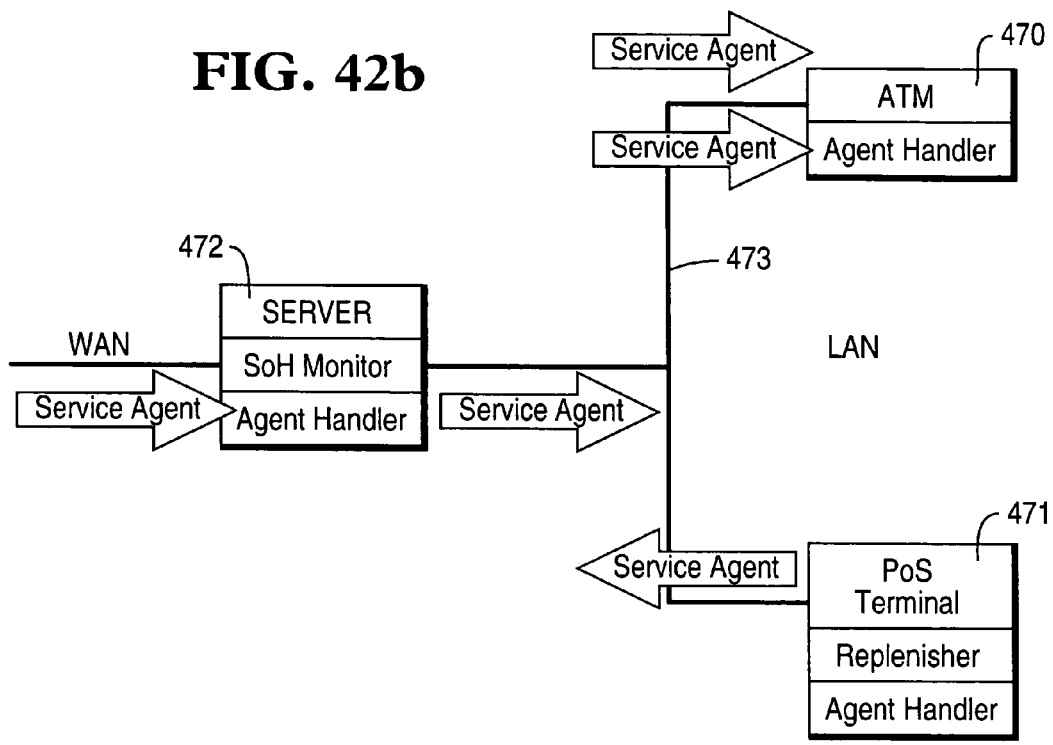
Figure 42C:
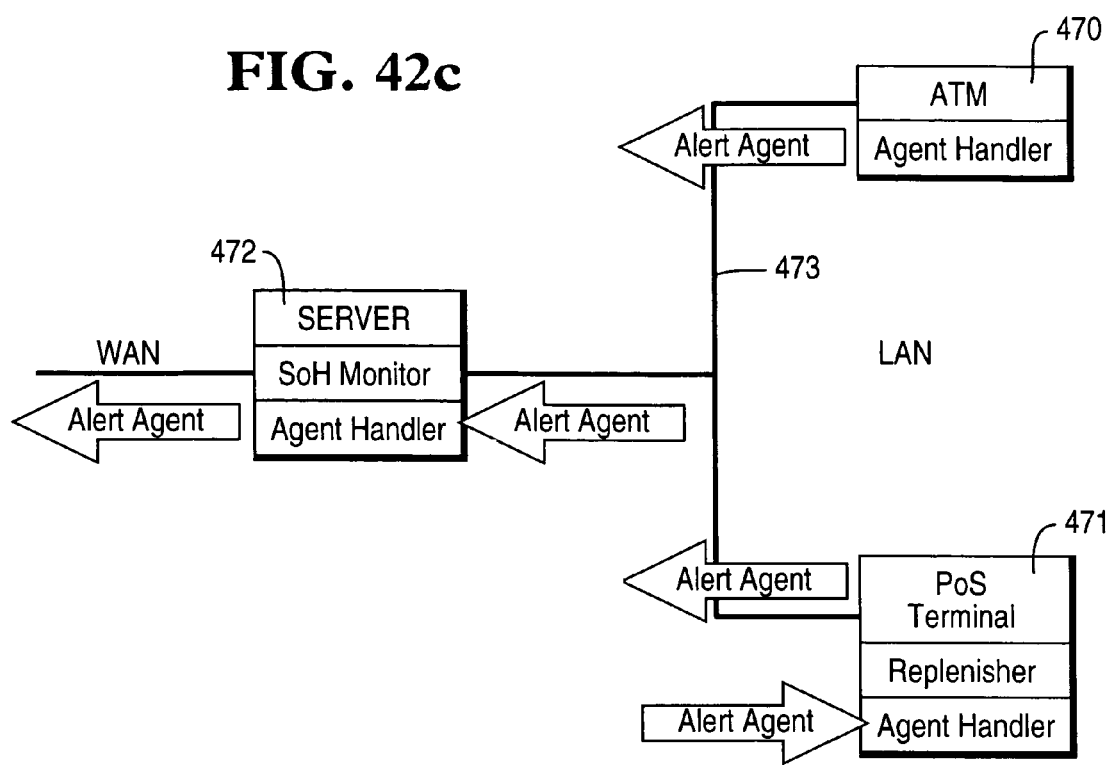

In FIGS. 42A to 42C, a petrol station site includes an ATM 470 and a point-of-sale terminal 471. The ATM 470 and terminal 471 are connected in a local area network to a server 472 by means of a bus 473. The server 472 is connected into a wider area network.

The server 472 may include a state of health monitor which periodically sends out a monitor agent to both the terminals 470 and 471 as shown in FIG. 42A in order to perform status monitoring and to schedule replenishment operations. This can be extremely important within an off-site environment where field service or security companies are likely to be used to provide cash replenishment. The state of health monitor shown located in the server 472 may alternatively be operated from a central site communicating with a proxy server acting locally.

The terminal 471 can provide a replenisher program to send out a service agent when a new user logs in as shown in FIG. 42B. A field service organization can be used to send a service agent through the server 472 to register with both the ATM 470 and the point-of-sale terminal 471. Both terminals 470 and 471 can be supported by the same field organization.

A critical error occurring in the ATM 470 can cause the ATM to launch an alert agent, as shown in FIG. 42C, which can go to the local replenisher application in the terminal 471. The alert agent can perform training and authority checks to ascertain if assistance is obtainable for the error. For simpler errors, the petrol site attendant staff may assist. For more complex errors, the alert agent can be sent out from the terminal 471 to the server 472 to be passed out to the wider network. The alert agent can be used to alert a field service organization. Alternatively, the alert agent may cause other communication strategies to be brought into play such as an e-mail message, paging a local replenisher or traditional transaction based alerting to a help desk, allowing them to call into a bank branch.

While various embodiments and examples of the invention have been described, it will be understood that the invention may be otherwise embodied and is intended to be defined and limited only by the scope of the following claims.

What is claimed is:

1. A method of operating a server system and associated Automated Teller Machines, ATMs, comprising:
   a) using the server system to deliver, to a monitor intelligent agent, Monitor Agent,
      i) a list of ATMs, and
      ii) a diagnostic computer program;

b) causing the Monitor Agent to visit the ATMs on the list in sequence and, at each ATM;
   i) deliver the diagnostic computer program to the ATM;
   ii) receive and store results of the diagnostic computer program after the ATM runs the program; and
   iii) return to the server.

2. Method according to claim 1, wherein different lists of ATMs are delivered to the Monitor Agent at different times.

3. Method according to claim 2, wherein different diagnostic computer programs are delivered to the Monitor Agent at different times.

4. A method of operating a server system and associated Automated Teller Machines, ATMs, comprising:
   a) using the server system to deliver, to a monitor intelligent agent, Monitor Agent,
      i) a list of ATMs, and
      ii) a diagnostic computer program;
   b) causing the Monitor Agent to visit the ATMs on the list in sequence and, at each ATM;
      i) deliver the diagnostic computer program to the ATM;
      ii) receive and store results of the diagnostic computer program after the ATM runs the program; and
      iii) return to the server,
   wherein the Monitor Agent comprises a data packet, having a format which includes
      1) sender's network address,
      2) addresses of the ATMs to be visited,
      3) the diagnostic program, and
      4) a register to contain data obtained from the ATM.

5. A method of operating a server system and associated Automated Teller Machines, ATMs, comprising:
   a) using the server system to deliver, to a monitor intelligent agent, Monitor Agent,
      i) a list of ATMs, and
      ii) a diagnostic computer program;
   b) causing the Monitor Agent to visit the ATMs on the list in sequence and, at each ATM;
      i) deliver the diagnostic computer program to the ATM;
      ii) receive and store results of the diagnostic computer program after the ATM runs the program; and
      iii) return to the server,
   wherein the Monitor Agent comprises a data packet having a format which includes
      1) sender's network address,
      2) addresses of the ATMs to be visited,
      3) the diagnostic program, and
      4) a register to contain data obtained from the ATM;
   c) using the server to deliver, to a service intelligent agent, Service Agent,
      i) a list of ATMs,
      ii) names of human service technicians, and
      iii) technical abilities of the service technicians; and
   d) causing the Service Agent to visit the ATMs on the list in sequence and, at each ATM, deliver;
      i) the names of the human service technicians, and
      ii) the technical abilities of the service technicians.

6. Method according to claim 5, wherein the format of the Monitor Agent is the same as that of the Service Agent.

7. Method according to claim 5, and further comprising:
   e) at an ATM,
      i) detecting an error condition;
      ii) examining the abilities of the human service technicians and selecting a group of technicians to handle the error condition;
      iii) ranking the technicians in the group;
      iv) delivering to an alert intelligent agent, Alert Agent, addresses of the group of technicians, and causing the Alert Agent to contact the technicians in the group in rank order, until a technician is found who makes a specified response.

8. Method according to claim 7, wherein the Alert Agent, Monitor Agent, and Service Agent are all organized according to a common format.

9. A method of operating a server system and associated Automated Teller Machines, ATMs, comprising:
   a) using the server system to deliver, to a monitor intelligent agent, Monitor Agent,
      i) a list of ATMs, and
      ii) a diagnostic computer program;
   b) causing the Monitor Agent to visit the ATMs on the list in sequence and, at each ATM;
      i) deliver the diagnostic computer program to the ATM;
      ii) receive and store results of the diagnostic computer program after the ATM runs the program; and
      iii) return to the server,
   wherein the Monitor Agent comprises a data packet, having a format which includes
      1) sender's network address,
      2) addresses of the ATMs to be visited,
      3) the diagnostic program, and
      4) a register to contain data obtained from the ATM;
   c) using the server to deliver, to a service intelligent agent, Service Agent,
      i) a list of ATMs,
      ii) names of human service technicians, and
      iii) technical abilities of the service technicians;
   d) causing the Service Agent to visit the ATMs on the list in sequence and, at each ATM, deliver,
      i) the names of the human service technicians, and
      ii) the technical abilities of the service technicians;
   e) at an ATM,
      i) detecting an error condition;
      ii) examining the abilities of the human service technicians and selecting a technician to handle the error condition; and
      iii) delivering to an alert intelligent agent, Alert Agent, an address of the technician selected, and causing the Alert Agent to contact the technician selected.

10. A system, comprising:
    a) a server system and a group of associated Automated Teller Machines, ATMs;
    b) means for
       i) transferring from the server system to a monitor intelligent agent, Monitor Agent,
          A) a list of ATMs and
          B) a diagnostic computer program; and
       ii) causing the Monitor Agent to visit the ATMs on the list in sequence and, at each ATM
          A) delivering the diagnostic computer program to the ATM;
          B) receiving and storing results of the diagnostic computer program after the ATM runs the program; and
          C) returning to the server.

11. A system, comprising:
    a) a server system and a group of associated Automated Teller Machines, ATMs;
    b) means for
       i) transferring from the server system to a monitor intelligent agent, Monitor Agent,
          A) a list of ATMs and
          B) a diagnostic computer program; and ii) causing the Monitor Agent to visit the ATMs on the list in sequence and, at each ATM
  A) delivering the diagnostic computer program to the ATM;
  B) receiving and storing results of the diagnostic computer program after the ATM runs the program; and
  C) returning to the server,
wherein the Monitor Agent comprises a data packet having a format which includes
  1) sender's network address,
  2) addresses of the ATMs to be visited,
  3) the diagnostic program, and
  4) a register to contain data obtained from the ATM.

12. Apparatus according to claim 11, wherein the format of the Monitor Agent is the same as that of the Service Agent.

13. A system, comprising:
a) a server system and a group of associated Automated Teller Machines, ATMs;
b) means for
  i) transferring from the server system to a monitor intelligent agent, Monitor Agent,
    A) a list of ATMs and
    B) a diagnostic computer program; and
  ii) causing the Monitor Agent to visit the ATMs on the list in sequence and, at each ATM
    A) delivering the diagnostic computer program to the ATM;
    B) receiving and storing results of the diagnostic computer program after the ATM runs the program; and
    C) returning to the server,
wherein the Monitor Agent comprises a data packet having a format which includes
  1) sender's network address,
  2) addresses of the ATMs to be visited,
  3) the diagnostic program, and
  4) a register to contain data obtained from the ATM;
c) means for
  i) transferring
    A) a list of ATMs,
    B) names of human service technicians, and
    C) technical abilities of the service technicians from the server system to a service intelligent agent, Service Agent; and
  ii) causing the Service Agent to visit the ATMs on the list in sequence and, at each ATM, deliver;
    A) the names of the human service technicians, and
    B) the technical abilities of the service technicians.

14. Apparatus according to claim 13, wherein different lists of ATMs are delivered to the Monitor Agent at different times.

15. Method according to claim 14, wherein different diagnostic computer programs are delivered to the Monitor Agent at different times.

16. A system, comprising:
a) a server system and a group of associated Automated Teller Machines, ATMs;
b) means for
  i) transferring from the server system to a monitor intelligent agent, Monitor Agent,
    A) a list of ATMs and
    B) a diagnostic computer program; and
  ii) causing the Monitor Agent to visit the ATMs on the list in sequence and, at each ATM
    A) delivering the diagnostic computer program to the ATM;
    B) receiving and storing results of the diagnostic computer program after the ATM runs the program; and
    C) returning to the server,
wherein the Monitor Agent comprises a data packet having a format which includes
  1) sender's network address,
  2)-addresses of the ATMs to be visited,
  3) the diagnostic program, and
  4) a register to contain data obtained from the ATM;
c) means for
  i) transferring
    A) a list of ATMs,
    B) names of human service technicians, and
    C) technical abilities of the service technicians from the server system to a service intelligent agent, Service Agent; and
  ii) causing the Service Agent to visit the ATMs on the list in sequence and, at each ATM, deliver;
    A) the names of the human service technicians, and
    B) the technical abilities of the service technicians;
d) means for detecting an error condition at an ATM;
e) means for examining, at the ATM, the abilities of the human service technicians and selecting a technician to handle the error condition;
f) means for delivering, at the ATM, an address of the technician selected to an alert intelligent agent, Alert Agent, and causing the Alert Agent to contact the technician selected.

17. A system, comprising:
a) a server system and a group of associated Automated Teller Machines, ATMs;
b) means for
  i) transferring from the server system to a monitor intelligent agent, Monitor Agent,
    A) a list of ATMs and
    B) a diagnostic computer program; and
  ii) causing the Monitor Agent to visit the ATMs on the list in sequence and, at each ATM
    A) delivering the diagnostic computer program to the ATM;
    B) receiving and storing results of the diagnostic computer program after the ATM runs the program; and
    C) returning to the server,
c) means for detecting an error condition at an ATM;
d) means for examining, at the ATM, the abilities of the human service technicians and selecting a group of technicians to handle the error condition;
e) means for ranking the technicians in the group at the ATM; and
f) means for
  i) delivering, at the ATM, addresses of the group of technicians to an alert intelligent agent, Alert Agent, and
  ii) causing the Alert Agent to contact the technicians in the group in rank order, until a technician is found who agrees to service the error condition
wherein the Monitor Agent comprises a data packet having a format which includes
  1) sender's network address,
  2) addresses of the ATMs to be visited,
  3) the diagnostic program, and
  4) a register to contain data obtained from the ATM and
wherein the format of the Monitor Agent is the same as that of the Service Agent.

18. Apparatus according to claim 17, wherein the Alert Agent, Monitor Agent, and Service Agent are all organized according to a common format.

19. A method of operating a server system connected by a network to Automated Teller Machines, ATMs, comprising:
- a) equipping an intelligent agent with
  - i) network address of a sending server, and
  - ii) a list of ATMs to visit; and
- b) causing the intelligent agent to
  - i) travel the network and visit ATMs on the list, and
  - ii) return to the sending server after visiting the ATMs.

20. Method according to claim 19, and further comprising:
- c) causing the agent to run a diagnostic program on the ATMs visited; and
- d) record results of the program, and deliver the results to the sending server upon return.

* * * * *